US 6,590,041 B1

(12) United States Patent
Eguchi et al.

(10) Patent No.: US 6,590,041 B1
(45) Date of Patent: Jul. 8, 2003

(54) CHLORINATED VINYL CHLORIDE-BASED RESIN AND MOLDED ARTICLES

(75) Inventors: Yoshihiko Eguchi, Shinnanyo (JP); Yuhki Gotoh, Shinnanyo (JP); Hideki Inoue, Shinnanyo (JP); Kenichi Asahina, Osaka (JP); Yukio Shibasaki, Shinnanyo (JP); Yoshiaki Okusako, Shinnanyo (JP); Yoshinobu Suenaga, Shinnanyo (JP); Ryo Iijima, Gunma (JP)

(73) Assignee: Sekisui Chemical Co., Ltd., Osaka (JP)

( * ) Notice: Subject to any disclaimer, the term of this patent is extended or adjusted under 35 U.S.C. 154(b) by 0 days.

(21) Appl. No.: 09/720,515

(22) PCT Filed: Feb. 2, 1999

(86) PCT No.: PCT/JP99/00417

§ 371 (c)(1),
(2), (4) Date: Apr. 26, 2001

(87) PCT Pub. No.: WO99/67305

PCT Pub. Date: Dec. 29, 1999

(30) Foreign Application Priority Data

| Jan. 14, 1998 | (JP) | 11/007955 |
| Jan. 14, 1998 | (JP) | 11/007958 |
| Jun. 25, 1998 | (JP) | 10/178925 |
| Aug. 24, 1998 | (JP) | 10/236946 |
| Aug. 24, 1998 | (JP) | 10/236960 |
| Sep. 24, 1998 | (JP) | 10/269997 |
| Sep. 30, 1998 | (JP) | 10/277444 |
| Oct. 16, 1998 | (JP) | 10/295177 |
| Oct. 16, 1998 | (JP) | 10/295179 |
| Jan. 21, 1999 | (JP) | 11/013175 |
| Jan. 21, 1999 | (JP) | 11/013176 |
| Jan. 22, 1999 | (JP) | 11/014430 |

(51) Int. Cl.$^7$ ................................. C08F 8/20
(52) U.S. Cl. ................... 525/331.6; 525/356
(58) Field of Search ............... 525/331.6, 356

(56) References Cited

U.S. PATENT DOCUMENTS 4,711,908 A 12/1987 Hawrylko
4,742,085 A 5/1988 Cozens

FOREIGN PATENT DOCUMENTS

| DE | 25 21 843 A | 11/1975 |
| EP | 0421150 A2 | 4/1991 |
| JP | 51-133394 A | 11/1976 |
| JP | 63-268706 A | 11/1988 |
| JP | 63-268713 A | 11/1988 |
| JP | 6-128320 A | 5/1994 |
| JP | 9-118713 A | 5/1997 |
| JP | 9-278826 A | 10/1997 |
| JP | 11-49819 A | 2/1999 |
| JP | 11-92525 A | 4/1999 |
| JP | 11-116618 A | 4/1999 |
| JP | 11-124407 A | 5/1999 |
| JP | 11-124408 A | 5/1999 |
| JP | 11-140121 A | 5/1999 |
| JP | 11-140122 A | 5/1999 |
| WO | WO 82/00647 A1 | 3/1982 |

OTHER PUBLICATIONS

XP–002203520—DATABASE WPI, Section Ch, Week 199808, Derwent Publications Ltd., London, GB; Class A14, AN 1998–082798 & JP 09 316267 A (SEKISUI CHEM IND CO LTD) Dec. 9, 1997.

*Primary Examiner*—Bernard Lipman
(74) *Attorney, Agent, or Firm*—Sughrue Mion, PLLC

(57) ABSTRACT

The present invention provides a vinyl chloride resin having a high void ratio and micropores in the interior of particles thereof and allowing high level filling and distribution of various compounding additives a method of producing the same; a chlorinated vinyl chloride resin having good gelation properties and heat resistance and a method of producing the same; a chlorinated vinyl chloride resin having good heat resistance and manifesting good gelation properties and a method of producing the same; highly heat-resistant chlorinated vinyl chloride resin pipes and joints excellent in heat resistance and shock resistance; and highly heat-resistant chlorinated vinyl chloride resin plates excellent in heat resistance, shock resistance and chemical resistance; and heat-resistant vinyl chloride resin moldings excellent in heat resistance and smoothness and having a good appearance; heat-resistant vinyl chloride resin pipes having high heat resistance, excellent in smoothness.

47 Claims, No Drawings

CHLORINATED VINYL CHLORIDE-BASED RESIN AND MOLDED ARTICLES

TECHNICAL FIELD

The present invention relates to a vinyl chloride resin, a chlorinated vinyl chloride resin and a method of producing the same, a chlorinated vinyl chloride resin pipe, a chlorinated vinyl chloride resin joint and a chlorinated vinyl chloride resin plate.

BACKGROUND ART

Vinyl chloride resins (hereinafter sometimes referred to also as "PVC" or "PVC resins") are used in various fields as materials having good mechanical strength, weathering resistance and chemical resistance. Since, however, PVC resins have the drawback of being inferior in shock resistance, various methods have been proposed to improve their shock resistance. Thus, for example, addition of a copolymer having rubber-like properties and/or high-level addition of an inorganic material, a metal powder or the like has been practiced.

Japanese Kokoku Publication Sho-44-453 discloses a method comprising blending, with PVC resins, a methyl methacrylate-butadiene-styrene copolymer (MBS copolymer) as a dispersoid. Japanese Kokai Publication Hei-02-20545 discloses a method comprising blending, with PVC resins, a chlorinated polyethylene (CPE resin) as a dispersoid.

However, when an MBS copolymer or a CPE resin is blended with PVC resins, the problem of lowered moldability arises, although the shock resistance is improved to a certain extent. Further, such a method comprising blending a copolymer having rubber-like properties with PVC resins pays attention only to the dispersoid but not to the PVC resins themselves, which are dispersion media, and accordingly the shock resistance improving effect is limited.

Furthermore, in many cases, loading materials, fillers, reinforcements and the like are incorporated in PVC resins for providing them with mechanical strength and functions. Therefore, PVC resins highly capable of dispersing other kinds of materials therein and allowing high level addition thereof and having good gelation properties are demanded. Further, since PVC resins excellent in gelation properties are generally excellent in high-speed moldability, PVC resins having good gelation properties as well are desired.

For improving such gelation properties and attaining high level loadability and dispersibility of materials of other kinds, it is necessary that the PVC resins be readily disintegrable and have micropores within resin particles with a high void content.

On the other hand, PVC resins are inferior in heat resistance. Therefore, chlorinated vinyl chloride resins (hereinafter referred to also as "CPVC" or "CPVC resins") have been developed which are produced by chlorinating PVC resins and thus improved in heat resistance.

While PVC resins have a low thermal deformation temperature and the upper limit temperature allowing their practical use is around 60 to 70° C., hence they cannot be used in contact with hot water, CPVC resins have a thermal deformation temperature higher by 20 to 40° C. as compared with PVC resins, so that they can be used in contact with hot water and are thus favorably used as materials of heat-resistant pipes and heat-resistant joints, typically for hot water supply, or of heat-resistant resin material plates for producing tanks or containers, for instance. Through the use of CPVC, the problem of rusting due to corrosion so far encountered with the conventional metal pipes, metal plates and the like has been liquidated.

However, since CPVC resins have a high thermal deformation temperature, a high temperature and great shearing force are required for effecting gelation in the step of molding/fabrication, tending to cause degradation and discoloration of the resins. CPVC resins thus have a narrow margin of moldability and they are often molded into products in an insufficient gelation state and, on such occasions, the products can hardly be said to have fully inherited the performance characteristics intrinsic in the material resins.

In addition to such improvement requirement concerning gelation properties, a higher level of heat resistance, too, is now required. In the case of heat-resistant pipes, heat-resistant joints and reservoirs for holding chemical liquids, for instance, they are liable to expand to the extent of undergoing deformation and fracture when high-temperature steam at 100° C. or higher is generated as the result of, for instance, a failure in the operation of a safety device or upon introduction of a chemical liquid heated to 100° C. or above. For passing a liquid or gas at 100° C. or above through such heat-resistant pipes or heat-resistant joints or introducing a chemical liquid at 100° C. or above into such chemical liquid reservoirs, the pipes and joints for hot water supply are required to have still higher levels of heat resistance and chemical resistance as compared with the conventional pipes and joints for hot water supply. They, in particular, are required to have high shock resistance such that they may withstand water hammer shocks. For that purpose, it is necessary that the gelation of CPVC resins be sufficient.

For solving such problems, Japanese Kokai Publication Sho-49-6080, for instance, discloses a method comprising chlorinating a PVC resin in the form of aggregates consisting of primary particles about 1 μm in size as resulting from the use of a suspension stabilizer composed of an ionic emulsifier, a water-soluble metal salt and a water-soluble macromolecular dispersant (i.e. proposal for improving resin particles). This method indeed improves the gelation properties in the step of molding/fabrication but, the improvement is not yet satisfactory. In addition, a problem arises: a large amount of scale is formed in the step of polymerization and sticks to the polymerizer wall surface to thereby lessen the heat removing effect, hence work is required to remove said scale.

Japanese Kkai Publication Hei-04-81446 discloses a method of attaining a high thermal deformation temperature which comprises using a resin composition having a specific chlorine content and a shock resistance enhancer. However, the heat resistance attainable is still below the level intended to reach by us.

Japanese Kokai Publication Hei-05-132602 discloses a method of attaining high heat resistance which comprises blending a CPVC resin with a PVC resin so as to obtain a viscosity in a specific range (proposal-for improvement by resin blending) However, this method is only expected to bring about an improvement in heat resistance by about 3 to 4° C. in terms of Vicat value as well as a certain extent of gelling performance improvement owing to the improvement in melt viscosity. The method can never satisfactorily attain the high levels of heat resistance and gelation properties which are aimed at by us.

Japanese Kokai Publication Hei-06-128320 discloses a method of chlorinating PVC-resins which comprises two steps (two-step chlorination method). This method is intended to produce highly heat-resistant CPVC resins by increasing the chlorine content to 70 to 75% by weight (proposal for improvement by high level chlorination). However, while this method can be expected to afford high heat resistance according to the chlorine content, no means is disclosed for preventing the gelation properties from predictably worsening as a result of high level chlorination and, accordingly, the method cannot provide practical levels of high heat resistance and gelation properties.

Japanese Kohyo Publication Sho-57-501285 discloses a method of producing highly heat-resistant CPVC resins by effecting the chlorination reaction under ultraviolet irradiation which method employing a chlorine pressure within the range of 25 to 100 psi (1.75 to 7 kg/cm$^2$) and using resin particles restricted in porosity to 0.1 to 0.7 cc/g and in surface area to 0.7 to 2 m$^2$/g. However, only the chlorination pressure is considered as the condition for attaining high heat resistance in this chlorination reaction. The ranges given for the porosity and surface area of resin particles are too broad and no preferred ranges are shown therefor. The CPVC resins obtained are thus mostly low in heat resistance. Further, that part of this technology which is claimed to be effective in the chlorination process is the preliminary permeation step called "soaking" prior to initiation of the chlorination reaction by ultraviolet irradiation but, under the conditions of this step, high heat resistance cannot be obtained.

According to Japanese Kokai Publication Hei-01-217008, the mean particle diameter and void ratio of a PVC resin in photochlorination under intermittent irradiation are restricted to respective specific ranges. By this proposal, it is intended that the chlorination reaction within resin particles be made uniform by promoting the diffusion of chlorine in a nonirradiation step. However, due to failure to take consideration of the surface profile (skin layer), the ready gelation tendency is not aimed at although the heat resistance of the product CPVC resin can be improved.

Janpanese Kohyo Publication Sho-57-501184 discloses a method of producing a chlorinated vinyl chloride resin which comprises, in carrying out the chlorination reaction under actinic rays irradiation using liquid chlorine as the main source of chlorine, using, as the PVC resin, a PVC resin occurring as granular resin particles having a mean particle size of 10 to 50 $\mu$m, whose constituent element primary particles have a mean particle size of 0.05 to 5 $\mu$m, and having a porosity of 0.2 to 0.3. The main concerns of this technology are the resin particle size and primary particle size in view of the possibility that the process of chlorine diffusion in the core of each PVC resin particle to be chlorinated might be the rate-determining step in the chlorination reaction of a PVC resin. However, the CPVC resin obtained shows only a small extent of improvement in heat resistance and in gelation properties. This is because, as reported in "AIChE Journal, October 1988, Vol. 34, No. 10, pages 1683–1690", the diffusion of chlorine in the chlorination reaction is not determined by an elemental factor called primary particle size or grain size but is presumably governed by the agglomerate size resulting from agglomeration of primary particles.

However, the finding that the agglomerate size is predominating alone cannot make it possible to obtain CPVC resins excellent in heat resistance and gelation properties. The reason is that, since a dispersant is used in the step of suspension polymerization, grain particles of the PVC resin have a thick skin layer and the occurrence of this skin layer causes a decrease in gelation properties and further prevents the diffusion of chloride. Thus, for obtaining a CPVC resin excellent in heat resistance and gelation properties, it is necessary to pay attention to both the skin layer and agglomerate size. However, the technique of removing the skin layer from PVC resins and controlling the agglomerate size thereof is very difficult. As far as the prior art methods of producing CPVC resins are concerned, both have not been investigated.

Japanese Kokoku Publication Sho-45-30833 described that when the chlorination is carried out at a temperature of 55 to 80° C. while feeding chlorine with an oxygen concentration of 0.05 to 0.35% by volume at a specified rate, CPVCs having good heat stability can be-obtained. Since, however, the reaction is carried out in the presence of a high concentration of oxygen and at a low temperature, the heat stability is not so markedly high, hence the product cannot tolerate long-time extrusion molding or injection molding.

Japanese Kokai Publication Hei-09-328518 proposes a method comprising carrying out the chlorination under ultraviolet irradiation using chlorine having an oxygen concentration of not more than 200 ppm. Since, however, the reaction is carried out at a low temperature by means of ultraviolet irradiation, any CPVC having remarkably good heat stability can not be obtained.

Further, Japanese Kokai Publication Hei-09-32822 proposes a method comprising carrying out the chlorination at 110 to 135° C. while feeding chlorine containing 10 to 100 ppm of oxygen. Since the chlorination is carried out at a high temperature in the manner of thermal chlorination, CPVC resins excellent in heat stability can be obtained and the chlorination reaction can proceed smoothly. However, the voids in the interior of particles decrease under the influence of the thermal energy released upon the high temperature reaction, hence sufficient gelation will hardly take place in the step of molding/fabrication. For improving the workability, it is necessary to further cause heat generation from within particles under high temperature and high shearing conditions.

Thus, in the prior art, no high heat resistance PVCs or high heat resistance CPVCs having superior gelling performance and heat resistance characteristics are available nor pipes or joints made of a high heat resistance CPVC and having superior heat resistance, shock resistance and chemical resistance are obtainable. No high heat resistance CPVC resin plates excellent in heat resistance, shock resistance and chemical resistance are available, either.

Meanwhile, high heat resistance vinyl chloride resin moldings improved in heat resistance temperature have advantages over ordinary vinyl chloride resin articles in that they can stand against higher pressures when compared under the same morphological and temperature conditions and in that they can be used at higher temperatures when compared under the same pressure conditions.

Japanese Kokai Publication Hei-04-359928, for instance, proposes, as heat resistant vinyl chloride resin moldings, heat-resistant and hygienic pipes for hot water supply as produced from a chlorinated vinyl chloride resin (hereinafter referred to as "CPVC") having a chlorine content of not less than 67.5% by weight as produced by chlorination of a vinyl chloride resin, together with a specific compounding additive.

However, the conventional heat-resistant vinyl chloride resins have a higher viscosity, hence their stress relaxation time is longer, as compared with the ordinary vinyl chloride resins and, therefore, the appearance of the moldings thereof is inferior in smoothness.

For providing moldings with smoothness, measures are generally taken to raise the temperature of the resin to be molded and the mold temperature and/or prolong the residence time in the mold. For providing heat-resistant vinyl chloride resin moldings with satisfactory smoothness, it is necessary to considerably raise the molding temperature and/or considerably prolonging the residence time in the mold, with the result, however, that the resin experiences a thermal history and becomes readily decomposable, which presents a problem concerning the long-run feature (continuous moldability) in some instances. For these reasons, any heat-resistant vinyl chloride resin moldings having both good smoothness and high heat resistance have not yet been put on the market.

On the other hand, piping materials for ultra pure water for plant use and like piping materials are required to have a smooth surface with the pipe inside surface unevenness reduced to a minimum so that the propagation of bacteria on the pipe inside surface can be inhibited.

When an attempt is made to increase the heat resistance of a raw material resin for molding for improving the reliability of those products or for extending the range of applications thereof, the smoothness of the moldings obtained is apt to be impaired. Therefore, it is conceivable to use a raw material resin improved in heat stability by addition of a metal compound, a stabilizer or the like and increase the molding temperature and/or prolong the residence time in the mold to thereby provide the products with surface smoothness. In such a field of use as piping materials for ultra pure water for plant use, however, limitations are imposed on the amounts of elution of impurities such as metal ions and TOC (total organic carbon) in order that the quality of ultra pure water may not be affected. Therefore, the use of metal compounds, stabilizers and the like is restricted. As a result, it is difficult, because of such problems as thermal decomposition and limited long run possibility, to provide surface smoothness by raising the molding temperature and/or prolonging the residence time in the mold.

Regarding this problem, Japanese Kokai Publication Hei-09-316267 discloses that piping materials for ultrapure water for plant use having good surface smoothness, while enabling long run production, can be formed by using a composition comprising a chlorinated vinyl chloride resin, organotin stabilizer, oxidized polyethylene wax, modifier, lubricant, processing aid and pigment and so on in specific proportions.

Further, heat-resistant piping materials for ultrapure water which can be readily cleaned by thermal sterilization have recently been demanded and the material used there is a chlorinated vinyl chloride resin. In molding pipes having a smooth and even surface, a lower degree of chlorination and a lower average degree of polymerization are advantageous. For providing heat resistance, however, the degree of chlorination should be above a certain level and, from the long-term creep characteristics and fatigue strength viewpoint, it is necessary to increase the average degree of polymerization.

On the other hand, when such piping materials are joined together using an adhesive, the solvent in the adhesive used may cause cracking on the pipe inside surface after joining (such cracking is called solvent cracking; hereinafter, solvent cracking is referred to as "SC"), which may lead to crack failure in some instances. The occurrence of this SC is probably influenced by the degree of chlorination and average degree of polymerization but what influences they have has not been fully understood.

For these reasons, those degree of chlorination and average degree of polymerization of a chlorinated vinyl chloride resin which might be molded into piping materials for ultrapure water for plant use having good smoothness, heat resistance and SC resistance combinedly have been unknown.

SUMMARY OF THE INVENTION

It is an object of the present invention to solve the problems mentioned above and, paying attention to the surface condition and internal condition of a vinyl chloride resin and to the distribution of chlorination therein, provide a vinyl chloride resin having a high void ratio and micropores in the interior of particles thereof and allowing high level filling and distribution of various compounding additives and a method of producing the same as well as to provide a chlorinated vinyl chloride resin having good gelation properties and heat resistance and a method of producing the same, to provide a chlorinated vinyl chloride resin having good heat resistance and manifesting good gelation properties and a method of producing the same, provide highly heat-resistant chlorinated vinyl chloride resin pipes and joints excellent in heat resistance and shock resistance and highly heat-resistant chlorinated vinyl chloride resin plates excellent in heat resistance, shock resistance and chemical resistance, and further provide heat-resistant vinyl chloride resin moldings highly reliable with respect to heat resistance and so forth, excellent in smoothness and having a good appearance as well as heat-resistant vinyl chloride resin pipes having high heat resistance, excellent in smoothness so that propagation of bacteria and the like inside them may be inhibited, and usable in pure water distribution systems or the like or heat-resistant vinyl chloride resin pipes having superior smoothness, heat resistance and SC resistance combinedly and usable as piping materials for ultrapure plant water and so forth.

In a first aspect, the invention provides a vinyl chloride resin as well as a chlorinated vinyl chloride resin and a method of producing the same.

In a first mode of embodiment of the first aspect of the invention, there is provided a chlorinated vinyl chloride resin obtainable by chlorination of a vinyl chloride resin, said vinyl chloride resin having a BET specific surface area of 1.3 to 8 $m^2/g$ and a carbon element-chlorine element 1S bond energy (eV) peak ratio (chlorine element peak×2/carbon element peak) of higher than 0.6 as determined by particle surface analysis by ESCA (electron spectroscopy for chemical analysis) (hereinafter referred to as "Invention I-1").

In a second mode of embodiment of the first aspect of the invention, there is provided a chlorinated vinyl chloride resin according to Invention I-1 which satisfies the following relations (1) and (2):

$$-3.9X+300 \geq Y \geq -3.9X+290 \tag{1}$$

$$-3.2X+280 \geq Z \geq -3.2X+270 \tag{2}$$

wherein X is the chlorine content (% by weight) of the chlorinated vinyl chloride resin, Y is the amount (g) of methyl alcohol required for initiating precipitation of the chlorinated vinyl chloride resin when 3.0 g of the resin is completely dissolved in 60 g of tetrahydrofuran at 20° C. and then methyl alcohol is gradually added to the solution to thereby cause precipitation of the resin, and Z is the amount (g) of methyl alcohol required to cause 80% by weight of the resin to precipitate (hereinafter referred to as "Invention I-2").

In a third mode of embodiment of the first aspect of the invention, there is provided a chlorinated vinyl chloride resin obtainable by chlorination of a vinyl chloride resin said vinyl chloride resin having a BET specific surface area of 1.3 to 8 m²/g and a carbon element-chlorine element 1S bond energy (eV) peak ratio [(chlorine element peak)×2/carbon element peak] of higher than 0.6 as determined by particle surface analysis by electron spectroscopy for chemical analysis, agglomerates being obtained by agglomeration of primary particles of the vinyl chloride resin, the average particle diameter of the agglomerates being 1 to 7 μm (hereinafter referred to as "Invention I-3")

In a fourth mode of embodiment of the first aspect of the invention, there is provided a chlorinated vinyl chloride resin according to Invention I-3 wherein the chlorination is carried out using a heat energy source (hereinafter referred to as "Invention I-4").

In a fifth mode of embodiment of the first aspect of the invention, there is provided a vinyl chloride resin having a BET specific surface area of 1.3 to 8 m²/g, a carbon element-chlorine element 1S bond energy (eV) peak ratio [(chlorine element peak)×2/carbon element peak] of higher than 0.6 as determined by particle surface analysis by electron spectroscopy for chemical analysis, a void ratio of 27 to 40% by volume as determined by mercury porosimetry at a pressure of 2,000 kg/cm² and an average pore size of 0.1 to 0.5 μm (hereinafter referred to as "Invention I-5").

In a sixth mode of embodiment of the first aspect of the invention, there is provided a vinyl chloride resin according to Invention I-5 wherein, in the pore volume distribution thereof as determined by mercury porosimetry in the pressure range of 0 to 2,000 kg/cm², the percentage by volume (A1) of voids 0.001 to 0.1 μm in size to the total volume of voids is 2 to 10% by volume (hereinafter referred to as "Invention I-6").

In a seventh mode of embodiment of the first aspect of the invention, there is provided a chlorinated vinyl chloride resin obtainable by chlorination of a vinyl chloride resin according to Invention I-5 or Invention I-6 (hereinafter referred to as "Invention I-7").

In an eighth mode of embodiment of the first aspect of the invention, there is provided a chlorinated vinyl chloride resin obtainable by chlorination of a vinyl chloride resin, wherein said vinyl chloride resin has a BET specific surface area of 1.3 to 8 m²/g, a carbon element-chlorine element 1S bond energy (eV) peak ratio [(chlorine element peak)×2/carbon element peak] of higher than 0.6 as determined by particle surface analysis by electron spectroscopy for chemical analysis and a void ratio of 27 to 40% by volume as determined by mercury porosimetry at a pressure of 2,000 kg/cm² and, in the pore volume distribution thereof as determined by mercury porosimetry in the pressure range of 0 to 2,000 kg/cm², the percentage by volume (A2) of voids 0.001 to 0.1 μm in size to the total volume of voids is 2 to 30% by volume (hereinafter referred to as "Invention I-8")

In a ninth mode of embodiment of the first aspect of the invention, there is provided a chlorinated vinyl chloride resin according to Invention I-8 wherein, in the pore volume distribution of the vinyl chloride resin as determined by mercury porosimetry in the pressure range of 0 to 2,000 kg/cm², the percentage by volume (A1) of voids 0.001 to 0.1 μm in size to the total volume of voids is 2 to 10% by volume, and the percentage by volume (A2) of voids 0.001 to 0.1 μm in size for the chlorinated vinyl chloride resin and the percentage by volume (A1) of voids 0.001 to 0.1 μm in size for the vinyl chloride resin satisfy the following relation (1):

$$(A1) \times 2 \leq (A2) \tag{1}$$

(hereinafter referred to as "Invention I-9").

In a tenth mode of embodiment of the first aspect of the invention, there is provided a chlorinated vinyl chloride resin according to Invention I-8 or Invention I-9, wherein the percentage by volume (A2) of voids 0.001 to 0.1 μm in size to the total volume of voids for the chlorinated vinyl chloride resin is 3 to 15% by volume (hereinafter referred to as "Invention I-10")

In an eleventh mode of embodiment of the first aspect of the invention, there is provided a chlorinated vinyl chloride resin obtainable by chlorination of a vinyl chloride resin and having a chlorine content of 60 to 72% by weight and a void ratio of 30 to 40% by volume as determined by mercury porosimetry at a pressure of 2,000 kg/cm², wherein, in the pore volume distribution thereof as determined by mercury porosimetry in the pressure range of 0 to 2,000 kg/cm², the voids 0.001 to 0.1 μm in size account for 2 to 15% relative to the total volume of voids (hereinafter referred to as "Invention I-11").

In a twelfth mode of embodiment of the first aspect of the invention, there is provided a chlorinated vinyl chloride resin obtainable by chlorination of a vinyl chloride resin and having a chlorine content of 60 to 72% by weight, a void ratio of 30 to 40% by volume as determined by mercury porosimetry at a pressure of 2,000 kg/cm² and a BET specific surface area of 2 to 12 m²/g (hereinafter referred to as "Invention I-12").

In a thirteenth mode of embodiment of the first aspect of the invention, there is provided a chlorinated vinyl chloride resin obtainable by chlorination of a vinyl chloride resin and having a chlorine content of 60 to 72% by weight and a void ratio of 30 to 40% by volume as determined by mercury porosimetry at a pressure of 2,000 kg/cm², wherein, in the pore volume distribution thereof as determined by mercury porosimetry in the pressure range of 0 to 2,000 kg/cm², the voids 0.001 to 0.1 μm in size account for 2 to 15% relative to the total volume of voids. and the absorbance (cell length 1 cm, measuring temperature 23° C.) of a 1 g/kg tetrahydrofuran solution thereof is not more than 0.8 at the wavelength 235 nm (hereinafter referred to as "Invention I-13").

In a fourteenth mode of embodiment of the first aspect of the invention, there is provided a chlorinated vinyl chloride resin obtainable by chlorination of a vinyl chloride resin and having a chlorine content of 60 to 72% by weight, a void ratio of 30 to 40% by volume as determined by mercury porosimetry at a pressure of 2,000 kg/cm² and a BET specific surface area of 2 to 12 m²/g wherein the absorbance (cell length 1 cm, measuring temperature 23° C.) of a 1 g/kg tetrahydrofuran solution thereof is not more than 0.8 at the wavelength 235 nm (hereinafter referred to as "Invention I-14").

In a fifteenth mode of embodiment of the first aspect of the invention, there is provided a chlorinated vinyl chloride resin obtainable by chlorination of a vinyl chloride resin and having a chlorine content of 60 to 72% by weight and a void ratio of 30 to 40% by volume as determined by mercury porosimetry at a pressure of 2,000 kg/cm wherein, in the pore volume distribution thereof as determined by mercury porosimetry in the pressure range of 0 to 2,000 kg/cm², the voids 0.001 to 0.1μm in size account for 2 to 15% relative to the total volume of voids and the absorbance (cell length 1 cm, measuring temperature 23° C.) of a 1 g/kg tetrahydrofuran solution thereof is not more than 0.2 at the wavelength 235 nm (hereinafter referred to as "Invention I-15")

In a sixteenth mode of embodiment of the first aspect of the invention, there is provided a chlorinated vinyl chloride resin obtainable by chlorination of a vinyl chloride resin and having a chlorine content of 60 to 72% by weight, a void ratio of 30 to 40% by volume as determined by mercury porosimetry at a pressure of 2,000 kg/cm² and a BET specific surface area of 2 to 12 m²/g, wherein the absorbance (cell length 1 cm, measuring temperature 23° C.) of a 1 g/kg tetrahydrofuran solution thereof is not more than 0.2 at the wavelength 235 nm (hereinafter referred to as "Invention I-16").

In a seventeenth mode of embodiment of the first aspect of the invention, there is provided a chlorinated vinyl chloride resin obtainable by chlorination of a vinyl chloride resin and having a chlorine content of 60 to 72% by weight and a void ratio of 30 to 40% by volume as determined by mercury porosimetry at a pressure of 2,000 kg/cm², wherein, in the pore volume distribution thereof as determined by mercury porosimetry in the pressure range of 0 to 2,000 kg/cm², the voids 0.001 to 0.1 μm in size account for 2 to 15% relative to the total volume of voids and the following relations (1) and (2) are satisfied:

$$-3.9X+305 \geq Y \geq -3.9X+300 \quad (1)$$

$$-3.2X+270 \geq Z \geq -3.2X+265 \quad (2)$$

where X is the chlorine content (% by weight) of the chlorinated vinyl chloride resin and Y is the amount (g) of methyl alcohol required for initiating precipitation of the chlorinated vinyl chloride resin when 3.0 g of the resin is completely dissolved in 60 g of tetrahydrofuran and then methyl alcohol is gradually added to the solution to thereby cause precipitation of the resin, and Z is the amount (g) of methyl alcohol required to cause 80% by weight of the resin to precipitate (hereinafter referred to as "Invention I-17").

In an eighteenth mode of embodiment of the first aspect of the invention, there is provided a chlorinated vinyl chloride resin obtainable by chlorination of a vinyl chloride resin and having a chlorine content of 60 to 72% by weight, a void ratio of 30 to 40% by volume as determined by mercury porosimetry at a pressure of 2,000 kg/cm² and a BET specific surface area of 2 to 12 m²/g wherein the following relations (1) and (2) are satisfied:

$$-3.9X+305 \geq Y \geq -3.9X+300 \quad (1)$$

$$-3.2X+270 \geq Z \geq -3.2X+265 \quad (2)$$

where X is the chlorine content (% by weight) of the chlorinated vinyl chloride resin, Y is the amount (g) of methyl alcohol required for initiating precipitation of the chlorinated vinyl chloride resin when 3.0 g of the resin is completely dissolved in 60 g of tetrahydrofuran at 20° C. and then methyl alcohol is gradually added to the solution to thereby cause precipitation of the resin, and Z is the amount (g) of methyl alcohol required to cause 80% by weight of the chlorinated vinyl chloride resin to precipitate (hereinafter referred to as "Invention I-18").

In a nineteenth mode of embodiment of the first aspect of the invention, there is provided a method of producing a chlorinated vinyl chloride resin by chlorination of a vinyl chloride resin wherein said vinyl chloride resin has a BET specific surface area of 1.3 to 8 m²/g and a carbon element-chlorine element 1S bond energy (eV) peak ratio (chlorine element peak×2/carbon element peak) of higher than 0.6 as determined by particle surface analysis by ESCA (electron spectroscopy for chemical analysis)

and said chlorination is carried out by introducing liquid chlorine or gaseous chlorine into a reaction vessel containing the vinyl chloride resin in a state suspended in an aqueous medium at a reaction temperature within the range or 70 to 135° C. (hereinafter referred to as "Invention I-19").

In a twentieth mode of embodiment of the first aspect of the invention, there is provided a method of producing a chlorinated vinyl chloride resin according to Invention I-19, wherein the vinyl chloride resin has a BET specific surface area of 1.5 to 5 m²/g (hereinafter referred to as "Invention I-20").

In a twenty-first mode of embodiment of the first aspect of the invention, there is provided a method of producing a chlorinated vinyl chloride resin according to Invention I-19 or Invention I-20, wherein the above-mentioned peak ratio of the vinyl chloride resin as determined by particle surface analysis by ESCA is above 0.7 (hereinafter referred to as "Invention I-21")

In a second aspect, the invention provides a chlorinated vinyl chloride resin and a method of producing the same.

In a first mode of embodiment of the second aspect of the invention, there is provided a chlorinated vinyl chloride resin obtainable by chlorination of a vinyl chloride resin and having a chlorine content of 72 to 76% by weight and a void ratio of 30 to 40% by volume as determined by mercury porosimetry at a pressure of 2,000 kg/cm² wherein, in the pore volume distribution thereof as determined by mercury porosimetry in the pressure range of 0 to 2,000 kg/cm², the voids 0.001 to 0.1 μm in size account for 2 to 1S% relative to the total volume of voids (hereinafter referred to as "Invention II-1").

In a second mode of embodiment of the second aspect of the invention, there is provided a chlorinated vinyl chloride resin obtainable by chlorination of a vinyl chloride resin and having a chlorine content of 72 to 76% by weight, a void ratio of 30 to 40% by volume as determined by mercury porosimetry at a pressure of 2,000 kg/cm² and a BET specific surface area of 2 to 12 m²/g (hereinafter referred to as "Invention II-2").

In a third mode of embodiment of the second aspect of the invention, there is provided a chlorinated vinyl chloride resin according to Invention II-1 or Invention II-2 having a carbon element-chlorine element 1S bond energy (eV) peak ratio (chlorine element peak×2/carbon element peak) of higher than 0.6 as determined by particle surface analysis by ESCA (electron spectroscopy for chemical analysis) (hereinafter referred to as "Invention II-3").

In a fourth mode of embodiment of the second aspect of the invention, there is provided a method of producing a chlorinated vinyl chloride resin by chlorination of a vinyl chloride resin
wherein the vinyl chloride resin has a BET specific surface area of 1.3 to 8 $m^2/g$ and a carbon element-chlorine element 1S bond energy (eV) peak ratio (chlorine element peak/carbon element peak) of higher than 0.6 as determined by particle surface analysis by ESCA (electron spectroscopy for chemical analysis) and said chlorination is carried out until attainment of a chlorine content of 72 to 76% by weight by introducing liquid chlorine or gaseous chlorine into a reaction vessel containing the vinyl chloride resin in a state suspended in an aqueous medium at a temperature within the range of 70 to 135° C. (hereinafter referred to as "Invention II-4").

In a third aspect, the invention provides a high heat resistant chlorinated vinyl chloride resin pipe, a high heat resistant chlorinated vinyl chloride resin joint and a chlorinated vinvl chloride resin plate.

In a first mode of embodiment of the third aspect of the invention, there is provided a chlorinated vinyl chloride resin pipe having a Vicat softening temperature of not lower than 145° C. as determined under a load of 1 kgf by the method according to JIS K 7206 (hereinafter referred to as "Invention III-1").

In a second mode of embodiment of the third aspect of the invention, there is provided a chlorinated vinyl chloride resin pipe having a Vicat softening temperature of not lower than 155° C. as determined under a load of 1 kgf by the method according to JIS K 7206 (hereinafter referred to as "Invention III-2").

In a third mode of embodiment of the third aspect of the invention, there is provided a chlorinated vinyl chloride resin pipe having avicat softening temperature of not lower than 170° C. as determined under a load of 1 kgf by the method according to Jis K 7206 (hereinafter referred to as "Invention III-3").

In a fourth mode of embodiment of the third aspect of the invention, there is provided a chlorinated vinyl chloride resin pipe having a Vicat softening temperature of not lower than 145° C. as determined under a load of 1 kgf by the method according to JIS K 7206 and a Charpy impact strength of not less than 10 kgf·cm/$cm^2$ as determined by the method according to JIS K 7111 (hereinafter referred to as "Invention III-4").

In a fifth mode of embodiment of the third aspect of the invention, there is provided a chlorinated vinyl chloride resin pipe having a Vicat softening temperature of not lower than 155° C. as determined under a load of 1 kgf by the method according to JIS K 7206 and a Charpy impact strength of not less than 10 kgf·cm/$cm^2$ as determined by the method according to JIS K 7111 (hereinafter referred to as "Invention III-5").

In a sixth mode of embodiment of the third aspect of the invention, there is provided a chlorinated vinyl chloride resin pipe having a Vicat softening temperature of not lower than 170° C. as determined under a load of 1 kgf by the method according to JIS K 7206 and a Charpy impact strength of not less than 10 kgf·cm/$cm^2$ as determined by the method according to JIS K 7111 (hereinafter referred to as "Invention III-6").

In a seventh mode of embodiment of the third aspect of the invention, there is provided a chlorinated vinyl chloride resin pipe having a Vicat softening temperature of not lower than 145° C. as determined under a load of 1 kgf by the method according to JIS K 7206 and a Charpy impact strength of not less than 20 kgf·cm/$cm^2$ as determined by the method according to JIS K 7111 (hereinafter referred to as "Invention III-7").

In an eighth mode of embodiment of the third aspect of the invention, there is provided a chlorinated vinyl chloride resin pipe having a Vicat softening temperature of not lower than 155° C. as determined under a load of 1 kgf by the method according to JIS K 7206 and a Charpy impact strength of not less than 20 kgf·cm/$cm^2$ as determined by the method according to JIS K 7111 (hereinafter referred to as "Invention III-8").

In a ninth mode of embodiment of the third aspect of the invention, there is provided a chlorinated vinyl chloride resin pipe having a Vicat softening temperature of not lower than 170° C. as determined under a load of 1 kgf by the method according to JIS K 7206 and a Charpy impact strength of not less than 20 kgf·cm/$cm^2$ as determined by the method according to JIS K 7111 (hereinafter referred to as "Invention III-9").

In a tenth mode of embodiment of the third aspect of the invention, there is provided a chlorinated vinyl chloride resin joint having a Vicat softening temperature of not lower than 145° C. as determined under a load of 1 kgf by the method according to JIS K 7206 (hereinafter referred to as "Invention III-10")

In an eleventh mode of embodiment of the third aspect of the invention, there is provided a chlorinated vinyl chloride resin joint having a Vicat'softening temperature of not lower than 155° C. as determined under a load of 1 kgf by the method according to JIS K 7206 (hereinafter referred to as "Invention III-11").

In a twelfth mode of embodiment of the third aspect of the invention, there is provided a chlorinated vinyl chloride resin joint having a Vicat softening temperature of not lower than 170° C. as determined under a load of 1 kgf by the method according to JIS K 7206 (hereinafter referred to as "Invention III-12").

In a thirteenth mode of embodiment of the third aspect of the invention, there is provided a chlorinated vinyl chloride resin joint having a Vicat softening temperature of not lower than 145° C. as determined under a load of 1 kgf by the method according to JIS K 7206 and a Charpy impact strength of not less than 10 kgf·cm/$cm^2$ as determined by the method according to JIS K 7111 (hereinafter referred to as "Invention III-13").

In a fourteenth mode of embodiment of the third aspect of the invention, there is provided a chlorinated vinyl chloride resin joint having a Vicat softening temperature not lower than 155° C. as determined under a load of 1 kgf by the method according to JIS K 7206 and a Charpy impact strength of not less than 10 kgf·cm/$cm^2$ as determined by the method according to JIS K 7111 (hereinafter referred to as "Invention III-14").

In a fifteenth mode of embodiment of the third aspect of the invention, there is provided a chlorinated vinyl chloride resin joint having a Vicat softening temperature of not lower than 170° C. as determined under a load of 1 kgf by the method according to JIS K 7206 and a Charpy impact strength of not less than 10 kgf·cm/$cm^2$ as determined by the method according to JIS K 7111 (hereinafter referred to as "Invention III-15").

In a sixteenth mode of embodiment of the third aspect of the invention, there is provided a chlorinated vinyl chloride resin joint having a Vicat softening temperature of not lower than 145° C. as determined under a load of 1 kgf by the method according to JIS K 7206 and a Charpy impact strength of not less than 20 kgf·cm/cm$^2$ as determined by the method according to JIS K 7111 (hereinafter referred to as "Invention III-16").

In a seventeenth mode of embodiment of the third aspect of the invention, there is provided a chlorinated vinyl chloride resin joint having a Vicat softening temperature of not lower than 155° C. as determined under a load of 1 kgf by the method according to JIS K 7206 and a Charpy impact strength of not less than 20 kgf·cm/cm$^2$ as determined by the method according to JIS K 7111 (hereinafter referred to as "Invention III-17").

In an eighteenth mode of embodiment of the third aspect of the invention, there is provided a chlorinated vinyl chloride resin joint having a Vicat softening temperature of not lower than 170° C. as determined under a load of 1 kgf by the method according to JIS K 7206 and a Charpy impact strength of not less than 20 kgf·cm/cm$^2$ as determined by the method according to JIS K 7111 (hereinafter referred to as "Invention III-18").

In a nineteenth mode of embodiment of the third aspect of the invention, there Is provided a chlorinated vinyl chloride resin plate having a Vicat softening temperature of not lower than 145° C. as determined under a load of 1 kgf by the method according to JIS K 7206 (hereinafter referred to as "Invention III-19")

In a twentieth mode of embodiment of the third aspect of the invention, there is provided a chlorinated vinyl chloride resin plate having a Vicat softening temperature of not lower than 155° C. as determined under a load of 1 kgf by the method according to JIS K 7206 (hereinafter referred to as "Invention III-20").

In a twenty-first mode of embodiment of the third aspect of the invention, there is provided a chlorinated vinyl chloride resin plate having a Vicat softening temperature of not lower than 170° C. as determined under a load of 1 kgf by the method according to JIS K 7206 (hereinafter referred to as "Invention III-21").

In a twenty-second mode of embodiment of the third aspect of the invention, there is provided a chlorinated vinyl chloride resin plate having a Vicat-softening temperature of not lower than 145° C. as determined under a load of 1 kgf by the method according to JIS K 7206 and a Charpy impact strength of not less than 10 kgf·cm/cm$^2$ as determined by the method according to JIS K 7111 (hereinafter referred to as "Invention III-22").

In a twenty-third mode of embodiment of the third aspect of the invention, there is provided a chlorinated vinyl chloride resin plate having a Vicat softening temperature of not lower than 155° C. as determined under a load of 1 kgf by the method according to JIS K 7206 and a Charpy impact strength of not less than 10 kgf·cm/cm$^2$ as determined by the method according to JIS K 7111 (hereinafter referred to as "Invention III-23").

In a twenty-fourth mode of embodiment of the third aspect of the invention, there is provided a chlorinated vinyl chloride resin plate having a Vicat softening temperature of not lower than 170° C. as determined under a load of 1 kgf by the method according to JIS K 7206 and a Charpy impact strength of not less than 10 kgf·cm/cm$^2$ as determined by the method according to JIS K 7111 (hereinafter referred to as "Invention III-24").

In a fourth aspect, the invention provides a heat-resistant vinyl chloride resin molding and a heat-resistant vinyl chloride resin pipe.

In a first mode of embodiment of the fourth aspect of the invention, there is provided a heat-resistant vinyl chloride resin molding having a heat resistance temperature of not lower than 125° C. and a surface roughness Rmax of not more than 0.5 μm (hereinafter referred to as "Invention IV-1").

In a second-mode of embodiment of the fourth aspect of the invention, there is provided a heat-resistant vinyl chloride resin molding according to Invention IV-1
having a decomposition time of not shorter than 30 minutes as determined in an oven at 200° C. (hereinafter referred to as "Invention IV-2").

In a third mode of embodiment of the fourth aspect of the invention, there is provided a heat-resistant vinyl chloride resin pipe
having a heat resistance temperature of not lower than 125° C. and a surface roughness Rmax of not more than 0.5 μm (hereinafter referred to as "Invention. IV-3").

In a fourth mode of embodiment of the fourth aspect of the invention, there is provided a heat-resistant vinyl chloride resin pipe according to Invention IV-3
having a decomposition time of not shorter than 30 minutes as determined in an oven at 200° C. (hereinafter referred to as "Invention IV-4").

In a fifth mode of embodiment of the fourth aspect of the invention, there is provided a heat-resistant vinyl chloride resin pipe obtainable by molding a heat-resistant vinyl chloride resin,
said heat-resistant vinyl chloride resin being obtained by chlorination of a vinyl chloride resin having a viscosity average degree of polymerization of 900 to 1,100 to a chlorine content of 66.0 to 67.5% by weight (hereinafter referred to as "Invention IV-5").

In a sixth mode of embodiment of the fourth aspect of the invention, there is provided a heat-resistant vinyl chloride resin pipe according to Invention IV-3, Invention IV-4 or Invention IV-5 which is to serve as a piping material for pure water distribution (hereinafter referred to as "Invention IV-6").

DISCLOSURE OF THE INVENTION

In the following, the invention is described in-detail.

In the present specification, the terms "chlorine content" and "degree of chlorination" are to be construed as synonymous, the terms "PVC", "PVC resin" and "vinyl chloride resin" are to be construed as synonymous, and the terms "CPVC", "CPVC resin" and "chlorinated vinyl chloride resin" are to be construed as synonymous.

In the present specification, the expression "60–772% by weight", when used with respect to the chlorine content, means "not less than 60% by weight but less than 72% by weight".

The first aspect of the invention is first described in detail.

With those chlorinated vinyl chloride resins produced by chlorinating conventional vinyl chloride resins, no attention has been paid to the surface condition and interior condition of vinyl chloride particles in vinyl chloride resin chlorination and, accordingly, no attention has been paid to the distribution of chlorination in the chlorinated vinyl chloride resin obtained. The present invention provides a chlorinated vinyl chloride resin having good gelation properties and heat resistance by paying due attention to the surface condition and interior condition of vinyl chloride particles and further to the distribution of chlorination in the chlorinated vinyl chloride resin to be obtained.

The PVC resin of the invention is a resin produced by polymerizing, by a method known in the art, monomeric vinyl chlorine alone or a mixture of monomeric vinyl chloride and another or other monomers copolymerizable with monomeric vinyl chloride. The other monomers copolymerizable with monomeric vinyl chloride are not particularly restricted but include, among others, alkyl vinyl esters such as vinyl acetate; α-monoolefins such as ethylene and propylene; vinylidene chloride; styrene and the like. These may be used singly or two or more of them may be used in combination.

The average degree of polymerization of the above PVC resin is not critical but may be within the conventional range of 400 to 3,000.

The PVC resin of the invention has a BET specific surface area of 1.3 to 8 $m^2/g$. When it is less than 1.3 $m^2/g$, the number of micropores not greater than 0.1 μm in the interior of PVC resin particles is not sufficient for the chlorination to proceed uniformly in the step of chlorination, so that the heat resistance of the product CPVC resin is not improved. When it is in excess of 8 $m^2/g$, the heat resistance of PVC resin particles themselves decreases. Hence, the above range is critical, and 2 to 6 $m^2/g$ is preferred.

The carbon element-chlorine element IS bond energy (eV) peak ratio [(chlorine element peak)×2/carbon element peak] as found in particle surface analysis by electron spectroscopy for chemical analysis (ESCA) of the PVC resin of the invention is in excess of 0.6. When it is 0.6 or below, the ready gelling properties of the PVC resin itself may be impaired and/or problems may arise with respect to the moldability/fabricability of the product CPVC resin, presumably due to adsorption of a dispersant and/or like additive on the surface of PVC resin particles. Further, the rate of chlorination becomes slow at the late stage of chlorination. The above range is thus critical. Preferably, it is above 0.7.

Among PVC resins the above-defined peak ratio of which is above 0.6, there exist PVC resin small in outer covering (referred to as "skin") area on the surface of a PVC resin particles with the fine structure of the interior thereof (primary particles) being exposed (such resin is referred to as "skinless PVC resin"). At the same energy ratio, a skinless PVC resin is preferably used.

The element occurrence ratio in the chemical structure of the PVC resin of the invention is chlorine element:carbon element =1:2 (without considering the terminal structure and branching) and the above-mentioned peak ratio (chlorine element peak ×2/carbon element peak) at the 1S bond energy value (eV) has a value of 0 to 1. The peak ratio value of 0 means that the surface of vinyl chloride resin particles is covered with some chlorine-free substance other than a vinyl chloride resin, while the peak ratio value of 1 means that the surface of PVC resin particles is wholly covered with vinyl chloride components alone.

The PVC resin of the invention has a void ratio of 27 to 40% by volume relative to the volume of PVC resin particles as determined by mercury porosimetry at a pressure of 2,000 $kg/cm^2$. When it is less than 27% by volume, chlorine cannot diffuse into resin voids to a sufficient extent during the chlorination reaction, hence the chlorination degree distribution becomes excessive, resulting in poor moldability/fabricability. There is another drawback, namely a prolonged chlorination reaction time is required. When it is above 40% by volume, the biting of the screw becomes worse in the step of molding and poor gelation results. The void ratio is thus restricted to the above range and preferably is 30 to 37% by volume.

The PVC resin of the invention has an average pore size of 0.1 to. 0.5 μm. When it is less than 0.1 μm, gaps are too narrow to achieve the desired improvement in high-level filling of inorganic materials, for instance, and, in the chlorination reaction, the gaps will not effectively serve in the chlorination reaction, namely chlorine cannot diffuse to a sufficient extent but the chlorination distribution within resin particles becomes excessively uneven, with the result that the CPVC obtained has poor heat resistance and a prolonged time is required for the chlorination reaction. When it is in excess of 0.5 μm, the dispersibility of inorganic materials, among others, cannot be improved. Further, in the chlorination reaction, chlorine cannot diffuse throughout PVC resin particles but the chlorination distribution within resin particles becomes excessively uneven, hence the CPVC resin obtained has poor heat resistance.

The average pore size referred to above is a numerical value to be measured for more quantitatively defining the voids in PVC resin particles. It can be measured by mercury porosimetry within the pressure range of 0 to 2,000 $kg/cm^2$. Since the void pore size in resin particles is a function of the pressure of mercury for filling void pores with the resin, the volume distribution of void pore sizes can be measured by continuously measuring the filling pressure and mercury weight. The average pore size in question can be calculated from the void pore size distribution measured in that manner.

For the above PVC resin, the volume percentage (A1) of voids 0.001 to 0.1 μm in size relative to the total void volume in the pore volume distribution measured by mercury porosimetry within the pressure range of 0 to 2,000 $kg/cm^2$ is preferably 2 to 10% by volume, although it is not particularly restricted.

When the void volume percentage (A1) for the range of 0.001 to 0.1 μm is less than 2% by volume based on the total void volume, the proportion of microporous voids which resin particles have becomes decreased and the diffusion of chlorine may not be effected in a balanced manner in some instances. Thus, the diffusion of chlorine into those regions in the interior of resin particles where the void pore size is small may not proceed smoothly and the chlorination degree distribution within resin particles may become too large accordingly. When it is in excess of 10% by volume, the diffusion of chlorine into those regions in the interior of particles where the void pore size is small may proceed excessively, the chlorine supply itself cannot catch up with the diffusion and, as a result, the chlorination degree distribution within resin particles may become excessive, too. A more preferred range is 3 to 7% by volume.

The PVC resin of the invention can be obtained, for example, by suspension polymerization in an aqueous medium containing partially saponified polyvinyl acetate with a high saponification degree (60 to 90 mole percent) or low saponification degree (20 to 60 mole percent), or both, a higher fatty acid ester or the like as the dispersant, and an anionic emulsifier, a nonionic emulsifier or the like as the emulsifier.

The polymerizer (pressure-resistantautoclave) which can be used in producing the above PVC resin by polymerization is not particularly restricted in shape and structure but may be any of those conventionally used in PVC resin polymerization, for instance. The agitating blades are not particularly restricted but include those in general use, such as Pfaudler blades, paddle blades, turbine blades, fan turbine blades and bull margin blades, among others. Pfaudler blades are judiciously used, however, and the combined use of baffle plates is not particularly restricted.

Upon chlorination, the PVC resin of the invention can give CPVC resins excellent in gelation properties and heat resistance.

The chlorinated vinyl chloride resin of Invention I-2 preferably satisfies the following relations (1) and (2):

$$-3.9X+300 \geq Y \geq -3.9X+290 \quad (1)$$

$$-3.2X+280 \geq Z \geq -3.2X+270 \quad (2)$$

wherein X is the chlorine content (% by weight) of the chlorinated vinyl chloride resin, Y is the amount (g) of methyl alcohol required for initiating precipitation of the chlorinated vinyl chloride resin when 3.0 g of the resin is completely dissolved in 60 g of tetrahydrofuran at 20° C. and then methyl alcohol is gradually added to the solution to thereby cause precipitation of the resin, and Z is the amount (g) of methyl alcohol required to cause 80% by weight of the resin to precipitate.

With the addition of methyl alcohol after complete dissolution of the chlorinated vinyl chloride resin in tetrahydrofuran, that fraction of the chlorinated vinyl chloride resin dissolved which is high in chlorination percentage begins to precipitate out. The above defined Y (amount of methyl alcohol required for initiating precipitation of the chlorinated vinyl chloride resin) is an indicator showing the occurrence of a high chlorination percentage resin fraction, and Z (total amount of methyl alcohol required to cause 80% by weight of the chlorinated vinyl chloride resin to precipitate) is an indicator showing the occurrence of a low chlorination percentage resin fraction. The chlorinated vinyl chloride resin satisfying the above relations (1) and (2) has excellent gelation properties, namely good workability, and high heat resistance.

For the chlorinated vinyl chloride resin according to Invention 1-3, the average diameter of agglomerates each resulting from agglomeration of primary particles of the vinyl chloride resin is 1 to 7 $\mu$m.

When it is less than 1 $\mu$m, the scale adhesion to the polymerizer wall increases and produces an increased amount of a finer resin powder fraction in the step of chlorinated vinyl chloride resin production, causing troubles in handling. When it is greater than 7 $\mu$m, the diffusion of chlorine in the step of chlorination suddenly slows down and the diffusion becomes a rate-determining step for the chlorination reaction, so that the chlorination degree distribution becomes too broad and the chlorinated vinyl chloride resin obtained can no more be expected to have an improved level of heat resistance. Furthermore, much energy is required for disintegrating agglomerate particles, hence the gelation properties of the chlorinated vinyl chloride resin cannot be improved. The above range is thus critical. A preferred range is 1.5 to 5 $\mu$m. The agglomerate diameter can be measured by observation under a commercial transmission electron microscope and photography, for instance.

It is generally known that vinyl chloride resin particles have similar hierarchic structures ("Polyvinyl Chloride Resins —Fundamentals and Applications", pages 214–218, edited by Kinki Chemical Society Vinyl Section, published 1988 by Nikkan Kogyo Shimbunsha) The above agglomerates belong to the above hierarchic structures and each is a mass of primary particles collected together by weak bonding.

The vinyl chloride resin having the above-mentioned BET specific surface area, IS bond energy (eV) peak ratio and average agglomerate diameter can be obtained, for example by suspension polymerization in an aqueous medium containing high saponification degree (60 to 90 mole percent) polyvinyl acetate or low saponification degree (20 to 60 mole percent) polyvinyl acetate, or both, a higher fatty acid ester or the like as the dispersant, and an anionic emulsifier, nonionic emulsifier or the like as the emulsifier.

The PVC resin to be used in the production of the CPVC resin according to.Invention I-6 has a BET specific surface area of 1.3 to 8 m$^2$/g, a carbon element-chlorine element 1S bond energy (eV) peak ratio [(chlorine element peak)×2/ carbon element peak] of higher than 0.6 as determined by particle surface analysis by electron spectroscopy for chemical analysis and a void ratio of 27 to 40% by volume as determined by mercury porosimetry at the pressure 2,000 kg/cm$^2$. Suited for use as such PVC resin is the PVC resin according to Invention I-5.

The CPVC resin according to Invention I-6 is produced by chlorinating the above PVC resin. For the CPVC resin, the percentage by volume (A2) of voids 0.001 to 0.1 gm in size to the total volume of voids of the CPVC resin is 2 to 30% by volume in the pore volume distribution determined by mercury porosimetry in the pressure range of 0 to 2,000 kg/cm$^2$. When it is less than 5% by volume, the frictional heat generation by shearing in the interior of particles takes place with difficulty, hence the gelation state in the step of molding is insufficient. When it is in excess of 30%, violent local heat generation occurs and unfavorably causes decomposition in the step of molding. Preferably, it is 10 to 25% by volume, more preferably 3 to 15% by volume.

It is preferred that the percentage of voids 0.001 to 0.1 $\mu$m in size (A2) of the above CPVC resin and the percentage of voids 0.001 to 0.1 $\mu$m in size (A1) of the PVC resin satisfy the following relation (1):

$$(A1) \times 2 \leq (A2) \quad (1).$$

When the percentage of voids 0.001 to 0.1 $\mu$m in size (A2) of the above CPVC resin does not satisfy the above relation (1) the moldability of the CPVC resin may fail to reach a required level in certain instances.

The method of chlorinating the PVC resin used in accordance with the invention is not particularly restricted. It is necessary, however, to maintain the porosity and high void content of the PVC resin and, therefore, the chlorination is preferably effected by contacting chlorine with the above PVC resin in a suspended state. In carrying out the chlorination in a suspended state, it is also possible to effect the chlorination by blowing chlorine directly into the very suspension, without separating the PVC resin obtained by suspension polymerization from the aqueous medium.

The above chlorination in a suspended state can be carried out, for example, in the manner of photochemical chlorination by irradiating the reaction product with light, or can be carried out by exciting resin bonds and/or chlorine by heating. The source of light for causing chlorination by light energy is not particularly restricted but mention may be made of ultraviolet rays, and visible light from a mercury vapor lamp, arc lamp, incandescent lamp, fluorescent lamp or carbon arc, for instance. In particular, ultraviolet rays are effective. The method of heating for causing chlorination by thermal energy is not particularly restricted but mention may be made of exterior jacket heating through the reactor wall, internal jacket heating and heating by blowing steam into the reactor, among others. Generally, the exterior jacket system or internal jacket system is effective.

Among the chlorination methods mentioned above, the one comprising resin bond and/or chlorine excitation by thermal energy to thereby promote the chlorination is preferred. The reason is as follows. The matters of special concern in the present invention are the void ratio and pore distribution of the resin particles, in particular the distribution of voids occurring within the particles in a three-dimensional hierarchic manner. For attaining uniform chlorination, it is necessary to attain uniformity in chlorine diffusion as well as in chlorination reaction. While thermal energy acts uniformly to the inside of particles, light irradiation energy acts only on the surface of resin particles, with the result that the chlorination reaction necessarily proceeds predominantly on the surface of resin particles. Therefore, for realizing the chlorination reaction uniformly with respect to both diffusion and reaction, it is preferably to carry out the chlorination reaction by utilizing thermal energy.

When the above chlorination is effected by means of heating, the reaction is preferably carried out at 70 to 135° C. When the reaction is carried out at above 135° C., the hierarchic structure of the interior of particles swells and softens and pores are filled up at the early stage of reaction and, therefore, the resin after chlorination will have poor moldability/fabricability. At below 70° C., the rate of reaction becomes slow. For increasing the rate of reaction, it is necessary to add a larger amount of an organic catalyst. However, this worsens the heat stability of the CPVC resin obtained, hence is undesirable from the moldability/fabricability viewpoint. A more preferred temperature is within the range of 90 to 125° C.

The aqueous medium to be used in the above chlorination in a suspended state may contain a small amount of a ketone such as acetone or methyl ethyl ketone and further, necessary, a small amount of a chlorine-containing solvent such as hydrochloric acid, trichloroethylene and carbon tetrachloride may be added.

In the above chlorination step, the chlorine content of the product CPVC resin is preferably adjusted to 60 to 72% by weight.

The PVC resin of the invention and the CPVC resin of the invention can be hot-blended or cold-blended with appropriate amounts of additives such as an shock resistance improver, heat stabilizer, auxiliary stabilizer, lubricant, processing aid, filler, pigment, plasticizer and/or the like, using a Henschel mixer, ribbon mixer or Banbury mixer, for instance.

The above shock resistance improver is not particularly restricted but may be any of those known in the art. For example, a copolymer having rubber-like properties are suited for use. The copolymer having rubber-like properties is not particularly restricted but includes, among others, ethylene-vinyl acetate copolymers (EVA), chlorinated polyethylene (CPE), acrylonitrile-butadiene-styrene copolymers (ABS), methyl methacrylate-butadiene-styrene copolymers (MBS), ethylene-propylene copolymers (EPR), ethylene-propylene-diene monomer copolymers (EPDM) and acrylonitrile-butadiene copolymers (NBR). Among these, methyl methacrylate-butadiene-styrene copolymers (MBS) and chlorinated polyethylene. (CPE) are preferred.

The above methyl methacrylate-butadiene-styrene copolymers (MBS) may be commercial ones. From the shock resistance improvement viewpoint, however, those-having a butadiene content of 30 to 60% by weight are preferred. The chlorinated polyethylene (CPE) may be a commercial product as well. From the shock resistance improvement viewpoint, however, one having a chlorine content of 30 to 50% by weight is preferred.

The above shock resistance improver is used at an addition amount appropriately selected according to the required level of shock resistance. Preferably, it is used in an amount of 1 to 70 parts by weight, more preferably 2 to 35 parts by weight, per 100 parts by weight of the PVC resin of the invention or the CPVC resin of the invention.

The above heat stabilizer is not particularly restricted but includes, among others, organotin compounds such as dimethyltin mercaptides, dibutyltin mercaptides, dibutyltin maleate, dibutyltin maleate polymer, dioctyltin maleate, dioctyltin maleate polymer, dibutyltin laurate and dibutyltin laurate polymer; lead compounds such as lead stearate, dibasic lead phosphite and tribasic lead sulfate; calcium-zinc stabilizers, barium-zinc stabilizers and barium-cadmium stabilizers.

The above auxiliary stabilizer is not particularly restricted but includes, among others, epoxi-dized soybean oil, epoxidized linseed oil, epoxidized tetrahydrophthalate, epoxidized polybutadiene and phosphate esters.

The above lubricant is not particularly restricted but includes, among others, montanic acid wax, paraffin wax, polyethylene wax, stearic acid, stearyl alcohol and butyl stearate.

The above processing aid is not particularly restricted but includes, among others, acrylic processing aids, which are alkyl acrylate/alkyl methacrylate copolymers having a weigh average molecular weight of 100,000 to 2,000,000, for example n-butyl acrylate/methyl methacrylate copolymers and 2-ethylhexyl acrylate/methyl methacrylate/butyl methacrylate copolymers.

The above filler is not particularly restricted but includes, among others, calcium carbonate and talc.

The above pigment is not particularly restricted but includes, among others, organic pigments such as azo, phthalocyanine and threne pigments and dye lakes; and inorganic pigments such as oxide type, molybdenum chromate type, sulfides-selenide type, and ferrocyanide type.

The above plasticizer is added for improving the moldability/fabricability. The plasticizer is not particularly restricted but includes, among others, dibutyl phthalate, di-2-ethylhexyl phthalate and di-2-ethylhexyl adipate.

The resin composition obtained by compounding the PVC resin of the invention or the CPVC resin of the invention with various ingredients can be molded by any of the conventional molding methods, for example by extrusion molding, calender molding, contour molding or press molding, to give moldings.

The technical core of the invention is based on the following findings. Thus, it is known in the art that PVC resin particles have similar hierarchic structures ("Polyvinyl Chloride Resins—Fundamentals and Applications", pages 214–18, edited by Kinki Chemical Society Vinyl Section, published 1988 by Nikkan Kogyo Shimbunsha). However, the art has no knowledge of the hierarchic structure of voids thereof.

As a result of intensive investigations, the present inventors found that the voids, too, can have a hierarchic structure. In particular, the hierarchic structure of the voids was found markedly when the BET specific surface area is within the range of 1.3 to 8 $m^2/g$ and the peak ratio found by ESCA is in excess of 0.6. Based on this finding, it was found that a specific void ratio range and a specific average pore size range are best suited. Although no adequate means are available to evaluate and analyze the actual progress of the chlorination reaction and the chlorination degree distribution, those CPVC resins obtained by chlorinating such a PVC resin show good characteristics when evaluated for heat resistance (Vicat softening temperature), workability (gelling temperature) and heat stability and, therefore, the chlorination degree distribution is within a preferred range.

In other words, the present invention presents those structural factors of a PVC resin which make it possible for chlorine to diffuse neither excessively nor insufficiently from the circumference to the central part of particles in the chlorination reaction.

The CPVC resin of the invention is intended to be improved in heat resistance by chlorination of a PVC resin and, at the same time, is intended to be improved in moldability/fabricability by causing both the PVC resin and the CPVC resin obtained after chlorination to have particular intraparticle structure characteristics. Furthermore, it was found that when the void volume (A1) of pores having a pore size of 0.001 to 0.1 μm in the pore distribution of the PVC resin is within the range of 2 to 10% by volume, the pore volume in the pore distribution range of 0.001 to 0.1 μm in pore size is more increased. This finding has now led to completion of Invention I-8. This noteworthy phenomenon is presumably related with the specific surface area of the PVC resin and the particle structure specified by ESCA.

In the following, the eleventh mode of embodiment of the invention in accordance with the first aspect thereof (Invention I-11) and the further modes of embodiment of the invention are described in further detail.

The PVC to be used in the production of the CPVC of the invention is preferably the PVC obtained by the production method described in Japanese Kokai Publication Hei-08-120007, Japanese Kokai Publication Hei-08-295701, Japanese Kokai Publication Hei-09-132612 or Japanese Kokai Publication Hei-09-227607.

The present invention is defined by a chlorine content, a void ratio and a void volume for pores of 0.001 to 0.1 μm, each specified above.

The CPVC of the invention has a chlorine content of 60 to 72% by weight. In the present specification, the expression "60 to 72% by weight" means that the content is not less than 60% by weight but less than 72% by weight. When the chlorine content is less than 60% by weight, the improvement in heat resistanceis unsatisfactory. When it is 72% by weight or above, the molding becomes difficult and the gelation becomes insufficient. A preferred range is 63 to 70% by weight.

The CPVC of the invention has a void ratio of 30 to 40% by volume. The void ratio is the one measured by mercury porosimetry at the pressure 2,000 kg/cm$^2$. When the void ratio is less than 30%, the gelation is retarded in the step of molding, which is undesirable from the moidability/fabricability viewpoint. When it exceeds 40% by volume, the biting by the screw becomes insufficient and poor gelation results. A preferred range is 31 to 38% by volume.

For the CPVC of the invention, the void volume for pores of 0.001 to 0.1 μm in the pore volume distribution determined by mercury porosimetry in the pressure range of 0 to 2,000 kg/cm$^2$ is 2 to 15% by volume relative to the total void volume. The void pore size in resin particles is a function of the pressure of mercury filled into void pores of the resin. Therefore, the pore size distribution can be determined by continuously measuring the filling pressure and mercury weight. When the void volume for the range 0.001 to 0.1 μm is less than 2% by volume relative to the total void volume, the proportion of micropores in the interior of particles is insufficient, hence the product is inferior in gelation propety in the step of molding. When it is above 15% by volume, the diffusion of chlorine in the step of chlorination cannot be effected in a balanced manner but the chlorination degree distribution within particles becomes excessive, hence no good heat stability can be attained. A preferred void volume for the range 0.001 to 0.1 μm is 3 to 13% by volume relative to the total void volume.

Invention I-12 is defined by a chlorine content, a void ratio and a BET specific surface area, each specified.

The chlorine content and void ratio of the CPVC of invention I-12 are as mentioned above for Invention I-11.

The CPVC of Invention I-12 has a BET specific surface area of 2 to 12 m$^2$/g. When the BET specific surface area is less than 2 m$^2$/g, the proportion of micropores in the interior of particles is insufficient, so that intraparticle melting becomes difficult to occur in the step of molding, hence the gelation performance gets worse. When the BET specific surface area is above 12 m$^2$/g, the generation of heat of friction from the inside occurs rapidly and the heat stability in the step of molding becomes decreased. A preferred BET specifics surface area is 3 to 10 m$^2$/g.

Invention I-13 is defined by a chlorine content, a void ratio, a void volume for 0.001 to 0.1 μm and an absorbance at 235 nm, each specified.

The chlorine content, void ratio and void volume for 0.001 to 0.1 μm of the CPVC according to Invention I-13 are the same as those according to Invention I-11.

The absorbance (cell length 1 cm, measuring temperature 23° C.) of a 1 g/kg tetrahydrofuran solution of the CPVC according to Invention I-13 is not more than 0.8 at the wavelength 235 nm. For the CPVC according to Invention I-13, the absorbance value is used for quantitating exotic structures in the molecular chain resulting from the chlorination reaction and is used as an indicator of heat stability. The absorbance is determined by measuring the ultraviolet absorption spectrum and reading the absorbance value at the wavelength 235 nm (cell length 1 cm, measuring temperature 23° C.) at which radiant energy is absorbed by the exotic structures —CH=CH—C(=O)— and —CH=CH—CH=CH— occurring in the CPVC. The reason why the absorbance should be not more than 0.8 is as follows. The chlorine atom bound to the carbon atom adjacent to the double bond is unstable and hydrogen chloride elimination occurs from that site, Thus, with the increase in absorbance value, the hydrogen chloride elimination becomes more and more ready to occur, hence the heat stability decreases. When the absorbance value exceeds 0.8, the influence of the exotic structures in the molecular chain increases, with the result that the heat stability becomes poor. A preferred value is not more than 0.2.

The method of chlorination by which the above-defined absorbance of the 1 g/kg tetrahydrofuran solution can be maintained at 0 to 0.8 is not particularly restricted but includes the thermal chlorination and photochlorination techniques, preferably the high temperature chlorination technique. The high heat stability obtainable by carrying out the reaction at a high temperature is attributable to the fact that the oxidation (formation of exotic structures, typically the carbonyl group) during the chlorination reaction becomes difficult to occur as the temperature rises (as the temperature rises, the reaction equilibrium shifts in the direction to suppression of their formation). Specifically, the reaction is carried out at a temperature within the range of 70 to 135° C., more preferably within the range of 90 to 125° C. At a reaction temperature lower than 70° C., the rate of the chlorination reaction is low and it becomes necessary to add a large amount of a reaction catalyst, typically a peroxide, for causing the reaction to proceed. As a result, the resin obtained is inferior in heat stability. In the case of photochlorination, when the reaction temperature is lower than 70° C., chlorine is readily soluble in water and oxygen is readily generated in the reaction vessel. As a result, the resin obtained shows inferior heat stability. At a reaction temperature exceeding 135° C., the resin is deteriorated by thermal energy and the CPVC obtained shows discoloration.

The CPVC according to Invention I-14 is defined by a chlorine content, a void ratio, a BET specific surface area and an absorbance at 235 nm, each specified.

The chlorine content, void ratio and BET specific surface area are the same as those according to Invention I-2, and the absorbance at 235 nm is the same as that according to Invention I-13.

The CPVC according to Invention I-15 is defined by a chlorine content, a void ratio, a void volume for 0.001 to 0.1 $\mu$m and an absorbance at 235 nm, each specified.

The chlorine content, void ratio and void volume for 0.001 to 0.1 $\mu$m are the same as those according to Invention I-13.

The absorbance at 235 nm of the CPVC according to Invention I-15 is not more than 0.2. When the absorbance at 235 nm is not more than 0.2, the CPVC shows particularly good heat stability.

The CPVC according to Invention I-16 is defined by a chlorine content, a void ratio, a BET specific surface area and an absorbance at 235 nm, each specified.

The chlorine content, void ratio and BET specific surface area are the same as those according to Invention I-14, and the absorbance at 235 nm is the same as that according to Invention I-15.

The CPVCs according to Invention I-11 to Invention I-18 can be produced, for example, by using the method of producing a chlorinated vinyl chloride resin according to the invention (Invention I-19 to Invention 1-21).

The CPVCs according to Invention I-17 and Invention I-18 satisfy the following relations (1) and (2):

$$-3.9X+305 \geq Y \geq -3.9X+300 \quad (1)$$

$$-3.2X+270 \geq Z \geq -3.2X+265 \quad (2)$$

wherein X is the chlorine content (% by weight) of the chlorinated vinyl chloride resin, Y is the amount (g) of methyl alcohol required for initiating precipitation of the chlorinated vinyl chloride resin when 3.0 g of the resin is completely dissolved in 60 g of tetrahydrofuran at 20° C. and then methyl alcohol is gradually added to the solution to thereby cause precipitation of the resin, and Z is the amount (g) of methyl alcohol required to cause 80% by weight of the resin to precipitate.

With the addition of methyl alcohol after complete dissolution of the CPVC in tetrahydrofuran, that fraction of the chlorinated vinyl chloride resin dissolved which is high in chlorination percentage begins to precipitate out. The above-defined Y (amount of methyl alcohol required for initiating precipitation of the chlorinated vinyl chloride resin) is an indicator showing the occurrence of a high chlorination percentage resin fraction, and Z (amount of methyl alcohol required to cause 80% by weight of the chlorinated vinyl chloride resin to precipitate) is an indicator showing the occurrence of a low chlorination percentage resin fraction. The CPVC satisfying the above relations (1) and (2) is narrow in chlorination degree distribution (uniformly chlorinated until the core of particles) and has high heat resistance.

As the method of chlorination for obtaining CPVCs satisfying the above relations (1) and (2), there may be mentioned the method comprising carrying out the heat chlorination reaction at a high temperature. The reason why uniform chlorination within particles can be attained by the high temperature reaction is that the rate of diffusion is a function of temperature and the diffusion of chlorine into the interior of particles readily occurs at elevated temperatures. Specifically, the chlorination reaction is carried out at a temperature within the range of 120 to 135° C. At a reaction temperature below 120° C., the diffusion of chlorine into the interior of particles is not sufficient, hence the above relations (1) and (2) cannot be satisfied. The chlorination degree distribution in the interior of particles is broad and, as a result, the resin obtained is inferior in heat stability. At a reaction temperature exceeding 135° C., the resin is deteriorated by thermal energy and the resin obtained shows discoloration.

The PVC to be used in the method of producing a chlorinated vinyl chloride resin according to Invention I-19 is a resin produced by polymerizing VCM alone or a mixture of VCM and another monomer or other monomers copolymerizable with VCM by a method known in the art. The other monomers copolymerizable with VCM are not particularly restricted but include, for example, alkyl vinyl esters such as vinyl acetate; $\alpha$-monoolefins such as ethylene and propylene; vinylidene chloride; styrene; and the like. These may be used singly or two or more of them may be used combinedly.

The average degree of polymerization of the above PVC is not particularly restricted but may be 400 to 3,000, which is conventionally employed.

The PVC to be used in the practice of Invention I-19 has a BET specific surface area of 1.3 to 8 m$^2$/g. When the specific surface area is smaller than 1.3 m$^2$/g, the proportion of micropores not larger than 0.1 $\mu$m in the interior of PVC particles becomes small, so that uniform chlorination cannot be attained and the heat stability will not be improved. Further, the rate of gelation is slow and this is undesirable from the molding viewpoint. When the specific surface area is greater than 8 m$^2$/g, the heat stability of prechlorination PVC particles themselves is low and the CPVC obtained is poor in workability. A preferred range is 1.5 to 5 m$^2$/g.

For the above PVC, the carbon element-chlorine element 1S bond energy (eV) peak ratio (chlorine element peak×2/carbon element peak) as found by particle surface analysis by ESCA (electron spectroscopy for chemical analysis) should be above 0.6. When it is not more than 0.6, an additive, such as a dispersant, presumably remain adsorbed on the surface of PVC particles and, therefore, not only the rate of chlorination in the succeeding step becomes slow but also the CPVC obtained raises a moldability/fabricability problem and further has inferior heat stability. A peak ratio exceeding 0.7 is preferred.

Among PVCs for which the above, peak ratio is above 0.6, there are skinless PVCs whose skin area on the surface of PVC particles is small. When the energy ratio is the same, the use of a skinless PVC is preferred.

The element occurrence ratio in the chemical structure of the above PVC resin is chlorine element:carbon element=1:2 (without considering the terminal structure and branching) and the above-mentioned peak ratio (chlorine element peak× 2/carbon element peak) at the 1S bond energy value (eV) has a value of 0 to 1. The peak ratio value of 0 means that the surface of PVC particles is covered with some chlorine-free substance other than PVC, while the peak ratio value of 1 means that the surface of PVC resin particles is wholly covered with vinyl chloride components alone.

Those PVCs having the above-specified BET specific surface area and 1S bond energy value (eV) peak ratio can be obtained, for example, by aqueous suspension polymerization using a high saponification degree (60 to 90 mole percent) or low saponification degree (20 to 60 mole percent) polyvinyl acetate or both, a higher fatty acid ester or the like as the dispersant and an anionic emulsifier, a nonionic emulsifier or the like as the emulsifier.

The polymerizer (pressure-resistant autoclave) which can be used in producing the above PVC according to Invention I-19 by polymerization is not particularly restricted in shape and structure but may be any of those conventionally used in PVC polymerization, for instance. The agitating blades are not particularly restricted but include those in general use, such as Pfaudler blades, paddle blades, turbine blades, fan turbine blades and bull margin blades, among others. Pfaudler blades are judiciously used, however, and the combined use of baffle plates is not particularly restricted.

In chlorinating the above PVC, the PVC is suspended in an aqueous medium and liquid chlorine or gaseous chlorine is introduced into the reactor. The chlorination reaction is carried out at, a temperature within the range of 70 to 135° C.

The chlorination reactor to be used in the practice of Invention I-19 may be a glass-lined stainless steel reactor or any of those in common use, for example a titanium reactor.

In the practice of Invention I-19, the chlorination is effected by suspending the PVC in an aqueous medium and introducing liquid or gaseous chlorine thereinto, namely by feeding a chlorine source into the chlorination reactor. From the process viewpoint, the introduction of liquid chlorine is efficient. As regards the chlorine supplement during reaction for adjusting the pressure or with the progress of the chlorination reaction, it is also possible to feed an adequate amount of gaseous chlorine by blowing, if necessary together with liquid chlorine.

The method of preparing the above suspended PVC is not particularly restricted but a cake-form post polymerization PVC after monomer removal treatment may be used or a PVC once dried may be again suspended in an aqueous medium, or a suspension resulting from removal of substances unfavorable to the chlorination reaction from the polymerization system may be used. It is preferable, however, to use the cake-like postpolymerization PVC after monomer removal treatment.

The amount of the aqueous medium to be charged into the reactor is not particularly restricted but, generally, the medium is charged in an amount of 2 to 10 times (by weight) the weight of PVC.

The method of effecting the chlorination in the above suspended state is not particularly restricted but, for example, mention may be made of the method comprising exciting resin bonds or chlorine by heating for promoting the chlorination (hereinafter referred to as "thermal chlorination") and the method comprising photochemically promoting the chlorination by irradiation with light (hereinafter-referred to as "photo-chlorination"), among others.

The method of heating for thermal chlorination is not particularly restricted but mention may be made, for example, of external jacket heating through the reactor wall, interior jacket heating and blowing steam into the reactor. Generally, the external jacket system or interior jacket system is effective. It is also possible to combined use thermal energy and light energy such as ultraviolet rays. In that case, however, an apparatus capable of ultraviolet irradiation under high-temperature and high-pressure conditions is required.

As regards the source of light for photo-chlorination, ultraviolet rays as well as visible light from a mercury lamp, arc lamp, candescent lamp, fluorescent lamp or carbon arc lamp or the like are suited for use and, in particular, ultraviolet rays are effective.

In the above chlorination process, the chlorine content of the product CPVC is preferably adjusted to 60 to 72% by weight, more preferably 63 to 70% by weight.

At a chlorine content less than 60% by weight, the heat resistance is poor and, at higher than 72% by weight, the gelation properties are inferior and this is disadvantageous in producing heat-resistant moldings.

The temperature for the above chlorination reaction is 70 to 135° C., preferably 90 to 125° C. At a reaction temperature below 70° C., the rate of the chlorination reaction is slow, hence it is necessary to add a large amount of a reaction catalyst, typically a peroxide, for causing the reaction to proceed. As a result, the resin obtained is inferior in heat stability. At a reaction temperature above 135° C., the resin is deteriorated by thermal energy and a discolored CPVC is obtained.

The chlorine to be used in the practice of the invention is not particularly restricted but, as described in Japanese Kokai Publication Hei-06-32822, the chlorine remaining after purging of 5 to 10% by weight of the cylinder chlorine is preferably used.

The gauge-pressure in the above reactor is not particularly restricted but, since a higher chlorine pressure causes ready penetration of chlorine into the interior of PVC particles, a pressure within the range of 0.3 to 2 MPa is preferred.

The CPVC according to the invention is first characterized by the structure of CPVC particles. Namely, by defining the interior porous state, a ready gelation tendency in the step of molding is secured. In the next place, by defining the exotic structure content in the CPVC molecular chain, high heat stability is secured. In this way, a resin having both high heat stability and ready gelation tendency is provided by the present invention.

In the production method of the invention, in the first place, the particle structure of the PVC has a characteristic feature. Namely, by defining the surface condition and interior porous state, a ready gelation tendency in the step of molding is developed. In the next place, by carrying out the high-temperature chlorination at a specified reaction temperature, high heat stability is developed. This high heat stability development by that high-temperature reaction is due to the fact that the oxidation (formation of exotic structures, typically the carbonyl group) hardly occurs at elevated temperatures (the reaction equilibrium shifts to the direction to suppression of the formation of such structures as the temperature rises). Thus, it becomes possible according to the invention to produce a resin having both high heat stability and ability to form a gel readily.

Then, the second aspect of the invention is described in detail.

The chlorinated vinyl chloride resin of the invention is a chlorinated vinyl chloride resin obtained by chlorinating a vinyl chloride resin and has a chlorine content of 72 to 76% by weight, a void ratio of 30 to 40% by volume as determined by mercury porosimetry at the pressure 2,000 kg/cm$^2$ and a volume percentage of voids 0.001 to 0.1 µm in size of 2 to 15% by volume relative to the total void volume in the pore volume distribution determined by mercury porosimetry in the pressure range of 0 to 2,000 kg/cm$^2$.

The CPVC of the invention is obtained by chlorinating a resin produced by polymerizing monomeric vinyl chloride (hereinafter referred to as "VCM") alone or a mixture of VCM and another monomer or other monomers copolymerizable with VCM by a method known in the art. The other monomers copolymerizable with VCM are not particularly restricted but include, for example, alkyl vinyl esters such as vinyl acetate; α-monoolefins such as ethylene and propylene; vinylidene chloride; styrene; and the like. These may be used singly or two or more may be used combinedly.

The CPVC of the invention has a chlorine content of 72 to 76% by weight. When the chlorine content is less than 72% by weight, it is difficult to fully attain the intended improvement in heat resistance, which should amount to 65 to 80° C. in terms of Vicat softening temperature, for instance, hence it becomes difficult to use the CPVC in those fields where higher heat resistance is required as compared with the group of currently available heat resistant products. When the chlorine content is higher than 76% by weight, molding becomes difficult and gelation becomes insufficient. Further, a higher amount of catalyst addition is required for increasing the reactivity and, as a result, the heat stability decreases. For attaining a balance between quality and productivity in commercial production, the upper limit to the chlorine content is 76% by weight. A preferred chlorine content is within the range of 72 to 74% by weight.

The CPVC of the invention has a void ratio of 30 to 40% by volume. The void ratio is determined by mercury porosimetry at the pressure 2,000 kg/cm$^2$. When the void ratio is less than 30% by volume, the gelation in the step of molding is slow and this is unfavorable to molding. When it is above 40% by volume, the biting by the screws in the step of molding becomes worse and the gelation properties are inferior. It is preferably 31 to 38% by volume.

The CPVC of the invention has a volume percentage of voids 0.001 to 0.1 $\mu$m in size of 2 to 15% by volume relative to the total void volume in the pore volume distribution determined by mercury porosimetry in the pressure range of 0 to.2,000 kg/cm$^2$. The void pore diameter in the interior of resin particles is a function of the pressure of mercury filled into void pores of the resin and, therefore, the pore size distribution can be determined by continuously measuring the mercury filling pressure and mercury weight. When the void volume for the range 0.001 to 0.1 $\mu$m is less than 2% by volume relative to the total void volume, the proportion of micropores in the interior of particles is insufficient and the gelation property in the step of molding is inferior. When it is above 15% by volume, the diffusion of chlorine in the step of chlorination is not effected in a balanced manner but the chlorination degree distribution in the interior of particles becomes excessive, giving no good heat stability. The void volume for the range 0.001 to 0.1 $\mu$m preferably amounts to 3 to 13% by volume of the total void volume.

The chlorinated vinyl chloride resin according to Invention II-2 is a chlorinated vinyl chloride resin obtained by chlorinating a vinyl chloride resin and has a chlorine content of 72 to 76% by volume, a void ratio of 30 to 40% by volume as determined by mercury porosimetry at the pressure 2,000 kg cm$^2$ and a BET specific surface area of 2 to 12 m$^2$/g.

The CPVC according to Invention II-2 has a BET specific surface area of 2 to 12 m$^2$/g. When the BET specific surface area is smaller than 2 m$^2$/g, the proportion of micropores in the interior of particles is insufficient and, in the step of molding, intraparticle melting becomes difficult to occur, resulting in inferior gelation property. When the BET specific surface area is larger than 12 m$^2$/g, the heat stability in the step of molding becomes poor due to abrupt frictional heat generation from the inside. A preferred BET specific surface area is 3 to 10 m$^2$/g.

The chlorinated vinyl chloride resin according to Invention II-3 is a CPVC according to Invention II-1 or Invention II-2 which, in particle surface analysis by ESCA (electron spectroscopy for chemical analysis), shows a carbon element-chlorine element 1S bond energy (eV) peak ratio (chlorine element peak/carbon element peak) of higher than 0.6 When the above peak ratio is not higher than 0.6, it is probable that an additive, such as a dispersant, remain adsorbed-on the surface of CPVC particles. This is unfavorable to molding/fabrication. The ratio is more preferably higher than 0.7.

Among CPVCs for which the above peak ratio is above 0.6, there are skinless CPVCs having a small skin area on the surface of CPVC particles.

When the chlorine content is 72% by weight, the element occurrence ratio for the chemical structure of the above CPVC is chlorine element:carbon element =1.89:2 (without considering terminal structures or branching) and, when the peak ratio at the above 1S bond energy value (eV) is 0.945, this means that the surface of CPVC particles is wholly covered with chlorinated vinyl chloride components alone.

CPVCs having the above-specified void ratio, pore distribution, BET specific surface area and 1S bond energy (eV) peak ratio are obtained by chlorinating a PVC produced by aqueous suspension polymerization using a high saponification degree (60 to 90 mole percent) or low saponification degree (20 to 60 mole percent) polyvinyl acetate or both, a higher fatty acid ester or the like as the dispersant and an anionic emulsifier, a nonionic emulsifier or the like as the emulsifier.

The method of producing the CPVC of the invention is not particularly restricted provided that a CPVC having the above-specified properties can be obtained. For example, mention may be made of the method according to the invention for producing chlorinated vinyl chloride resins, as mentioned below.

The method according to Invention II-4 for producing chlorinated vinyl chloride resins is a method of producing a chlorinated vinyl chloride resin by chlorinating a vinyl chloride resin wherein said vinyl chloride resin has a BET specific surface area of 1.3 to 8 m$^2$/g and a carbon element-chlorine element 1S bond energy (eV) peak ratio (chlorine element peak×2/carbon element peak) of higher than 0.6 as found by particle surface analysis by ESCA (electron spectroscopy for chemical analysis) and the chlorination reaction is carried out by introducing liquid-chlorine or gaseous chlorine into the reactor where the above vinyl chloride resin occurs in a state suspended in an aqueous medium and. effecting the chlorination at a temperature within the range of 70 to 135° C. until a chlorine content of 72 to 76% by weight is attained.

The PVC to be used in carrying out the production method according to Invention II-4 is are in produced by polymerizing, by a method known in the art, VCM alone or a mixture of VCM and another monomer or other monomers copolymerizable with VCM. The other monomers copolymerizable with VCM are not particularly restricted but include, for example, alkyl vinyl esters such as vinyl acetate; α-monoolefins such as ethylene and propylene; vinylidene chloride; styrene; and the like. These may be used singly or two or more of them may be used combinedly.

The average molecular weight of the above PVC is not particularly restricted but may be 400 to 3,000, as is conventional in the art.

The PVC to be used in the practice of Invention II-4 has a BET specific surface area of 1.3 to 8 m$^2$/g. When the specific surface area is smaller than 1.3 m$^2$/g, the proportion of micropores not larger than 0.1 $\mu$m in the interior of PVC particles becomes small, so that uniform chlorination cannot be attained and the heat stability will not be improved. Further, the rate of gelation is slow and this is undesirable from the molding viewpoint. When the specific surface area is greater than 8 m$^2$/g, the heat stability of prechlorination PVC particles themselves is low and the CPVC obtained is poor in workability. A preferred range is 1.5 to 5 m$^2$/g.

For the above PVC, the carbon element-chlorine element 1S bond energy (eV) peak ratio (chlorine element peak×2/ carbon element peak) as found by particle surface analysis by ESCA (electron spectroscopy for chemical analysis) should be above 0.6. When it is not more than 0.6, an additive, such as a dispersant, presumably remain adsorbed on the surface of PVC particles and, therefore, not only the rate of chlorination in the succeeding step becomes slow but also the CPVC obtained raises a moldability/fabricability problem and further has inferior heat stability. A peak ratio exceeding 0.7 is preferred.

Among PVCs for which the above peak ratio is above 0.6, there are skinless PVCs whose skin area on the surface of PVC particles is small. When the energy ratio is the same, the use of a skinless PVC is preferred.

The element occurrence ratio in the chemical structure of the above PVC resin is chlorine element:carbon element=1:2 (without considering the terminal structure and branching) and the above-mentioned peak ratio (chlorine element peak× 2/carbon element peak) at the 1S bond energy value (eV) has a value of 0 to 1. As already discussed referring to the first aspect of the invention, the peak ratio value of 0 means that the surface of PVC particles is covered with some chlorine-free substance other than PVC, while the peak ratio value of 1 means that the surface of PVC resin particles is wholly covered with vinyl chloride components alone.

Those PVCs having the above-mentioned BET specific surface area and 1S bond energy value (eV) peak ratio can be obtained, for example, by aqueous suspension polymerization using a high saponification degree (60 to 90 mole percent) or low saponification degree (20 to 60 mole percent) polyvinyl acetate or both, a higher fatty acid ester or the like as the dispersant and an anionic emulsifier, a nonionic emulsifier or the like as the emulsifier.

The polymerizer (pressure-resistant autoclave) which can be used in producing the above PVC according to Invention II-4 by polymerization is not particularly restricted in shape and structure but may be any of those described hereinabove referring to the first aspect of the invention.

In chlorinating the above PVC, the PVC is suspended in an aqueous medium and liquid chlorine or gaseous chlorine is introduced into the reactor. The chlorination reaction is carried out at a temperature within the range of 70 to 135° C. until the chlorine content of the resulting CPVC arrives at 72 to 76% by weight.

The chlorination reactor to be used in the practice of Invention II-4 is not particularly restricted in material but may be a glass-lined stainless steel reactor or any of those in common use, for example a titanium reactor.

In carrying out the chlorination according to Invention II-4, the PVC is suspended in an aqueous medium and liquid chlorine or gaseous chlorine is introduced thereinto, namely a chlorine source is fed to the chlorination reactor. From the process viewpoint, the introduction of liquid chlorine is efficient. As regards the chlorine supplement during reaction for adjusting the pressure or with the progress of the chlorination reaction, it is also possible to feed an adequate amount of gaseous chlorine by blowing, if necessary, together with liquid chlorine.

In the practice of Invention II-4, the method of preparing the PVC suspended in an aqueous medium is not particularly restricted but a cake-form postpolymerization PVC after monomer removal treatment may be used or a PVC once dried may be again suspended in an aqueous medium, or a suspension resulting from removal of substances undesirable for the chlorination reaction from the polymerization system may be used. It is preferable, however, to use the cake-like postpolymerization PVC after monomer removal treatment.

The amount of the aqueous medium to be charged into the reactor is not particularly restricted but, preferably, the medium is charged in an amount of 2 to 10 times (by weight) the weight of PVC.

In the practice of Invention II-4, the method of effecting the chlorination in the above suspended state is not particularly restricted but, for example, mention may be made of thermal chlorination and photo-chlorination, among others. Thermal chlorination is preferably employed, however.

In the above process of chlorination, the chlorine content of the resulting CPVC is adjusted to 72 to 76%, preferably 72 to 74% by weight. When the chlorine content is less than 72% by weight, it is difficult to fully attain the intended improvement in heat resistance, which should amount to 65 to 80° C. in terms of Vicat softening temperature, for instance, hence it becomes difficult to use the CPVC in those fields where higher heat resistance is required as compared with the group of currently available heat resistant products. When the chlorine content is higher than 76% by weight, molding becomes difficult and gelation becomes insufficient. Further, a higher amount of catalyst addition is required for increasing the reactivity and, as a result, the heat stability decreases. For attaining a balance between quality and productivity in commercial production, the upper limit to the chlorine content is 76% by weight. A preferred chlorine content is within the range of 72 to 74% by weight.

In the practice of Invention II-4, the temperature for the above chlorination reaction is 70 to 135° C., preferably 90 to 125° C. At a reaction temperature below 70° C., the rate of the chlorination reaction is slow, hence a long period of time is required for the reaction. Further, forcausing the reaction to proceed without light irradiation, it is necessary to add a large amount of a reaction catalyst, typically a peroxide and, as a result, the resin obtained is inferior in heat stability. At a reaction temperature above 135SC, the resin is deteriorated by thermal energy and a product CPVC is discolored.

The CPVC of the invention is characterized by its particle structure. While it is generally difficult to mold a CPVC having a chlorine content of 72% by weight or higher, it is possible according to the present invention to realize ready gelation tendency in the step of molding by causing CPVC particles to have a specific interior porous state and a specific particle surface state. In this way, a resin having both high heat resistance and ready gelation tendency is provided by the present invention.

In the production method of the invention, in the first place, the particle structure of the PVC has a characteristic feature. Namely, by providing a specific surface condition and interior porous state, the ready gelation tendency in the step of molding is increased. In the next place, the PVC chlorination is carried out at a specific high temperature and to a specified degree of chlorination. While molding generally becomes difficult at a chlorine content of 72% by weight or higher, it is possible according to Invention II-4 to attain ready gelation tendency in the step of molding by combining a structurally characterized PVC and a specific method of chlorination. Thus, it becomes possible according to the invention II-4 to produce a resin having both high heat resistance and ready gelation tendency.

Then, the third aspect of the invention is described in detail.

The CPVC pipe, CPVC joint and CPVC plate according to the present invention is characterized by having a Vicat softening temperature of not lower than 145° C. as determined under a load of 1 kgf by the method according to JIS K 7206.

The CPVC pipe according to Invention III-1 has a Vicat softening temperature of not lower than 145° C. as determined under a load of 1 kgf by the method according to JIS K 7206.

The Vicat softening temperature is an indicator of the heat resistance of pipes. Pipes having a Vicat softening temperature lower than 145° C. can hardly be used in the case that a liquid or gas having a temperature of 100° C. or above is passed therethrough and therefore a higher level of heat resistance is required as compared with the fields in which the prior art products are used, typically in the field of hot water supply pipes.

The upper limit to the above Vicat softening temperature is desirably as high as possible. Considering the actual molding extrusion technology for pipes, however, the limit is at 185° C.

The above CPVC preferably has a chlorine content of 70 to 76% by weight. A chlorine content lower than 70% by weight is insufficient for increasing the heat resistance, namely the above-mentioned Vicat softening temperature at a load of 1 kgf, to a level not lower than 145° C. and, therefore, the resulting products can hardly be used in those fields where still higher heat resistance is required as compared with the currently available heat-resistant product groups. At a content exceeding 76% by weight, the molding is difficult and the gelation is insufficient.

The above CPVC pipe is sufficient in gelation and has excellently developed shock resistance and other physical properties in spite of the use of a high chlorine content CPVC. The improvement in ready gelation tendency owes to the characteristic interior porous condition and surface condition of CPVC particles. Namely, the particle structure of the CPVC particles is characterized by a void ratio of 30 to 40% by volume as determined by mercury porosimetry at the pressure 2,000 kg/cm$^2$. A more preferred void ratio is within the range of 31 to 38% by volume. When the void volume is less than 30% by volume, the gelation in the step of molding is slow and this is unfavorable for the molding. When it is above 40% by volume, the biting by the screws in the step of molding becomes poor and the gelation tendency is inferior.

The above CPVC has a void volume percentage for the range of 0.001 to 0.1 μm of 2 to 15% by volume, preferably 3 to 13% by volume, relative to the total void volume in the pore volume distribution determined by the same measurement method as in the void ratio measurement in the pressure range of 0 to 2,000 kg/cm$^2$. When the void volume for the range of 0.001 to 0.1 μm, the proportion of micropores in the interior of particles is insufficient and the gelation tendency in the step of molding is poor. When it is above 15% by volume, the diffusion of chlorine in the step of chlorination will not be effected in a balanced manner but the chlorination degree distribution in the interior of particles becomes excessive, hence the heat stability is poor.

The above CPVC further has a BET specific surface area within the range of 2 to 12 m$^2$/g, more preferably 3 to 10 M$^2$/g. When it is smaller than 2 m$^2$/g, the proportion of micropores in the interior of particles is insufficient, hence intraparticle melting hardly occurs in the step of molding and, thus, the gelation tendency becomes poor. When it is larger than 12 m$^2$/g, frictional heat generation from the inside occurs abruptly and the heat stability in the step of molding becomes inferior.

Further, the above CPVC preferably has a peak ratio (chlorine element peak/carbon element peak) exceeding 0.6, more preferably exceeding 0.65, at the carbon element-chlorine element 1S bond energy value (eV) as determined by particle surface analysis by ESCA (electron spectroscopy for chemical analysis). When the above peak ratio is smaller, it is presumed that an additive, for example a dispersant, are adsorbed on the surface of CPVC particles. This is undesirable from the molding viewpoint.

Among CPVCs for which the above peak ratio is above 0.6, there are skinless CPVCs having a small skin area on the surface of CPVC particles.

When the chlorine content is 70% by weight, the element occurrence ratio for the chemical structure of the above CPVC is chlorine element: carbon element =1.73:2 without considering terminal structures or branching and, when the peak ratio at the above 1S bond energy value (eV) is 0.865, this means that the surface of CPVC particles is wholly covered with chlorinated vinyl chloride components alone.

CPVCs having the above-specified void ratio, pore distribution, BET specific surface area and ESCA analysis value are obtained by chlorinating a resin produced by polymerizing VCM alone or a mixture of VCM and another monomer or other monomers copolymerizable with VCM by a method known in the art.

The other monomers copolymerizable with VCM are not particularly restricted but include, for example, alkyl vinyl esters such as vinyl acetate; α-monoolefins such as ethylene and propylene; vinylidene chloride; styrene; and the like. These may be used singly or two or more of them may be used combinedly.

The CPVC having the above-specified BET specific surface area and 1S bond energy (eV) peak ratio can be obtained, for example, by aqueous suspension polymerization using a high saponification degree (60 to 90 mole percent) or low saponification degree (20 to 60 mole percent) polyvinyl acetate or both, a higher fatty acid ester or the like as the dispersant and a nonionic emulsifier, an anionic emulsifier or the like as the emulsifier.

The above chlorination is effected by introducing liquid chlorine or gaseous chlorine into a reactor in which PVC occurs in a state suspended in an aqueous medium.

In preparing the above suspended resin, the cake-like resin after monomer removing treatment following PVC polymerization is preferably used. A PVC once dried may be again suspended in an aqueous medium. Further, the suspension obtained after removal of substances unfavorable to the chlorination reaction from the polymerization system may also be used.

In chlorinating the above suspension, the reaction is carried out in the manner of thermal chlorination. The method of heating for the thermal chlorination is the same as described referring to the first aspect and second aspect of the invention.

The above reaction is carried out at a reaction temperature within the range of 70 to 135° C., more preferably 85 to 120° C. At a reaction temperature below 70° C., the rate of chlorination reaction is low and, accordingly, a long period of time is required for the reaction. At a temperature above 135° C., the decrease in voids in the interior of particles becomes significant through the influence of thermal energy owing to the high temperature reaction, so that sufficient gelation cannot be attained in the step of molding/fabrication. Further, the resin is deteriorated by the thermal energy.

In molding the above CPVC pipe, the molding can be effected using conventional compounding additives, such as a stabilizer, lubricant, modifier, filler, processing aid, pigment, etc.

The molding machine to be used in the above CPVC pipe molding is not particularly restricted but includes, among others, a single-screw extruder, twin-screw two-directional parallel extruder, twin-screw two-directional conical extruder and twin-screw unidirectional extruder.

The mold, resin temperature and molding conditions for molding the above CPVC pipe are not particularly restricted.

The gist of this invention consists in formulating CPVC having a chlorine content of 70 to 76% by weight and having a specific particle inside structure and a specific particle surface structure and molding the resulting compound. In this way, it becomes possible to provide a highly heat-resistant CPVC pipe having a Vicat softening temperature of not lower than 145° C.

The CPVC pipe according to Invention III-2 has a Vicat softening temperature of not lower than 155° C. as determined under a load of 1 kgf by the method according to JIS K 7206.

When the above Vicat softening temperature is 155° C. or higher, the pipe can be used in a steam return piping system, for instance.

The CPVC to be used in producing the CPVC pipe according to Invention III-2 preferably has a chlorine content of 72 to 76% by weight. A chlorine content lower than 72% by weight is insufficient to attain heat resistance, namely raising the above Vicat softening temperature to 155° C. or above, hence the pipe cannot be used in a steam return piping system. When the chlorine content is above 76% by weight, the molding is difficult to conduct and the gelation is insufficient.

The particle structure of the CPVC to be used in producing the CPVC pipe according to Invention III-2 is characterized by its particle inside structure and surface structure, like the CPVC to be used in producing the above-mentioned CPVC pipe of the invention.

The CPVC to be used in producing the CPVC pipe according to Invention III-2, too, can be obtained in the same manner as the CPVC to be used in producing the CPVC pipe according to Invention III-1. Since, however, the chlorine content of the CPVC to be used in producing the CPVC pipe according to Invention III-2 is nigher than that of the CPVC to be used in producing the CPVC pipe according to Invention III-1, a more preferred reaction temperature is within the range of 90 to 120° C.

The CPVC pipe according to Invention III-2, too, can be molded in the same manner using the same compounding additives as mentioned above referring to the above-mentioned CPVC pipe of the invention.

The gist of Invention III-2 consists in formulating CPVC having a chlorine content of 72 to 76% by weight and having a specific particle inside structure, and a specific particle surface structure and molding the resulting compound. In this way, it becomes possible to provide a highly heat-resistant CPVC pipe having a Vicat softening temperature of not lower than 155° C.

The CPVC pipe according to Invention III-3 has a Vicat softening temperature of not lower than 170° C. as determined under a load of 1 kgf by the method according to JIS K 7206.

The CPVC to be used in producing the CPVC pipe according to Invention III-3 preferably has a chlorine content of 74 to 76% by weight. A chlorine content lower than 74% by weight is insufficient to increase the heat resistance, namely the above-mentioned Vicat softening temperature at a load of 1 kgf, to a level not lower than 170° C. and, therefore, the resulting products can hardly be used in those fields where still higher heat resistance is required as compared with the currently available heat-resistant product groups. At a content exceeding 76% by weight, the molding is difficult and the gelation is insufficient.

The particle structure of the CPVC to be used in producing the CPVC pipe according to Invention III-3 is also characterized by its particle inside structure and surface structure, like the CPVC to be used in producing the above-mentioned CPVC pipe of the invention.

The CPVC to be used in producing the CPVC pipe according to Invention III-3 can be obtained in the same manner as the CPVC to be used in producing the CPVC pipe according to Invention III-I or Invention III-2. Since, however, the chlorine content of the CPVC to be used in producing the CPVC pipe according to Invention III-3 is higher than that of the CPVC to be used in producing the CPVC pipe according to Invention III-1 or Invention III-2, a more preferred reaction temperature is within the range of 100 to 120° C.

The CPVC pipe according to Invention III-3, too, can be molded in the same manner using the same compounding additives as mentioned above referring to the above-mentioned CPVC pipe of the invention.

The gist of Invention III-3 consists in formulating CPVC having a chlorine content of 74 to 76% by weight and having a specific particle inside structure and a specific particle surface structure and molding the resulting compound. In this way, it becomes possible to provide a highly heat-resistant CPVC pipe having a Vicat softening temperature of not lower than 170° C.

The CPVC pipe according to Invention III-4 has a Vicat softening temperature of not lower than 145° C. as determined under a load of 1 kgf by the method according to JIS K 7206 and a Charpy impact strength of not less than 10 kgf·cm/cm$^2$ as determined by the method according to JIS K 7111.

The above Charpy impact strength is an indicator of the shock resistance of a pipe and, when the Charpy impact strength is not less than 10 kgf·cm/cm$^2$, the pipe is suited for use for passing a liquid or gas at 100° C. or above therethrough.

The CPVC pipe according to Invention III-4 is molded using a CPVC having an increased chlorine content so that the heat resistance may be increased. However, the use of a highly chlorinated resin results in insufficient gelation in the step of molding and thus gives a brittle pipe with decreased shock resistance. Therefore, an increased amount of a shock resistance improving agent is used in the step of molding but, on the other hand, the use of such agent may decrease the heat resistance. A preferred range is, therefore, 10 to 60 kgf·cm/cm$^2$, more preferably 15 to 50 kgf·cm/cm$^2$.

The CPVC to be used in producing the CPVC pipe according to Invention III-4 preferably has a chlorine content of 70 to 76%, like the CPVC according to Invention III-1.

The particle structure of the CPVC to be used in producing the CPVC pipe according to Invention III-4, too, is characterized by its particle inside structure and surface structure, like the CPVC to be used in producing the above-mentioned CPVC pipe of the invention.

The CPVC to be used in producing the CPVC pipe according to Invention III-4, too, can be obtained in the same manner as the CPVC to be used in producing the CPVC pipe according to Invention III-1.

The CPVC pipe according to Invention III-4, too, can be molded in the same manner using the same compounding additives as mentioned above referring to the above-mentioned CPVC pipe of the invention.

The gist of Invention III-4 consists in formulating CPVC having a chlorine content of 70 to 76% by weight and having a specific particle inside structure and a specific particle surface structure and molding the resulting compound. In this way, it becomes possible to provide a highly heat-resistant CPVC pipe having a Vicat softening temperature of not lower than 145° C. and a Charpy impact strength of not less than 10 kgf·cm/cm$^2$.

Invention III-5 provides the CPVC pipe which has a Vicat softening temperature of not lower than 155° C. as determined under a load of 1 kgf by the method according to JIS K 7206 and a Charpy impact strength of not less than 10 kgf·cm/cm$^2$ as determined by the method according to JIS K 7111.

In the practice of Invention III-5, the CPVC preferably has a chlorine content of 72 to 76% by weight, like the CPVC according to Invention III-2.

The particle structure of the CPVC to be used in producing the CPVC pipe according to Invention III-5, too, is characterized by its particle inside structure and surface structure, like the CPVC to be used in producing the above-mentioned CPVC pipe of the invention.

The CPVC to be used in producing the CPVC pipe according to Invention III-5, too, can be obtained in the same manner as the CPVC to be used in producing the CPVC pipe according to Invention III-2.

The CPVC pipe according to Invention III-5, too, can be molded in the same manner using the same compounding additives as mentioned above referring to the above-mentioned CPVC pipe of the invention.

The gist of Invention III-5 consists in formulating CPVC having a chlorine content of 72 to 76% by weight and having a specific particle inside structure and a specific particle surface structure and molding the resulting compound. In this way, it becomes possible to provide a highly heat-resistant CPVC pipe having a Vicat softening temperature of not lower than 155° C. and a Charpy impact strength of not less than 10 kgf·cm/cm$^2$.

The CPVC pipe according to Invention III-6 has a Vicat softening temperature of not lower than 170° C. as determined under a load of 1 kgf by the method according to JIS K 7206 and a Charpy impact strength of not Less than 10 kgf·cm/cm$^2$ as determined by the method according to JIS K 7111.

The chlorine content of the CPVC to be used in producing the CPVC pipe according to Invention III-6 is preferably 74 to 76% by weight, like the CPVC according to Invention III-3.

The particle structure of the CPVC to be used in producing the CPVC pipe according to Invention III-6, too, is characterized by its particle inside structure and surface. structure, like the CPVC to be used in producing the above-mentioned CPVC pipe of the invention.

The CPVC to be used in producing the CPVC pipe according to Invention III-6, too, can be obtained in the same manner as the CPVC to be used in producing the CPVC pipe according to Invention III-3.

The CPVC pipe according to Invention III-6, too, can be molded in the same manner using the same compounding additives as mentioned above referring to the above-mentioned CPVC pipe of the invention.

The gist of Invention III-6 consists in formulating CPVC having a chlorine content of 74 to 76% by weight and having a specific particle inside structure and a specific particle surface structure, and molding the resulting compound. In this way, it becomes possible to provide a highly heat-resistant CPVC pipe having a Vicat softening temperature of not lower than 170° C. and a Charpy impact strength of not less than 10 kgf·cm/cm$^2$.

The CPVC pipe according to Invention III-7 has a Vicat softening temperature of not lower than 145° C. as determined under a load of 1 kgf by the method according to JIS K 7206 and a Charpy impact strength of not less than 20 kgf·cm/cm$^2$ as determined by the method according to JIS K 7111.

The above Charpy impact strength is an indicator of the shock resistance of a pipe and, when the Charpy impact strength is not less than 20 kgf·cm/cm$^2$, the pipe is particularly suited for use for passing a liquid or gas at 100° C. or above therethrough.

The CPVC to be used in producing the CPVC pipe according to Invention III-7 preferably has a chlorine content of 70 to 76% by weight, like the CPVC according to Invention III-1 and Invention III-4.

The particle structure of the CPVC to be used in producing the CPVC pipe according to Invention III-7, too, is characterized by its particle inside structure and surface structure, like the CPVC to be used in producing the above-mentioned CPVC pipe of the invention.

The CPVC to be used in producing the CPVC pipe according to Invention III-7, too, can be obtained in the same manner as the CPVC to be used in producing the CPVC pipe according to Invention III-1 and Invention III-4.

The CPVC pipe according to Invention III-7, too, can be molded in the same manner using the same compounding additives as mentioned above referring to the above-mentioned CPVC pipe of the invention.

The gist of Invention III-7 consists in formulating CPVC having a chlorine content of 70 to 76% by weight and having a specific particle inside structure and a specific particle surface structure and molding the resulting compound. In this way, it becomes possible to provide a highly heat-resistant CPVC pipe having a Vicat softening temperature of not lower than 145SC and a Charpy impact strength of not less than 20 kgf·cm/cm$^2$.

The CPVC pipe according to Invention III-8 has a Vicat softening temperature of not lower than 155° C. as determined under a load of 1 kgf by the method according to JIS K 7206 and a Charpy impact strength of not less than 20 kgf·cm/cm$^2$ as determined by the method according to JIS K 7111.

The chlorine content of the CPVC to be used in producing the CPVC pipe according to Invention III-8 is preferably 72 to 76% by weight, like the CPVC according to Invention III-2 and Invention III-5.

The particle structure of the CPVC to be used in producing the CPVC pipe according to Invention III-8, too, is characterized by its particle inside structure and surface structure, like the CPVC to be used in producing the above-mentioned CPVC pipe of the invention.

The CPVC to be used in producing the CPVC pipe according to Invention III-8, too, can be obtained in the same manner as the CPVC to be used in producing the CPVC pipe according to Invention III-2 and Invention III-5.

The CPVC pipe according to Invention III-8, too, can be molded in the same manner using the same compounding additives as mentioned above referring to the above-mentioned CPVC pipe of the invention.

The gist of Invention III-8 consists in formulating CPVC having a chlorine content of 72 to 76% by weight and having a specific particle inside structure and a specific particle surface structure and molding the resulting compound. In this way, it becomes possible to provide a highly heat-resistant CPVC pipe having a Vicat softening temperature of not lower than 155° C. and a Charpy impact strength of not less than 20 kgf·cm/cm$^2$.

The CPVC pipe according to Invention 111-9 has a Vicat softening temperature of not lower than 170° C. as determined under a load of 1 kgf by the method according to JIS K 7206 and a Charpy impact strength of not less than 20 kgf·cm/cm$^2$ as determined by the method according to JIS K 7111.

The CPVC according to Invention III-9 preferably has a chlorine content of 74 to 76% by weight, like the CPVC according to Invention III-3 and Invention III-6.

The particle structure of the CPVC to be used in producing the pipe according to Invention III-9, too, is characterized by its particle inside structure and surface structure, like the CPVC to be used in producing the above-mentioned CPVC pipe of the invention.

The CPVC to be used in producing the CPVC pipe according to Invention III-9, too, can be obtained in the same manner as the CPVC to be used in producing the CPVC pipe according to Invention III-3 and Invention III-6.

The CPVC pipe according to Invention III-9, too, can be molded in the same manner using the same compounding additives as mentioned above referring to the above-mentioned CPVC pipe of the invention.

The gist of Invention III-9 consists in formulating CPVC having a chlorine content of 74 to 76% by weight and having a specific particle inside structure and a specific particle surface structure and molding the resulting compound. In this way, it becomes possible to provide a highly heat-resistant CPVC pipe having a Vicat softening temperature of not lower than 170° C. and a Charpy impact strength of not less than 20 kgf·cm/cm$^2$.

The CPVC joint according to Invention III-10 has a Vicat softening temperature of not lower than 145° C. as determined under a load of 1 kgf by the method according to JIS K 7206.

The Vicat softening temperature is an indicator of the heat resistance of joints. Joints having a Vicat softening temperature lower than 145° C. can hardly be used in those fields of application where a liquid or gas having a temperature of 100° C. or higher is passed therethrough and therefore a higher level of heat resistance is required as compared with the fields in which the prior art products are used, typically in the field of joints for hot water supply systems.

The chlorine content of the CPVC to be used according to Invention III-10 is preferably 70 to 76% by weight, like the CPVC according to Invention III-1, Invention III-4 and Invention III-7.

The particle structure of the CPVC to be used in producing the CPVC joint according to Invention III-10, too, is characterized by its particle inside structure and surface structure, like the CPVC to be used in producing the above-mentioned CPVC pipe of the invention.

The CPVC to be used in producing the CPVC joint according to Invention III-10, too, can be obtained in the same manner as the CPVC to be used in producing the CPVC pipe according to Invention III-1, Invention III-4 and Invention III-7.

In producing the CPVC joint according to Invention III-10, the same compounding additives as mentioned hereinabove referring to the above-mentioned CPVC pipe of the invention can be used.

The molding machine to be used in molding the CPVC joint according to Invention III-10 is not particularly restricted but the technique of injection molding is judiciously used as the method of molding.

The mold, resin temperature and molding conditions for producing the CPVC joint according to Invention III-10 are not particularly restricted, either.

The gist of Invention III-10 consists in formulating CPVC having a chlorine content of 70 to 76% by weight and having a specific particle inside structure and a specific particle surface structure and molding the resulting compound. In this way, it becomes possible to provide a highly heat-resistant CPVC joint having a Vicat softening temperature of not lower than 145° C.

The CPVC joint according to Invention III-11 has a Vicat softening temperature of not lower than 155° C. as determined under a load of 1 kgf by the method according to JIS K 7206.

The CPVC according to Invention III-11 preferably has a chlorine content of 72 to 76% by weight, like the CPVC according to Invention III-2, Invention III-5 and Invention III-8.

The particle structure of the CPVC to be used in producing the joint according to Invention III-11, too, is characterized by its particle inside structure and surface structure, like the CPVC to be used in producing the above-mentioned CPVC pipe and CPVC joint of the invention.

The CPVC to be used in producing the CPVC joint according to Invention III-11, too, can be obtained in the same manner as the CPVC to be used in the practice of Invention III-2, Invention III-5 and Invention III-8.

The CPVC joint according to Invention III-11 can be molded in the same manner as the above-mentioned CPVC joint of the invention using the same compounding additives as mentioned hereinabove referring to the above-mentioned CPVC pipe and CPVC joint of the invention.

The gist of Invention III-11 consists in formulating CPVC having a chlorine content of 72 to 76% by weight and having a specific particle inside structure and a specific particle surface structure and molding the resulting compound. In this way, it becomes possible to provide a highly heat-resistant CPVC joint having a Vicat softening temperature of not lower than 155° C.

The CPVC joint according to Invention III-12 has a Vicat softening temperature of not lower than 170° C. as determined under a load of 1 kgf by the method according to JIS K 7206.

The chlorine content of the CPVC to be used in the practice of Invention III-12 is preferably 74 to 76% by weight, like the CPVC to be used in the practice of Invention III-3, Invention III-6 and Invention III-9.

The particle structure of the CPVC to be used in producing the CPVC joint according to Invention III-12, too, is characterized by its particle inside structure and surface structure, like the CPVC to be used in producing the above-mentioned CPVC pipe and CPVC joint of the invention.

The CPVC to be used in producing the CPVC joint according to Invention III-12, too, can be obtained in the same manner as the CPVC to be used in producing the CPVC pipe according to Invention III-3, Invention III-6 and Invention III-9.

The CPVC joint according to Invention III-12 can be molded in the same manner as the above-mentioned CPVC joint of the invention using the same compounding additives as mentioned hereinabove referring to the CPVC pipe and CPVC joint of the invention.

The gist of Invention III-12 consists in formulating CPVC having a chlorine content of 74 to 76% by weight and having a specific particle inside structure and a specific particle surface structure and molding the resulting compound. In this way, it becomes possible to provide a highly heat-resistant CPVC joint having a Vicat softening temperature of not lower than 170° C.

The CPVC joint according to Invention III-13 has a Vicat softening temperature of not lower than 145° C. as determined under a load of 1 kgf by the method according to JIS K 7206 and a Charpy impact strength of not less than 10 kgf·cm/cm$^2$ as determined by the method according to JIS K 7111.

The Charpy impact strength is an indicator of the shock resistance of a joint and, when the Charpy impact strength is not less than 10 kgf·cm/cm², the joint is suited for use for passing a liquid or gas at 100° C. or above therethrough.

The chlorine content of CPVC to be used in the practice of Invention III-13 is preferably 70 to 76% by-weight, like the CPVC to be used in the practice of Invention III-1, Invention III-4, Invention III-7 and Invention III-10.

The particle structure of the CPVC to be used in producing the CPVC joint according to Invention III-13, too, is characterized by its particle inside structure and surface structure, like the CPVC to be used in producing the above-mentioned CPVC pipe and CPVC joint of the invention.

The CPVC to be used in producing the CPVC joint according to Invention III-13, too, can be obtained in the same manner as the CPVC to be used in producing the CPVC pipe according to Invention III-1, Invention III-4 and Invention III-7 and the CPVC joint according to Invention III-10.

The CPVC joint according to Invention III-13 can be molded in the same manner as the above-mentioned CPVC joint of the invention using the same compounding additives as mentioned hereinabove referring to the CPVC pipe and CPVC joint of the invention.

The gist of Invention III-13 consists in formulating CPVC having a chlorine content of 70 to 76% by weight and having a specific particle inside structure and a specific particle surface structure and molding the resulting compound. In this way, it becomes possible to provide a highly heat-resistant CPVC joint having a Vicat softening temperature of not lower than 145° C. and a Charpy impact strength of not less than 10 kgf·cm/cm².

The CPVC joint according to Invention III-14 has a Vicat softening temperature of not lower than 155° C. as determined under a load of 1 kgf by the method according to JIS K 7206 and a Charpy impact strength of not less than 10 kgf·cm/cm² as determined by the method according to JIS K 7111.

The chlorine content of the CPVC to be used in the practice of Invention III-14 is preferably 72 to 76% by weight, like the CPVC to be used in the practice of Invention III-2, Invention III-5, Invention III-8 and Invention III-11.

The particle structure of the CPVC to be used in producing the CPVC joint according to Invention III-14, too, is characterized by its particle inside structure and surface structure, like the CPVC to be used in producing the above-mentioned CPVC pipe and CPVC joint of the invention.

The CPVC to be used in producing the CPVC joint according to Invention III-14, too, can be obtained in the same manner as the CPVC to be used in producing the CPVC pipe according to Invention III-2, Invention III-5 and Invention III-8 and the CPVC joint according to Invention III-11.

The CPVC joint according to Invention III-14 can be molded in the same manner as the above-mentioned CPVC joint of the invention using the same compounding additives as mentioned hereinabove referring to the CPVC pipe and CPVC joint of the invention.

The gist of Invention III-14 consists in formulating CPVC having a chlorine content of 72 to 76% by weight and having a specific particle inside structure and a specific particle surface structure and molding the resulting compound. In this way, it becomes possible to provide a highly heat-resistant CPVC joint having a Vicat softening temperature of not lower than 155° C. and a Charpy impact strength of not less than 10 kgf·cm/cm².

The CPVC joint according to Invention III-15 has a Vicat softening temperature of not lower than 170° C. as determined under a load of 1 kgf by the method according to JIS K 7206 and a Charpy impact strength of not less than 10 kgf cm/cm² as determined by the method according to JIS K 7111.

The CPVC to be used in the practice of Invention III-15 preferably has a chlorine content of 74 to 76% by weight, like the CPVC to be used in the practice of Invention III-3, Invention III-6, Invention III-9 and Invention III-12.

The particle structure of the CPVC to be used in producing the CPVC joint according to Invention III-15, too, is characterized by its particle inside structure and surface structure, like the CPVC to be used in producing the above-mentioned CPVC pipe and CPVC joint of the invention.

The CPVC to be used in producing the CPVC joint according to Invention III-15, too, can be obtained in the same manner as the CPVC to be used in producing the CPVC pipe according to Invention-III-3, Invention III-6 and Invention III-9 and the CPVC joint according to Invention III-12.

The CPVC joint according to Invention III-15 can be molded in the same manner as the above-mentioned CPVC joint of the invention using the same compounding additives as mentioned hereinabove referring to the CPVC pipe and CPVC joint of the invention.

The gist of Invention III-15 consists in formulating CPVC having a chlorine content of 74 to 76% by weight and having a specific particle inside structure and a specific particle surface structure and molding the resulting compound. In this way, it becomes possible to provide a highly heat-resistant CPVC joint having a Vicat softening temperature of not lower than 170° C. and a Charpy impact strength of not less than 10 kgf·cm/cm².

The CPVC joint according to Invention III-16 has a Vicat softening temperature of not lower than 145° C. as determined under a load of 1 kgf by the method according to JIS K 7206 and a Charpy impact strength of not less than 20 kgf·cm/cm² as determined by the method according to JIS K 7111.

The above Charpy impact strength is an indicator of the shock resistance of a joint and, when the Charpy impact strength is not less than 20 kgf·cm/cm², the joint is particularly suited for use for passing a liquid or gas at 100° C. or above therethrough.

The CPVC to be used in the practice of Invention III-16 preferably has a chlorine content of 70 to 76% by weight, like the CPVC to be used in the practice of Invention III-1, Invention III-4, Invention III-7, Invention III-10 and Invention III-13.

The particle structure of the CPVC to be used in producing the CPVC joint according to Invention III-16, too is characterized by its particle inside structure and surface structure, like the CPVC to be used in producing the above-mentioned CPVC pipe and CPVC joint of the invention.

The CPVC to be used in producing the CPVC joint according to Invention III-16, too, can be obtained in the same manner as the CPVC to be used in producing the CPVC pipe according to Invention III-1, Invention III-4 and Invention III-7 and the CPVC joint according to Invention III-10 and Invention III-13.

The CPVC joint according to Invention III-16 can be molded in the same manner as the above-mentioned CPVC joint of the invention using the same compounding additives as mentioned hereinabove referring to the CPVC pipe and CPVC joint of the invention.

The gist of Invention III-16 consists in formulating CPVC having a chlorine content of 70 to 76% by weight and having a specific particle inside structure and a specific particle surface structure and molding the resulting compound. In this way, it becomes possible to provide a highly heat-resistant CPVC joint having a Vicat softening temperature of not lower than 145° C. and a Charpy impact strength of not less than 20 kgf·cm/cm².

The CPVC joint according to Invention III-17 has a Vicat softening temperature of not lower than 155° C. as determined under a load of 1 kgf by the method according to JIS K 7206 and a Charpy impact strength of not less than 20 kgf·cm/cm² as determined by the method according to JIS K 7111.

The CPVC to be used in the practice of Invention III-17 preferably has a chlorine content of 72 to 76%-by weight, like the CPVC to be used in the practice of Invention III-2, Invention III-5, Invention III-8, Invention III-11 and Invention III-14.

The particle structure of the CPVC to be used in producing the CPVC joint according to Invention III-17, too, is characterized by its particle inside structure and surface structure, like the CPVC to be used in producing the above-mentioned CPVC pipe and CPVC joint of the invention.

The CPVC to be used in producing the CPVC pipe according to Invention III-17, too, can be obtained in the same manner as the CPVC to be used in producing the CPVC pipe according to Invention III-2, Invention III-5 and Invention III-8 and the CPVC joint according to Invention III-11 and as Invention III-14.

The CPVC joint according to Invention I1I-17 can be molded in the same manner as the above-mentioned CPVC joint of the invention using the same compounding additives as mentioned hereinabove referring to the CPVC pipe and CPVC joint of the invention.

The gist of Invention III-17 consists in formulating CPVC having a chlorine content of 72 to 76% by weight and having a specific particle inside structure and a specific particle surface structure and molding the resulting compound. In this way, it becomes possible to provide a highly heat-resistant CPVC joint having a Vicat softening temperature of not lower than 155° C. and a Charpy impact strength of not less than 20 kgf·cm/cm².

The CPVC joint according to Invention III-18 has a Vicat softening temperature of not lower than 170° C. as determined under a load of 1 kgf by the method according to JIS K 7206 and a Charpy impact strength of not less than 20 kgf·cm/cm² as determined by the method according to JIS K 7111.

The CPVC to be used in the practice of Invention III-18 preferably has a chlorine content of 74 to 76% by weight, like the CPVC to be used in the practice of Invention III-3, Invention III-6, Invention III-9, Invention III-12 and Invention III-15.

The particle structure of the CPVC to be used in producing the CPVC pipe according to Invention III-18, too, is characterized by its particle inside structure and surface structure, like the CPVC to be used in producing the above-mentioned CPVC pipe and CPVC joint of the invention.

The CPVC to be used in producing the CPVC joint according to Invention III-18, too, can be obtained in the same manner as the CPVC to be used in producing the CPVC pipe according to Invention III-3, Invention III-6 and Invention III-9 and the CPVC joint according to Invention III-12 and Invention III-15.

The CPVC joint according to Invention III-18 can be molded in the same manner as the above-mentioned CPVC joint of the invention using the same compounding additives as mentioned hereinabove referring to the CPVC pipe and CPVC joint of the invention.

The gist of Invention III-18 consists in formulating CPVC having a chlorine content of 74 to 76% by weight and having a specific particle inside structure and a specific-particle surface structure and molding the resulting compound. In this way, it becomes possible to provide a highly heat-resistant CPVC joint having a Vicat softening temperature of not lower than 170° C. and a Charpy impact strength of not less than 20 kgf·cm/cm².

The CPVC plate according to Invention III-19 has a Vicat softening temperature of not lower than 145° C. as determined under a load of 1 kgf by the method according to JIS K 7206.

The Vicat softening temperature is an indicator of the heat resistance of a resin plate. Plates having a Vicat softening temperature lower than 145° C. can hardly be used in those fields of application where a liquid or gas having a temperature of 100° C. or higher is allowed to flow and therefore a higher level of heat resistance is required as compared with the fields in which the prior art products are used, typically in the field of reservoirs for chemical fluids.

The CPVC plate according to Invention III-19 preferably has a chlorine content of 70 to 76% by weight, like the CPVC pipe or CPVC joint according to Invention III-1, Invention III-4, Invention III-7, Invention III-10, Invention III-13 and Invention III-16.

The particle structure of the CPVC to be used in producing the CPVC plate according to Invention III-19, too, is, characterized by its particle inside structure and surface structure, like the CPVC to be used in producing the above-mentioned CPVC pipe and CPVC joint of the invention.

The CPVC to be used in producing the CPVC plate according to Invention III-19, too, can be obtained in the same manner as the CPVC to be used in producing the CPVC pipe or CPVC joint according to Invention III-1, Invention III-4, Invention III-7, Invention III-10, Invention III-13 and Invention III-16.

In producing the CPVC plate according to Invention III-19, the same compounding additives as mentioned above referring to the CPVC pipe of the invention can be used.

The molding machine to be used in molding the CPVC plate according to Invention III-19 is not particularly restricted but the technique of injection molding is judiciously used as the method of molding.

The mold, resin temperature and molding conditions for producing the CPVC plate according to Invention III-19 are not particularly restricted, either.

The gist of Invention III-19 consists in formulating CPVC having a chlorine content of 70 to 76% by weight and having a specific particle inside structure and a specific particle surface structure and molding the resulting compound. In this way, it becomes possible to provide a highly heat-resistant CPVC plate having a Vicat softening temperature of not lower than 145° C.

The CPVC plate according to Invention III-20 has a Vicat softening temperature of not lower than 155° C. as determined under a load of 1 kgf by the method according to JIS K 7206.

The CPVC plate according to Invention III-20 preferably has a chlorine content of 72 to 76% by weight, like the CPVC pipe or CPVC joint according to Invention III-2, Invention III-5, Invention III-8, Invention III-11, Invention III-14 and Invention III-17.

The particle structure of the CPVC to be used in producing the CPVC plate according to Invention III-20, too, is characterized by its particle inside structure and surface structure, like the CPVC to be used in producing the above-mentioned CPVC pipe, CPVC joint and CPVC plate of the invention.

The CPVC to be used in producing the CPVC plate according to Invention III-20, too, can be obtained in the same manner as the CPVC to be used in producing the CPVC pipe or CPVC joint according to Invention III-2, Invention III-5, Invention III-8, Invention III-11, Invention III-14 and Invention III-17.

The CPVC plate according to Invention III-20 can be molded in the same manner as the above-mentioned CPVC plate of the invention using the same compounding additives as mentioned hereinabove referring to the CPVC pipe, CPVC joint and CPVC plate of the invention.

The gist of Invention III-20 consists in formulating CPVC having a chlorine content of 72 to 76% by weight and having a specific particle inside structure and a specific particle surface structure and molding the resulting compound. In this way, it becomes possible to provide a highly heat-resistant CPVC plate having a Vicat softening temperature of not lower than 155° C.

The CPVC plate according to Invention III-21 has a Vicat softening temperature of not lower than 170° C. as determined under a load of 1 kgf by the method according to JIS K 7206.

The CPVC plate according to Invention III-21 preferably has a chlorine content of 74 to 76% by weight, like the CPVC pipe or CPVC joint according to Invention III-3, Invention III-6, Invention III-9, Invention III-12, Invention III-15 and Invention III-18.

The particle structure of the CPVC to be used in producing the CPVC plate according to Invention III-21, too, is characterized by its particle inside structure and surface structure, like the CPVC to be used in producing the above-mentioned CPVC pipe, CPVC joint and CPVC plate of the invention.

The CPVC to be used in producing the CPVC plate according to Invention III-21, too, can be obtained in the same manner as the CPVC to be used in producing the CPVC pipe or CPVC joint according to Invention III-3, Invention III-6, Invention III-9, Invention III-12, Invention III-15 and Invention III-18.

The CPVC plate according to Invention III-21 can be molded in the same manner as the above-mentioned CPVC plate of the invention using the same compounding additives as mentioned hereinabove referring to the CPVC pipe and CPVC plate of the invention.

The gist of Invention III-21 consists in formulating CPVC having a chlorine content of 74 to 76% by weight and having a specific particle inside structure and a specific particle surface structure and molding the resulting compound. In this way, it becomes possible to provide a highly heat-resistant CPVC plate having a Vicat softening temperature of not lower than 170° C.

The CPVC plate according to Invention III-22 has a Vicat softening temperature of not lower than 145° C. as determined under a load of 1 kgf by the method according to JIS K 7206 and a Charpy impact strength of not less than 10 kgf·cm/cm² as determined by the method according to JIS K 7111.

The Charpy impact strength is an indicator of the shock resistance of a resin plate and, when the Charpy impact strength is not less than 10 kgf·cm/cm², the plate is suited for use for holding chemical fluids at 100° C. or above.

The chlorine content of the CPVC plate according to Invention III-22 is preferably 70 to 76% by weight, like the CPVC pipe, CPVC joint or CPVC plate according to Invention III-1, Invention III-4, Invention III-7, Invention III-10, Invention III-13, Invention III-16 and Invention III-19.

The particle structure of the CPVC to be used in producing the CPVC plate according to Invention III-22, too, is characterized by its particle inside structure and surface structure, like the CPVC to be used in producing the above-mentioned CPVC pipe, CPVC joint and CPVC plate of the invention.

The CPVC to be used in producing the CPVC plate according to Invention III-22, too, can be obtained in the same manner as the CPVC to be used in producing the CPVC pipe, CPVC joint or CPVC plate according to Invention III-1, Invention III-4, Invention III-7, Invention III-10, Invention III-13, Invention III-16 and Invention III-19.

The CPVC plate according to Invention III-22 can be molded in the same manner as the above-mentioned CPVC plate of the invention using the same compounding additives as mentioned hereinabove referring to the CPVC pipe, CPVC joint and CPVC plate of the invention.

The gist of Invention III-22 consists in formulating CPVC having a chlorine content of 70 to 76% by weight and having a specific particle inside structure and a specific particle surface structure and molding the resulting compound. In this way, it becomes possible to provide a highly heat-resistant CPVC plate having a Vicat softening temperature of not lower than 145° C. and a Charpy impact strength of not less than 10 kgf·cm/cm².

The CPVC plate according to Invention III-23 has a Vicat softening temperature of not lower than 155° C. as determined under a load of 1 kgf by the method according to JIS K 7206 and a Charpy impact strength of not less than 10 kgf·cm/cm² as determined by the method according to JIS K 7111.

The chlorine content of CPVC plate according to Invention III-23 is preferably 72 to 76% by weight, like the CPVC pipe, CPVC joint or CPVC plate according to Invention III-2, Invention III-5, Invention III-8, Invention III-11, Invention III-14, Invention III-17 and Invention III-20.

The particle structure of the CPVC to be used in producing the CPVC plate according to Invention III-23, too, is characterized by its particle inside structure and surface structure, like the CPVC to be used in producing the above-mentioned CPVC pipe, CPVC joint and CPVC plate of the invention.

The CPVC to be used in producing the CPVC plate according to Invention III-23, too, can be obtained in the same manner as the CPVC to be used in producing the CPVC pipe, CPVC joint or CPVC plate according to Invention III-2, Invention III-5, Invention III-8, Invention III-11, Invention III-14, Invention III-17 and Invention III-20.

The CPVC plate according to Invention III-23 can be molded in the same manner as the above-mentioned CPVC plate of the invention using the same compounding additives as mentioned hereinabove referring to the CPVC pipe, CPVC joint and CPVC plate of the invention.

The gist of Invention III-23 consists in formulating CPVC having a chlorine content of 72 to 76% by weight and having a specific particle inside structure and a specific particle surface structure and molding the resulting compound. In this way, it becomes possible to provide a highly heat-resistant CPVC plate having a Vicat softening temperature of not lower than 155° C. and a Charpy impact strength of not less than 10 kgf·cm/cm².

The CPVC plate according to Invention III-24 has a Vicat softening temperature of not lower than 170° C. as determined under a load of 1 kgf by the method according to JIS K 7206 and a Charpy impact strength of not less than 10 kgf·cm/cm as determined by the method according to JIS K 7111.

The chlorine content of CPVC plate according to Invention III-24 is preferably 74 to 76% by weight, like the CPVC pipe, CPVC joint or CPVC plate according to Invention III-3, Invention III-6, Invention III-9, Invention III-12, Invention III-15, Invention III-18 and Invention III-21.

The particle structure of the CPVC to be used in producing the CPVC plate according to Invention III-24, too, is characterized by its particle inside structure and surface structure, like the CPVC to be used in producing the above-mentioned CPVC pipe, CPVC joint and CPVC plate the invention.

The CPVC to be used in producing the CPVC plate according to Invention III-24, too, can be obtained in the same manner as the CPVC to be used in producing the CPVC pipe, CPVC joint or CPVC plate according to Invention III-3, Invention III-6, Invention III-9, Invention III-12, Invention III-15, Invention III-18 and Invention III-21.

The CPVC plate according to Invention III-24 can be molded in the same manner as the above-mentioned CPVC plate of the invention using the same compounding additives as mentioned hereinabove referring to the CPVC pipe, CPVC joint and CPVC plate of the invention.

The gist of Invention III-24 consists in formulating CPVC having a chlorine content of 74 to 76% by weight and having a specific particle inside structure and a specific particle surface structure and molding the resulting compound. In this way, it becomes possible to provide a highly heat-resistant CPVC plate having a Vicat softening temperature of not lower than 170° C. and a Charpy impact strength of not less than 10 kgf·cm/cm$^2$.

The fourth aspect of the invention is now described in detail.

The term "heat resistance temperature" as used herein referring to Inventions IV-1 to IV-4 is synonymous as "Vicat softening temperature". It is determined by measuring Vicat softening temperature by the method of JIS K 7206 (weight 1.0 kgf, rate of temperature rise 50° C./hour) using test specimens prepared by cutting a molding to be tested to 10 mm×10 mm.

As the heat-resistant vinyl chloride resin to be used in producing the heat-resistant vinyl chloride resin molding and heat-resistant vinyl chloride resin pipe according to Inventions IV-1 to IV-4, there may be mentioned CPVC obtainable by chlorinating PVC. The PVC prior to chlorination to CPVC, which is used in the practice of Inventions IV-1 to IV-4, preferably has a BET specific surface area of 1.3 to 8.0 m$^2$/g and a carbon element-chlorine element 1S bond energy (eV) peak ratio (chlorine element peak×2/carbon element peak) of above 0.6 as determined in particle surface analysis by ESCA (electron spectroscopy for chemical analysis).

When the BET specific surface area is less than 1.3 m$^2$/g, the proportion of micropores not more than 0.1 μm in size in the interior of PVC particles is insufficient to attain uniform chlorination and heat stability improvement. Further, the rate of gelation is slow and this is unfavorable from the molding viewpoint. When the BET specific surface area is in excess of 8 m$^2$/g, the heat stability of PVC particles themselves before chlorination is low and the CPVC obtained becomes poor in workability. A BET specific surface area preferred for the PVC is within the range of 1.5 to 5 m$^2$/g.

When the carbon element-chlorine element 1S bond energy (eV) peak ratio is 0.6 or below, an additive, for example a dispersant, supposedly occur in adsorbed form on the PVC particle surface and, therefore, not only the rate of chlorination in the subsequent step becomes slow but also the CPVC obtained may offer a moldability/fabricability problem and will have poor heat stability. More preferably, the above peak ratio should be above 0.7.

Among PVC species for which the above peak ratio is above 0.6, there exist skinless PVCs having a small skin surface area on the PVC particle surface. At the same energy ratio, skinless PVCs are preferably used.

The element occurrence ratio in the chemical structure of the above PVC is chlorine element:carbon element =1:2 (without considering the terminal structure and branching) and the above-mentioned peak ratio (chlorine element peak× 2/carbon element peak) at the 1S bond energy value (eV) has a value of 0 to 1. As discussed hereinabove referring to the first aspect and second aspect of the invention, the peak ratio value of 0 means that the surface of PVC particles is covered with some chlorine-free substance other than PVC, while the peak ratio value of 1 means that the surface of PVC particles is wholly covered with vinyl chloride components alone.

In the conventional process for producing CPVCs, no attention has been paid to the surface condition of PVC particles to be chlorinated and, accordingly, no attention has been paid to the chlorination degree distribution in the CPVC obtained. According to Inventions IV-1 to IV-4, heat-resistant vinyl chloride resin moldings having good heat resistance and smoothness are produced by paying due attention to the surface condition of PVC, which has an influence on the chlorination degree distribution of the CPVC.

The above PVC is a resin produced by polymerizing VCM alone or a mixture of VCM and another or other monomers copolymerizable with VCM in the conventional manner (e.g. suspension polymerization, bulk polymerization). The other monomers copolymerizable with VCM are not particularly restricted but include, among others, alkyl vinyl esters such as vinyl acetate; α-monoolefins such as ethylene and propylene; vinylidene chloride; styrene and the like. These may be used singly or two or more of them may be used in combination.

The viscosity average degree of polymerization of the above PVC is not critical but may be within the conventional range of 400 to 2,000.

The viscosity average degree of polymerization is determined by the measurement method according to JIS K 6721.

The method of chlorinating the above PVC is not particularly restricted but may be any of the methods known in the art. For example, the chlorination can be effected by contacting chlorine with the PVC after setting a state suspended or dissolved in a solvent or in a solid state. The degree of chlorination of the CPVC obtained by the above chlorination reaction is not particularly restricted provided that the molding produced by using that CPVC show a heat resistance temperature of not lower than 125° C.

In molding the heat-resistance vinyl chloride resin moldings or heat-resistance vinyl chloride resin pipes according to Inventions IV-1 to IV-4, compounding additives generally used in vinyl chlorine resins, such as stabilizers, lubricants, pigments, modifiers, antistatic agents and fillers, may be incorporated as necessary unless they defeat the objects of the invention.

The molding machine to be used in producing the moldings or resin pipes according to Inventions IV-1 to IV-4 is not particularly restricted but, for example, the molding can be effected by using a single-screw extruder, twin-screw two-directional parallel extruder, twin-screw two-directional conical extruder or twin-screw one-directional extruder or the like.

The mold, resin temperature and molding conditions in shaping the moldings or resin pipes according to Inventions IV-1 to IV-4 are not particularly restricted provided that the moldings obtained show a surface roughness kmax of not more than 0.5 µm. For constantly obtaining moldings with smoothness, however, the surface roughness of the molding is preferably such that the Rmax is not more than 5 µm and the Ra is not more than 0.2 µm. For that purpose, such surface treatment as chromium plating may have been given. The mold lip L/D ratio (L: lip length, D: port thickness) is preferably not less than 15.

The temperature at the mold tip is not particularly restricted, either. From the heat stability and long run viewpoint, the molding is preferably carried out within the temperature range of [190 +(t−120)/2] C. to [220+(t−120)]° C. where t (°C.) is the heat resistance temperature of the moldings.

The smoothness of the molding becomes better with the increase in resin temperature unless problems are encountered on the levels of degradation, long-run operability and physical properties. From the heat stability and long run viewpoint, however, it is preferred that the molding be carried out within the temperature range of [195 +(t−120)/2]° C. to [210 +(t−120)]° C. where t (°C.) is the heat resistance temperature of the molding.

The heat-resistant vinyl chloride resin molding according to Invention IV-2 and the heat-resistant vinyl chloride resin pipe according to Invention IV-4 are further characterized by a decomposition time of not shorter than 30 minutes as determined in an oven at 200° C. The "decomposition time of not shorter than 30 minutes" means that when a test specimen is allowed to stand in an oven at 200° C., such a phenomenon as foaming, darkening or discoloration will not occur in a time period shorter than 30 minutes. The reason why the decomposition time is restricted to not shorter than 30 minutes is that when the molding temperature is raised significantly, moldings having a heat resistance temperature not lower than 125° C. and an inside surface roughness Rmax of not more than 0.5 µm may be obtained but for a while but it becomes somewhat difficult to mold such products continuously over several hours and that, for enabling several hours of long run molding, the residual heat stability of molded products in an oven at 200° C. should be not shorter than 30 minutes as expressed in terms of decomposition time.

The heat-resistant vinyl chloride resin molding according to Invention IV-1 has a heat resistance temperature of not lower than 125° C. and a surface roughness Rmax of not more than 0.5 µm and therefore can be used at higher temperatures and, further, at higher pressure and stress, as compared with the prior art products having surface smoothness, hence the reliability can be markedly improved under the same use conditions.

Further, according to Invention IV-1, the resin itself can contribute to manifestation of good smoothness and, for attaining a surface roughness Rmax of not more than 0.5 µm, it is now not necessary to significantly raise the resin temperature and mold temperature. As a result, smoothness can be provided while the long run operability and heat stability are maintained.

The heat-resistant vinyl chloride resin molding according to Invention IV-2 produces all the effects of the above-mentioned heat-resistant vinyl chloride resin molding according to Invention IV-1 and further, with the heat-resistant vinyl chloride resin molding according to Invention IV-2, the resin itself can contribute to manifestation of good smoothness and, attaining a surface roughness Rmax of not more than 0.5 µm does not involve significantly increase in the resin temperature and mold temperature. Therefore, the molding has good residual heat stability (decomposition time) and it is possible to provide smoothness while the long run operability is maintained longer.

The heat-resistant vinyl chloride resin pipe according to Invention IV-3 has a heat resistance temperature of not lower than 125° C., so that it can be used at still higher temperatures and at a higher pressure and stress as compared with the conventional vinyl chloride resin pipes and, under the same use conditions, the reliability can be markedly improved. Since its inside surface roughness Rmax is not more than 0.5 µm, the proliferation of bacteria and other microorganisms in the pipe can be inhibited.

Further, according to Invention IV-3, the resin itself can contribute to good smoothness manifestation and, attaining a surface roughness Rmax of not more than 0.5 µm does not involve significantly increase in the resin temperature and mold temperature. As a result, smoothness can be provided while the long run operability and heat stability are maintained.

The heat-resistant vinyl chloride resin pipe according to Invention IV-4 produces all the effects of the above-mentioned heat-resistant vinyl chloride resin molding according to Invention IV-2 and, further, the inside surface roughness Rmax thereof is not more than 0.5 µm, bacteria and other microorganisms can be inhibited from propagating in the pipe. Furthermore, the elution of metals is slight and the pipe has smoothness as well, so that it is best suited for use as a piping material for ultrapure water.

The heat-resistant vinyl chloride resin pipe according to Invention IV-5 is produced by molding a heat-resistant vinyl chloride resin obtained by chlorinating a vinyl chloride resin having a viscosity average degree of polymerization of 900 to 1, 100 to a chlorine content of 66.0 to 67.5% by weight.

The heat-resistant vinyl chloride resin to be used in producing the heat-resistant vinyl chloride resin pipe according to Invention IV-5 is limited to CPVC obtained by chlorinating PVC. The surface condition, particle structure or the like of the PVC before chlorination to the CPVC to be used in the practice of Invention IV-5 is not particularly restricted.

The above-mentioned PVC is a resin produced by polymerizing VCM alone or a mixture of VCM and one or more other monomers copolymerizable with VCM in the conventional manner (e.g. by suspension polymerization, bulk polymerization). The other monomers copolymerizable with VCM are not particularly restricted but include, among others, alkyl vinyl esters such as vinyl acetate; α-monoolefins such as ethylene and propylene; vinylidene chloride; styrene and the like. These may be used singly or two or more of them may be used combinedly.

The viscosity average degree of polymerization of the above PVC is restricted to 900 to 1, 100. When the viscosity average degree of polymerization is less than 900, the SC resistance will become low and it will be impossible to produce resin pipes having sufficient fatigue strength. When it is above 1, 100, the problem of decreased smoothness or unevenness may arise. The viscosity average degree of polymerization is measured by the method according to JIS K 6721.

The method of chlorinating the above PVC is not particularly restricted but any of the methods known in the art can be used. For example, the chlorination can be effected by contacting chlorine with the PVC after setting a state suspended or dissolved in a solvent or in a solid state.

The chlorine content (degree of chlorination) of the CPVC obtained by the chlorination reaction is restricted to 66.0 to 67.5% by weight. When the chlorine content is less than 66.0% by weight, satisfactory heat resistance can no more obtained and when it is above 67.5%, lowered SC resistance, decreased smoothness and inside surface unevenness, among others, may cause problems. The chlorine content is determined by the method according to JIS K 7229.

In molding the resin pipe in the practice of Invention IV-5, compounding additives generally used in vinyl chloride resins, such as stabilizers, lubricants, pigments, modifiers, antistatic agents, fillers and the like, may be incorporated when necessary in amounts which will not defeat the objects of the invention.

The molding machine to be used in producing the resin pipe according to Inventions IV-5 is not particularly restricted but, for example, the molding can be effected by using a single-screw extruder, twin-screw two-directional parallel extruder, twin-screw two-directional conical extruder or twin-screw one-directional extruder or the like.

The mold, resin temperature and molding conditions in molding the resin pipe according to Inventions IV-5 are not particularly restricted. For constantly obtaining moldings with smoothness, however, the surface roughness of the mold is preferably such that the Rmax is not more than 5 μm and the Ra is not more than 0.2 μm. For that purpose, such surface treatment as chromium plating may have been given. The mold lip L/D ratio (L: lip length, D: port thickness) is preferably not less than 15.

The temperature at the mold tip is not particularly restricted, either. From the heat stability and long run viewpoint, the molding is preferably carried out within the temperature range of $[190 +(t-120)/2]°$ C. to $[220 +(t-120)]°$ C. where t (°C.) is the heat resistance temperature of the resin pipe.

The smoothness of the resin pipe becomes better with the increase in resin temperature unless problems are encountered on the levels of degradation, long-run operability and physical properties. From the heat stability and long run viewpoint, however, it is preferred that the molding be carried out within the temperature range of $[195 +(t-120)/2]°$ C. to $[210 +(t-120)]°$ C. where t (°C.) is the heat resistance temperature of the resin pipe.

The heat-resistant vinyl chloride resin pipe according to Invention IV-5 has a surface roughness Pmax of not more than 0.5 μm, without involving significant increases in resin temperature and mold temperature, since the resin itself can contribute to good smoothness manifestation. Therefore, the heat-resistant vinyl chloride resin pipe according to Invention IV-5 has good residual heat-stability and has been provided with smoothness, with the long run operability and heat stability being maintained. Accordingly, the heat-resistant vinyl chloride resin pipe according to Invention IV-5 is judiciously used, among others, as a piping Material for ultrapure water supply for plant use, where good smoothness, heat resistance and SC resistance are simultaneously required.

The heat-resistant vinyl chloride resin pipe according to Invention IV-6 is a heat-resistant vinyl chloride resin pipe according to Invention IV-3, Invention IV-4 or Invention IV-5 which is to serve as a piping material for pure water distribution.

The heat-resistant vinyl chloride resin pipe according to Invention IV-6 has a surface roughness Rmax of not more than 0.5 μm, without involving significant increases in resin temperature and mold temperature since the resin itself can contribute to good smoothness manifestation. Therefore, the heat-resistant vinyl chloride resin pipe according to Invention IV-6 has been provided with smoothness, with the long run operability and heat stability be maintained. Accordingly, the heat-resistant vinyl chloride resin pipe according to Invention IV-6 is judiciously used as a piping material for pure water supply, among others.

BEST MODES FOR CARRYING OUT THE INVENTION

The following examples illustrate the invention in further detail. They are, however, by no means limitative of the scope of the invention.

EXAMPLE 1

Preparation of a PVC Resin

A polymerizer (pressure-resistant autoclave; capacity 100 liters) was charged with 50 kg of deionized water as well as 700 ppm (on vinyl chloride monomer basis) of partially saponified polyvinyl acetate with an average saponification degree of 76 mole percent and a polymerization degree of 700, 150 ppm (on vinyl chloride monomer basis) of polyoxyethylene alkyl ether sulfate salt and 500 ppm (on vinyl chloride monomer basis) of tert-butyl peroxyneodecanoate. Then, the polymerizer was deaerated to 45 mmHg and, thereafter, 33 kg of vinyl chloride monomer was charged thereinto and stirring was initiated.

The polymerizer was heated to 57° C. to thereby initiate the polymerization and this temperature was maintained until termination of the polymerization reaction.

When the conversion by polymerization reached 90%, the reaction was discontinued, the unreacted monomer in the polymerizer was recovered, and the polymer slurry was then discharged out of the system and dehydrated and dried to give a PVC resin.

The ESCA value indicative of the extent of skin layer occurrence in the PVC resin obtained was 0.65. The BET specific surface area was 1.4 $m^2/g$. The ESCA value and BET specific surface area were determined by the methods mentioned later herein.

Preparation of a CPVC Resin

A glass-lined reactor (capacity 300 liters) was charged with 150 kg of deionized water and 45 kg of the PVC resin obtained in the above manner, the PVC resin was dispersed in water by stirring and then the reactor was heated and the inside temperature was maintained at 70° C. Then, nitrogen gas was blown into the reactor for purging the reactor inside with nitrogen gas. Then, chlorine gas was blown into the reactor and the chlorination of the PVC resin was effected while irradiating the reactor inside with ultraviolet rays using a mercury lamp. The chlorination reaction was continued while checking the progress of the chlorination reaction by determining the hydrochloric acid concentration in the reactor and, when the chlorine content of the product CPVC resin arrived at 66.5% by weight, the supply of chlorination gas was discontinued and thus the chlorination reaction was finished.

Further, the unreaction chlorine was eliminated by blowing nitrogen gas into the reactor, the resin obtained was neutralized with sodium hydroxide, then washed with water, dehydrated and dried to give a CPVC resin as a powder. The chlorine content of the CPVC resin was. 66.5% by weight.

EXAMPLE 2

A PVC resin was prepared in the same manner as in Example 1 except that the partially saponified polyvinyl acetate was used in an amount of 800 ppm.

A CPVC resin was prepared in the same manner as in Example 1

EXAMPLE 3

A PVC resin was prepared in the same manner as in Example 1 except that the partially saponified polyvinyl acetate was used in an amount of 400 ppm.

A CPVC resin was prepared in the same manner as in Example 1.

EXAMPLE 4

Preparation of a PVC Resin

A polymerizer (pressure-resistant autoclave; capacity 100 liters) was charged with 50 kg of deionized water as well as 750 ppm (on vinyl chloride monomer basis) of partially saponified polyvinyl acetate with an average saponification degree of 72 mole percent and a polymerization degree of 750, 150 ppm. (on vinyl chloride monomer basis) of polyoxyethylene alkyl ether sulfate salt and 500 ppm (on vinyl chloride monomer basis) of tert-butyl peroxyneodecanoate. Then, the polymerizer was deaerated to 45 mmHg and, thereafter, 33 kg of vinyl chloride monomer was charged thereinto and stirring was initiated.

The polymerizer was heated to 57° C. to thereby initiate the polymerization and this temperature was maintained until termination of the polymerization reaction.

When the conversion by polymerization reached 90%, the reaction was discontinued, the unreacted monomer in the polymerizer was recovered, and the polymer slurry was then discharged out of the system and dehydrated and dried to give a PVC resin.

Preparation of a CPVC Resin

A glass-lined reactor (capacity 300 liters) was charged with 150 kg of deionized water and 45 kg of the PVC resin obtained in the above manner, the PVC resin was dispersed in water by stirring and then the reactor was heated and the inside temperature was maintained at 70° C. Then, nitrogen gas was blown into the reactor for purging the reactor inside with nitrogen gas. Then, chlorine gas was blown into the reactor and the chlorination of the PVC resin was carried out. In this chlorination, the reaction was allowed to proceed while irradiating the reactor inside with ultraviolet rays using a mercury lamp. The chlorination reaction was continued while checking the progress of the chlorination reaction by determining the hydrochloric acid concentration in the reactor and, when the chlorine content of the product CPVC resin arrived at 66.5% by weight, the supply of chlorination gas was discontinued and thus the chlorination reaction was finished.

Further, the unreaction chlorine was eliminated by blowing nitrogen gas into the reactor, the resin obtained was neutralized with sodium hydroxide, then washed with water, dehydrated and dried to give a CPVC resin as a powder. The chlorine content of the CPVC resin was 67.5% by weight.

COMPARATIVE EXAMPLES 1 to 4

In Comparative Examples 1 to 4, PVC resins were prepared by carrying out the polymerization appropriately using partially saponified polyvinyl acetate and polyoxyethylene alkyl ether sulfate salt.

CPVCs were prepared in the same manner as in Example 1.

The CPVCs obtained in the above examples and comparative examples were evaluated for workability (measurement of gelation temperature), heat stability and Vicat softening temperature by the methods mentioned later herein. The results are shown in Table 1.

TABLE 1

|  | Example | | | | Compar. Ex. | | | |
| --- | --- | --- | --- | --- | --- | --- | --- | --- |
|  | 1 | 2 | 3 | 4 | 1 | 2 | 3 | 4 |
| ESCA value | 0.65 | 0.80 | 0.70 | 0.80 | 0.17 | 0.65 | 0.70 | 0.10 |
| BET specific surface area (m$^2$/g) | 1.4 | 1.3 | 4.0 | 2.5 | 1.3 | 0.5 | 9.5 | 0.8 |
| Chlorine content (wt %) | 66.5 | 66.5 | 66.5 | 67.5 | 66.5 | 66.5 | 66.5 | 66.5 |
| Performance evaluation | | | | | | | | |
| Workability (gelation temp.) (° C.) | 178 | 176 | 175 | 177 | 189 | 192 | 172 | 198 |
| Heat stability (min) | 34 | 35 | 35 | 57 | 29 | 30 | 23 | 28 |
| Vicat softening temp. (° C.) | 125 | 124 | 124 | 129 | 121 | 124 | 122 | 122 |

EXAMPLE 5

Preparation of a PVC Resin

A polymerizer (pressure-resistant autoclave; capacity 100 liters) was charged with 50 kg of deionized water, 750 ppm (on vinyl chloride monomer basis) of partially saponified polyvinyl acetate with an average saponification degree of 72 mole percent and a polymerization degree of 750, 150 ppm (on vinyl chloride monomer basis) of polyoxyethylene alkyl ether sulfate salt and 500 ppm. (on vinyl chloride monomer basis) of tert-butyl peroxyneodecanoate. Then, the polymerizer was deaerated to 45 mmHg and, thereafter, 33 kg of vinyl chloride monomer was charged thereinto and stirring was initiated.

The polymerizer was heated to 57° C. to thereby initiate the polymerization and this temperature was maintained until termination of the polymerization reaction.

When the conversion by polymerization reached 90%, the reaction was discontinued, the unreacted monomer in the polymerizer was recovered, and the polymer slurry was then discharged out of the system and dehydrated and dried to give a PVC resin.

The ESCA value indicative of the extent of skin layer occurrence in the PVC resin obtained was 0.80. The BET specific surface area was 2.5 m$^2$/g. The ESCA value and BET specific surface area were determined by the methods mentioned later herein.

Preparation of a CPVC Resin

A glass-lined reactor (capacity 300 liters) was charged with 150 kg of deionized water and 45 kg of the PVC resin obtained in the above manner, the PVC resin was dispersed in water by stirring and then the reactor was heated and the inside temperature was maintained at 110° C. Then, nitrogen gas was blown into the reactor for purging the reactor inside with nitrogen gas. Then, chlorine gas was blown into the reactor and the chlorination of the PVC resin was carried out. The chlorination reaction was continued while checking the progress of the chlorination reaction by determining the hydrochloric acid concentration in the reactor and, when the chlorine content of the product CPVC resin arrived at 66.5% by weight, the supply of chlorination gas was discontinued and thus the chlorination reaction was finished.

Further, the unreaction chlorine was eliminated by blowing nitrogen gas into the reactor, the resin obtained was neutralized with sodium hydroxide, then washed with water, dehydrated and dried to give a CPVC resin as a powder. The chlorine content of the CPVC resin was 65.5% by weight.

EXAMPLES 6 to 8

The PVC resin preparation in Examples 6 to 8 was made in the same manner as in Example 5.

The CPVC resin preparation in Example 6 was made in the same manner as in Example 5 except that the reactor inside temperature was maintained at 70° C. for 1 hour and, after starting the chlorination reaction, it was raised to 110° C. in minutes and the chlorination was continued at that temperature. The chlorine content was 67.5% by weight.

The CPVC resin preparation in Example. 7 was made in the same manner as in Example 5 except that the reactor inside temperature was maintained at 70° C. for 30 minutes and, after starting the chlorination reaction, it was rapidly raised to 90° C. and the chlorination was continued at that temperature for 30 minutes and then the temperature was further raised to 110° C. rapidly and the chlorination was continued at that temperature. The chlorine content was 68.5% by weight.

The CPVC resin preparation in Example 8 was made in the same manner as in Example 5 except that the reactor inside temperature was maintained at 70° C. and, in initiating the chlorination reaction, the reactor inside was irradiated with ultraviolet rays using a mercury lamp to allow the reaction to proceed and, after 1 hour, the temperature was rapidly raised to 110° C. and the chlorination was continued at that temperature. The chlorine content was 66.5% by weight.

COMPARATIVE EXAMPLE 5

Preparation of a PVC Resin.

A polymerizer (pressure-resistant autoclave; capacity 100 liters) was charged with 50 kg of deionized water, 1,200 ppm (on vinyl chloride monomer basis) of partially saponified polyvinyl acetate (as suspending and dispersing agent) with an average saponification degree of 72 mole percent and a polymerization degree of 750 and 550 ppm (on vinyl chloride monomer basis) of tert-butyl peroxyneodecanoate. Then, the polymerizer was deaerated to 45 mmHg and, thereafter, 33 kg of vinyl chloride monomer was charged thereinto and stirring was started.

The polymerizer was heated to 57° C. to thereby initiate the polymerization and this temperature was maintained until termination of the polymerization reaction.

When the conversion by polymerization reached 90%, the reaction was discontinued, the unreacted monomer in the polymerizer was recovered, and the polymer slurry was then discharged out of the system and dehydrated and dried to give a PVC resin.

The ESCA value indicative of the extent of skin layer occurrence in the PVC resin obtained was 0.2. The BET specific surface area was 0.7 m²/g. The ESCA value and BET specific surface area were determined by the methods mentioned later herein.

The CPVC resin preparation was made in the same manner as in Example 5 and, at the time when the chlorine content was 66.5% by weight, the chlorination reaction was terminated and the resin was recovered by the same treatment as mentioned above.

COMPARATIVE EXAMPLE 6

The PVC resin preparation was made in the same manner as in Comparative Example 5.

The CPVC resin preparation was made in the same manner as in Example 4.

The CPVCs obtained in the above examples and comparative examples were evaluated for workability (measurement of gelation temperature), heat stability and Vicat softening temperature by the methods mentioned later herein. The results are shown in Table 2.

TABLE 2

|  |  | Example | | | | Compar. Ex. | |
| --- | --- | --- | --- | --- | --- | --- | --- |
|  |  | 5 | 6 | 7 | 8 | 5 | 6 |
| PVC |  |  |  |  |  |  |  |
| ESCA value |  | 0.8 | 0.8 | 0.8 | 0.8 | 0.2 | 0.2 |
| BET specific surface area (m²/g) |  | 2.5 | 2.5 | 2.5 | 2.5 | 0.7 | 0.7 |
| CPVC |  |  |  |  |  |  |  |
| Chlorine content (wt %) | X | 66.5 | 67.5 | 68.5 | 66.5 | 66.5 | 67.5 |
| Weight of methanol for initiating precipitation (g) | Y | 33 | 29 | 28 | 32 | 25 | 22 |
| Weight of methanol at 80% precipitation (g) | Z | 61 | 58 | 55 | 59 | 50 | 46 |
| Relation (1) |  | Satisfied | Satisfied | Satisfied | Satisfied | Not satisfied | Not satisfied |
| Relation (2) |  | Satisfied | Satisfied | Satisfied | Satisfied | Not satisfied | Not satisfied |
| Performance evaluation |  |  |  |  |  |  |  |
| Workability (gelation temp.) (° C.) |  | 175 | 177 | 180 | 176 | 190 | 198 |
| Heat stability (min) |  | 34 | 37 | 39 | 33 | 30 | 29 |
| Vicat softening temp. (° C.) |  | 125 | 129 | 135 | 124 | 124 | 127 |

Evaluation Methods (1) ESCA

The surface of PVC resin particles was scanned by ESCA (electron spectroscopy for chemical analysis) and the vinyl chloride resin component on the particle surface was quantitatively analyzed based on the amount of chlorine as estimated from the peak areas for $C_{15}$ (carbon), $Cl_{15}$ (chlorine) and $O_{15}$ (oxygen)

Apparatus used: Nippon Denshi model JPS-90FX;

Operation conditions: X ray sourse (Mg Kα line), 12 kV, 15 mA;

Scanning speed: 200 ms/0.1 eV/scan;

Pass energy: 30 eV.

(2) BET Specific Surface Area Measurement

About 2 g of the test sample was placed in a sample tube and the sample was deaerated under vacuum at 70° C. for 3 hours (pretreatment), and the sample was accurately weighed. After completion of the pretreatment, the sample was mounted on the measuring part (40° C. thermostat) and the measurement was started. After measurement, BET plotting was carried out using the data on the adsorption side of the adsorption isotherm, and the specific surface area was calculated.

The specific surface area measurement apparatus "BEL-SORP 28SA" (product of Nippon Bell) was used as the measurement apparatus and nitrogen gas as the measurement gas.

(3) Workability (Determination of Gelation Temperature)

Using Haake's "Rheocord 90", 55 g of the resin composition specified below was kneaded at the number of revolutions of 40 rpm while raising the temperature from 150° C. at a rate of 5° C. per minute, and the temperature at which the mixing torque was maximum was determined. The resin composition was composed of 100 weight parts of CPVC resin, 3 weight parts of tribasic lead sulfate, 1 weight part of dibasic lead stearate and 10 weight parts of MBS resin (methyl methacrylate-butadiene-styrene copolymer)

(4) Heat Stability Test

The above resin composition was fed to a kneader comprising two 8-inch rolls and kneaded at a roll surface temperature of 205° C. and, after the work was wrapped around the roll, small segments of the CPVC resin sheet were cut out at 3-minute intervals while giving cuts to the CPVC resin sheet on the roll at 30-second intervals. The resin sheet segments cut out were examined for discoloration and the heat stability was evaluated in terms of the time until the resin had assumed a dark brown color.

(5) Vicat Softening Temperature

Test samples, 15 mm square in size, were cut out from the 5-mm-thick CPVC sheet produced in the above heat stability test and tested according to JIS K 7206 (weight 1.0 kgf).

(6) Measurement of Agglomerate Diameter

The PVC resin sample was sealed in a gelatin capsule together with an acrylic monomer and allowed to stand at ordinary temperature for 24 hours for allowing the acrylic monomer to polymerize. Thereafter, the capsule was cut to a thickness of about 90 nm using an ultramicrotome (product of LKB Instruments) and the thus-prepared ultrathin section was mounted on a grid mesh and observed under a transmission electron microscope (model JEM-1010, product of Nippon Denshi) The magnification was ×5,000.

(7) Void Ratio, Pore Distribution and Mean Pore Size The void ratio was determined using a mercury porosimeter and measuring the volume of mercury filled in 100 g of the PVC resin at 2,000 kg/cm². The void ratio is the percent volume of voids relative to the volume of resin particles.

The mean pore size and pore distribution were determined by continuously measuring the mercury volume during the process of raising the pressure from 0 to 2,000 kg/cm² on the occasion of void ratio measurement to thereby determine the pore size distribution, and the mean pore size was then calculated.

(8) Chlorine Content

The determination was carried out according to JIS K 7229.

(9) Absorbance Measurement

The CPVC was dissolved in tetrahydrofuran and a solution with a concentration of 1 g/kg was prepared. The absorbance at 235 nm was measured (cell length 1 cm, measuring temperature 23° C.). The apparatus used was Hitachi model "U-3300".

EXAMPLE 9

Preparation of a PVC Resin

A polymerizer (pressure-resistant autoclave; capacity 100 liters) was charged with 50 kg of deionized water, 450 ppm (on vinyl chloride monomer basis) of partially saponified polyvinyl acetate (average saponification degree 72 mole percent; polymerization degree 700), 1,800 ppm (on same basis) of sorbitan monolaurate, 1,200 ppm (on same basis) of lauric acid, 200 ppm (on same basis) of polyacrylamide (Brookfield viscosity of 0. 1% (by weight) aqueous solution: 51 cps at 20° C. and 1 atmosp here) and 550 ppm (on same basis) of tert-butyl peroxyneodecanoate. Then, the polymerizer was deaerated to 45 mmHg and, thereafter, 33 kg of vinyl chloride monomer was charged thereinto and stirring was started.

The polymerizer was heated to 57° C. to thereby initiate the polymerization and this temperature was maintained until termination of the polymerization reaction. When the conversion by polymerization reached 90%, the reaction was discontinued, the unreacted monomer in the polymerizer was recovered, and the polymer slurry was then discharged out of the system and dehydrated and dried to give a PVC resin.

The PVC resin obtained had a BET specific surface area of 4.1 m²/g. The ESCA value indicative of the extent of skin layer occurrence was 0.85. T he agglomerate diameter was as shown in Table 1. The BET specific surface area, ESCA value and agglomerate diameter were determined by the methods mentioned herein.

Preparation of a CPVC Resin

A glass-lined reactor (capacity 300 liters) was charged with 150 kg of deionized water and 45 kg of the PVC resin obtained in the above manner, the PVC resin was dispersed in water by stirring and then the reactor was heated and the temperature was maintained at 110° C. Then, nitrogen gas was blown into the reactor for purging the reactor inside with nitrogen gas. Then, chlorine gas was blown into the reactor and the chlorination of the PVC resin was carried out. The chlorination reaction was continued while checking the progress of the chlorination reaction by determining the hydrochloric acid concentration in the reactor and, when the chlorine content of the product CPVC resin arrived at 68.0% by weight, the supply of chlorination gas was discontinued and thus the chlorination reaction was finished.

Further, the unreaction chlorine was eliminated by blowing nitrogen gas into the reactor, the resin obtained was neutralized with sodium hydroxide, then washed with water, dehydrated and dried to give a CPVC resin as a powder. The chlorine content of the CPVC resin was 68.0% by weight.

EXAMPLE 10

The PVC resin preparation was made in the same manner as in Example 9.

The CPVC resin preparation was made in the following manner.

Preparation of a CPVC Resin

A glass-lined reactor (capacity 300 liters) was charged with 150 kg of deionized water and 45 kg of the PVC resin obtained in the above manner, the PVC resin was dispersed in water by stirring and then the reactor was heated and the temperature was maintained at 70° C. Then, nitrogen gas was blown into the reactor for purging the reactor in sidewith nitrogen gas. Then, chlorine gas was blown into the reactor and the chlorination of the PVC resin was effected by irradiating the reactor inside with ultraviolet rays using a mercury lamp. The chlorination reaction was continued while checking the progress of the chlorination reaction by determining the hydrochloric acid concentration in the reactor and, when the chlorine content of the product CPVC resin arrived at 68.0% by weight, the supply of chlorination gas was discontinued and thus the chlorination reaction was finished.

Further, the unreacted chlorine was eliminated by blowing nitrogen gas into the reactor, the resin obtained was neutralized with sodium hydroxide, then washed with water, dehydrated and dried to give a CPVC resin as a powder. The chlorine content of the CPVC resin was 68.0% by weight.

EXAMPLE 11

The PVC resin preparation was made in the same manner as in Example 9 except that the partially saponified polyvinyl acetate (average degree of saponification 72 mole percent, degree of polymerization 700) was used in an amount of 450 ppm and sorbitan monolaurate in an amount of 1,800 ppm.

The CPVC resin preparation was made in the same manner as in Example 10.

EXAMPLE 12

The PVC resin preparation was made in the same manner as in Example 9 except that the partially saponified polyvinyl acetate (average degree of saponification 72 mole percent, degree of polymerization 700) was used in an amount of 1,100 ppm and sorbitan monolaurate in an amount of 1,200 ppm.

The CPVC resin preparation was made in the same manner as in Example 9.

COMPARATIVE EXAMPLE 7

The PVC resin preparation was made in the same manner as in Example 9 except that 250 ppm of another partially saponified polyvinyl acetate species (average degree of saponification 76 mole percent, degree of polymerization 1,000) was used and 40 ppm of polyoxyethylene alkyl ether sulfate salt was used in lieu of sorbitan monolaurate.

The CPVC resin preparation was made in the same manner as in Example 9.

COMPARATIVE EXAMPLE 8

The PVC resin preparation was made in the manner mentioned below.

The CPVC resin preparation was made in the same manner as in Example 10.

PVC Resin Preparation

A polymerizer (pressure-resistant autoclave; capacity 100 liters) was charged with 50 kg of deionized water and 1,200 ppm (on vinyl chloride monomer basis) of partially saponified polyvinyl acetate (average saponification degree 88 mole percent; polymerization degree 1,000) as suspending and dispersing agent and, then, 550 ppm (on same basis) of tert-butyl peroxyneodecanoate was added. Then, the polymerizer was deaerated to 45 mmHg and, thereafter, 33 kg of vinyl chloride monomer was charged thereinto and stirring was started.

The polymerizer was heated to 57° C. to thereby initiate the polymerization and this temperature was maintained until termination of the polymerization reaction. When the conversion by polymerization reached 50%, the reaction was discontinued, the unreacted monomer in the polymerizer was recovered, and the polymer slurry was then discharged out of the system and dehydrated and dried to give a PVC resin.

The PVC resin obtained had a BET specific surface area of 0.50 $m^2/g$. The ESCA value indicative of the extent of skin layer occurrence was 0.11. The agglomerate diameter was as shown in Table 1. The BET specific surface area, ESCA value and agglomerate diameter were determined by the methods mentioned above.

COMPARATIVE EXAMPLE 9

The PVC resin preparation was made in the manner mentioned below.

The CPVC resin preparation was made in the same manner as in Example 9.

PVC Resin Preparation

A polymerizer (pressure-resistant autoclave; capacity 100 liters) was charged with 50 kg of deionized water and 1,200 ppm (on vinyl chloride monomer basis) of partially saponified polyvinyl acetate (average saponification degree 72 mole percent; polymerization degree 750) as suspending and dispersing agent and, then, 550 ppm (on same basis) of tert-butyl peroxyneodecanoate was added. Then, the polymerizer was deaerated to 45 mmHg and, thereafter, 33 kg of vinyl chloride monomer was charged thereinto and stirring was started.

The polymerizer was heated to 57° C. to thereby initiate the polymerization and this temperature was maintained until termination of the polymerization reaction. When the conversion by polymerization reached 90%, the reaction was discontinued, the unreacted monomer in the polymerizer was recovered, and the polymer slurry was then discharged out of the system and dehydrated and dried to give a PVC resin.

The PVC resin obtained had a BET specific surface area of 0.7 $m^2/g$. The ESCA value indicative of the extent of skin layer occurrence was 0.2. The agglomerate diameter was as shown in Table 1. The BET specific surface area, ESCA value and agglomerate diameter were determined by the methods mentioned above.

The PVC resins and CPVC resins obtained in the above examples and comparative examples were subjected to performance evaluation and the results obtained are shown in Table 3.

TABLE 3

|  | Ex. 9 | Ex. 10 | Ex. 11 | Ex. 12 | Compar Ex. 7 | Compar Ex. 8 | Compar Ex. 9 |
|---|---|---|---|---|---|---|---|
| PVC |  |  |  |  |  |  |  |
| BET specific surface area ($m^2/g$) | 4.1 | 4.1 | 3.5 | 1.7 | 1.5 | 0.50 | 0.70 |
| ESCA value | 0.85 | 0.85 | 0.75 | 0.62 | 0.65 | 0.11 | 0.20 |
| Agglomerate diameter ($\mu$m) | 2.1 | 2.1 | 2.4 | 3.8 | 8.5 | 0.7 | 2.7 |
| Powder handling | Good | Good | Good | Good | Good | Lot of dust | Good |
| CPVC |  |  |  |  |  |  |  |
| Mode of chlorination | Heat | Light | Light | Heat | Heat | Light | Heat |
| Chlorination percentage (wt %) | 68.0 | 68.0 | 68.0 | 68.0 | 68.0 | 68.0 | 68.0 |
| Performance evaluation |  |  |  |  |  |  |  |
| Workability (gelation temp.) (° C.) | 169 | 172 | 173 | 174 | 189 | 181 | 199 |
| Heat stability (min.) | 35 | 34 | 34 | 34 | 30 | 30 | 27 |
| Vicat softening temp. (° C.) | 142 | 140 | 140 | 140 | 130 | 131 | 128 |

EXAMPLE 13

Preparation of a PVC Resin

A polymerizer (pressure-resistant autoclave; capacity 100 liters) was charged with 50 kg of deionized water, 450 ppm (on vinyl chloride monomer basis) of partially saponified polyvinyl acetate (average saponification degree 72 mole percent; polymerization degree 700), 1,200 ppm (on same basis) of sorbitan monolaurate, 1,200 ppm (on same basis) of lauric acid, 150 ppm (on same basis) of polyacrylamide (Brookfield viscosity of 0.1% (by weight) aqueous solution: 51 cps at 20° C. and 1 atmosphere) and 550 ppm (on same basis) of tert-butyl peroxyneodecanoate. Then, the polymerizer was deaerated to 45 mmHg and, thereafter, 33 kg of vinyl chloride monomer was charged thereinto and stirring was started.

The polymerizer was heated to 57° C. to thereby initiate the polymerization and this temperature was maintained until termination of the polymerization reaction. When the conversion by polymerization reached 90%, the reaction was discontinued, the unreacted monomer in the polymerizer was recovered, and the polymer slurry was then discharged out of the system and dehydrated and dried to give a PVC resin.

The PVC resin obtained had a BET specific surface area of 3.7 $m^2/g$. The ESCA value indicative of the extent of skin layer occurrence was 0.80. The void ratio was 35.1% by volume.

Preparation of a CPVC Resin

A glass-lined reactor (capacity 300 liters) was charged with 150 kg of deionized water and 45 kg of the PVC resin obtained in the above manner, the PVC resin was dispersed in water by stirring and then the reactor was heated and the temperature was maintained at 90° C. Then, nitrogen gas was blown into the reactor for purging the reactor inside with nitrogen gas. Then, chlorine gas was blown into the reactor and the chlorination of the PVC resin was carried out. For controlling the progress of the reaction, an aqueous solution of hydrogen peroxide was added at a rate of 25 ppm/Hr relative to the charged resin amount after arrival of the chlorine content at 61.0% by weight. The chlorination reaction was continued while checking the hydrochloric acid concentration in the reactor and, when the chlorine content of the product CPVC resin reached 68.5% by weight, the chlorine gas feeding was discontinued and the chlorination reaction was terminated.

Further, nitrogen gas was blown into the reactor to thereby eliminate the unreacted chlorine gas, and the resin obtained was neutralized with sodium hydroxide and sodium hydrogen carbonate, washed with water, dehydrated and dried to give a powdery CPVC resin. The chlorine content of the CPVC resin obtained was 68.5% by weight. The void ratio for the pore size range of 0.001 to 0.1 $\mu$m was 15% by volume relative to the total void volume.

EXAMPLE 14

The PVC resin preparation was made in the same manner as in Example 13.

The CPVC resin preparation was made in the manner mentioned below.

CPVC Resin Preparation

A glass-lined reactor (capacity 300 liters) was charged with 150 kg of deionized water and 45 kg of the PVC resin obtained in the above manner, the PVC resin was dispersed in water by stirring and then the reactor was heated and the reactor inside was maintained at 70° C. Then, nitrogen gas was blown into the reactor for purging the reactor inside with nitrogen gas. Then, chlorine gas was blown into the reactor and the chlorination of the PVC resin was effected while the reactor inside was irradiated with ultraviolet rays using a mercury lamp. The chlorination reaction was continued while checking the progress of the chlorination reaction by determining the hydrochloric acid concentration in the reactor and, when the chlorine content of the product CPVC resin reached 68.5% by weight, the chlorine gas feeding was discontinued and the chlorination reaction was terminated.

Further, nitrogen gas was blown into the reactor to thereby eliminate the unreacted chlorine gas, and the resin obtained was neutralized with sodium hydroxide and sodium hydrogen carbonate, washed with water, dehydrated and dried to give a powdery CPVC resin. The chlorine content of the CPVC resin obtained was 68. 5% by weight. The void ratio for the pore size range of 0.001 to 0.1 μm was 17.2% by volume relative to the total void volume.

EXAMPLE 15

The PVC resin preparation was made in the same manner as in Example 13 except that the concentration of partially saponified polyvinyl acetate (average saponification degree 72 mole percent; polymerization degree 700) was 400 ppm and the concentration of sorbitan monolaurate was 1,500 ppm.

The CPVC resin preparation was made in the same manner as in Example 13.

EXAMPLE 16

The PVC resin preparation was made in the same manner as in Example 13 except that the concentration of partially saponified polyvinyl acetate (average saponification degree 72 mole percent; polymerization degree 700) was 1,000 ppm and the concentration of sorbitan monolaurate was 900 ppm.

The CPVC resin preparation was made in the same manner as in Example 14.

EXAMPLE 17

The PVC resin preparation was made in the same manner as in Example 13 except that a different partially saponified polyvinyl acetate species having an average saponification degree of 76 mole percent and a polymerization degree of 1,000 was used in an amount of 700 ppm and 140 ppm of polyoxyethylene alkyl ether sulfate salt was used in lieu of sorbitan monolaurate.

The CPVC resin preparation was made in the same manner as in Example 13.

EXAMPLE 18

The PVC resin preparation was made in the same manner as in Example 13 except that the partially saponified polyvinyl acetate (average saponification degree 72 mole percent; polymerization degree 700) was used in an amount of 450 ppm and sorbitan monolaurate was used in an amount of 1,200 ppm. The CPVC resin preparation was made in the same manner as in Example 14.

COMPARATIVE EXAMPLE 8

The PVC resin preparation was made in the manner mentioned below.

The CPVC resin preparation was made in the same manner as in Example 14.

PVC Resin Preparation

A polymerizer (pressure-resistant autoclave; capacity 100 liters) was charged with 50 kg of deionized water and 1,200 ppm (on vinyl chloride monomer basis) of partially saponified polyvinyl acetate (average saponification degree 72 mole percent; polymerization degree 750) as suspending and dispersing agent, and 550 ppm (on vinyl chloride monomer basis) of tert-butyl peroxyneodecanoate was added. Then, the polymerizer was deaerated to 45 mmHg and, thereafter, 33 kg of vinyl chloride monomer was charged thereinto and stirring was started.

The polymerizer was heated to 57° C. to thereby initiate the polymerization and this temperature was maintained until termination of the polymerization reaction. When the conversion by polymerization reached 90%, the reaction was discontinued, the unreacted monomer in the polymerizer was recovered, and the polymer slurry was then discharged out of the system and dehydrated-and dried to give a PVC resin.

The PVC resin obtained had a BET specific surface area value of 0.7 m²/g. The ESCA value indicative of the skin layer occurrence extent was 0.2. The void ratio was 5.2% by volume.

COMPARATIVE EXAMPLE 9

The PVC resin preparation was made in the same manner as in Example 13 except that a different partially saponified polyvinyl acetate species having an average saponification degree of 76 mole percent and a polymerization degree of 1,000 was used in an amount of 800 ppm and 80 ppm of polyoxyethylene alkyl ether sulfate salt was used in lieu of sorbitan monolaurate.

The CPVC resin preparation was made in the same manner as in Example 13.

COMPARATIVE EXAMPLE 10

The PVC resin preparation was made in the manner mentioned below.

The CPVC resin preparation was made in the same manner as in Example 14.

PVC Resin Preparation

A polymerizer (pressure-resistant autoclave; capacity 100 liters) was charged with 50 kg of deionized water and 1,000 ppm (on vinyl chloride monomer basis) of partially saponified polyvinyl acetate (average saponification degree 88 mole percent; polymerization degree 1,000) as suspending and dispersing agent, and 550 ppm (on vinyl chloride monomer basis) of tert-butyl peroxyneodecanoate was added. Then, the polymerizer was deaerated to 45 mmHg and, thereafter, 33 kg of vinyl chloride monomer was charged thereinto and stirring was started.

The polymerizer was heated to 57° C. to thereby initiate the polymerization and this temperature was maintained until termination of the polymerization reaction. When the conversion by polymerization reached 45%, the reaction was discontinued, the unreacted monomer in the polymerizer was recovered, and the polymer slurry was then discharged out of the system and dehydrated and dried to give a PVC resin.

The PVC resin obtained had a BET specific surface area value of 0.45 m²/g. The ESCA value indicative of the skin layer occurrence extent was 0.16. The void ratio, mean pore size and volume percentage of pores 0.001 to 0.1 μm in size in the pore size distribution were as shown in Table 1.

The PVC resins and CPVC resins obtained in the above examples and comparative examples were measured for BET specific surface area, ESCA peak ratio as well as void ratio, pore size distribution and mean pore size by the measurement methods mentioned above. The results are shown in Table 4.

TABLE 4

|  | Ex. 13 | Ex. 14 | Ex. 15 | Ex. 16 | Ex. 17 | Ex. 18 | Compar. Ex. 10 | Compar. Ex. 11 | Compar. Ex. 12 |
|---|---|---|---|---|---|---|---|---|---|
| PVC resin |  |  |  |  |  |  |  |  |  |
| BET specific surface area ($m^{2/g}$) | 3.7 | 3.7 | 4.5 | 1.5 | 2.9 | 3.2 | 0.7 | 2.4 | 0.45 |
| ESCA-chlorine peak ratio | 0.8 | 0.8 | 0.88 | 0.65 | 0.73 | 0.72 | 0.2 | 0.65 | 0.16 |
| Void ratio (vol. %) | 35.1 | 35.1 | 37.2 | 30.7 | 27.9 | 33.6 | 25.2 | 25.7 | 31.5 |
| Vol. % of 0.001–0.1 $\mu$m pores | 4.5 | 4.5 | 6 | 3.2 | 2.2 | 1 | 0.1 | 0.4 | 3 |
| Mean pore size($\mu$m) | 0.26 | 0.26 | 0.22 | 0.45 | 0.31 | 0.27 | 0.61 | 0.55 | 0.32 |
| CPVC |  |  |  |  |  |  |  |  |  |
| Degree of chlorination (wt %) | 68.5 | 68.5 | 68.5 | 68.5 | 68.5 | 68.5 | 68.5 | 68.5 | 68.5 |
| Vol. % of 0.001–0.1 $\mu$m pores | 15 | 17.2 | 17.9 | 10.8 | 7.9 | 6.2 | 0.9 | 3.7 | 4.3 |
| Performance evaluation results |  |  |  |  |  |  |  |  |  |
| Workability (gelation temp.) (° C.) | 173 | 170 | 171 | 172 | 176 | 176 | 202 | 184 | 193 |
| Heat stability (min.) | 36 | 36 | 38 | 33 | 33 | 34 | 27 | 32 | 28 |
| Vicat softening temp. (° C.) | 144 | 142 | 143 | 141 | 140 | 140 | 131 | 137 | 131 |

EXAMPLE 19

PVC Preparation

A polymerizer (pressure-resistant autoclave; capacity 100 liters) was charged with 50 kg of deionized water, 400 ppm (on vinyl chloride monomer basis; hereinafter same shall apply) of partially saponified polyvinyl acetate (average saponification degree 72 mole percent; polymerization degree 700), 1,600 ppm of sorbitan monolaurate (HLB 8.6), 1,500 ppm of lauricacid, 100ppm of polyacrylamide (Brookfield viscosity of a 0.1% (by weight) aqueous solution at 20° C. and 1 atm.: 51 cps) and 500 ppm of tert-butyl peroxyneodecanoate. Then, the polymerizer was deaerated to 45 mmHg and, thereafter, 33 kg of vinyl chloride monomer was charged thereinto and stirring was started. The polymerizer was heated to 57° C. to thereby initiate the polymerization and this temperature was maintained until termination of the polymerization reaction.

When the conversion by polymerization reached 90%, the reaction was discontinued, the unreacted monomer in the polymerizer was recovered, and the polymer slurry was then discharged out of the system and dehydrated and dried to give a PVC resin. The PVC obtained had a BET specific surface area value of 3.7 $m^2$/g. The ESCA value indicative of the skin layer occurrence extent was 0.80. The BET specific surface area and ESCA value were determined by the methods mentioned above.

CPVC Preparation

A glass-lined pressure-resistant reactor (capacity 300 liters) was charged with 150 kg of deionized water and 40 kg of the PVC obtained in the above manner, the PVC was dispersed in water by stirring and then the inside air was suctioned by a vacuum pump and the pressure was thereby reduced to a gauge pressure of −0.8 kgf/$cm^2$. Pressure recovery (recovery to zero (0) gauge pressure) was effected with nitrogen gas and the reactor inside was again suctioned by a vacuum pump to thereby eliminate oxygen from the reactor inside. During this operation, the reactor inside was warmed by passing a heated oil through a jacket.

When the reactor inside temperature reached 90° C., the feeding of chlorine gas was started and the reaction was allowed to proceed at a constant temperature of 110° C. The degree of chlorination was calculated based on the concentration of hydrogen chloride produced in the reactor and, at and from the time point when the degree of chlorination reached 63% by weight, an aqueous solution of hydrogen peroxide with a concentration of 100 ppm was added continuously at a rate of 0.5 kg/hr and the reaction was continued. When the degree of chlorination reached 66.5% by weight, the feeding of chlorine gas was discontinued and the chlorination reaction was terminated.

The amount of hydrogen peroxide added during the reaction was 4 ppm relative to the amount of the resin charged.

Further, the unreacted chlorine was purged by blowing nitrogen gas into the reactor, and the resin obtained was washed with water, dehydrated and dried to give powdery CPVC. The CPVC obtained had a chlorine content of 66.5% by weight.

The CPVC obtained was dissolved in tetrahydrofuran and a solution with a concentration of 1 g/kg was prepared. This solution was measured for absorbance at the wavelength 235 nm (cell length 1 cm, measuring temperature 23° C.). The absorbance was 0.13. The CPVC obtained had a void ratio of 34.6% by volume, a specific surface area of 6.4 $m^2$/g and a void volume for the range 0.001–0.1 $\mu$m (hereinafter referred to "void volume") of 7.8% by volume.

EXAMPLE 20

PVC Preparation

The preparation was made in the same manner as in Example 19 except that the same partially saponified polyvinyl acetate species as used in Example 19 was used in an amount of 550 ppm.

The PVC obtained had a BET specific surface area value of 2.1 m²/g. The ESCA value indicative of the skin layer occurrence extent was 0.73.

CPVC Preparation

The preparation was made under the same conditions as used in Example 19.

The CPVC obtained was dissolved in tetrahydrofuran and a solution with a concentration of 1 g/kg was prepared. This solution was measured for absorbance at the wavelength 235 nm (cell length 1 cm, measuring temperature 23° C.). The absorbance was 0.14. The CPVC obtained had a void ratio of 33.8% by volume, a specific surface area of 5.2 m²/g and a void volume of 6.3% by volume.

EXAMPLE 21

The PVC preparation was made in the same manner as in Example 19.

The CPVC preparation was made in the same manner as in Example 19 except that the reaction temperature was 120° C. and that the addition of the aqueous solution of hydrogen peroxide was started when the degree of chlorination reached 65% by weight. The amount of hydrogen peroxide added during the reaction was 2 ppm relative to the charged resin amount.

The CPVC obtained was dissolved in tetrahydrofuran and a solution with a concentration of 1 g/kg was prepared. This solution was measured for absorbance at the wavelength 235 nm (cell length 1 cm, measuring temperature 23° C.). The absorbance was 0.11. The CPVC obtained had a void ratio of 32.8% by volume, a specific surface area of 3.5 m²/g and a void volume of 4.7% by volume.

COMPARATIVE EXAMPLE 11

PVC Preparation

A polymerizer (pressure-resistant autoclave; capacity 100 liters) was charged with 50 kg of deionized water and 1,300 ppm (on vinyl chloride monomer basis) of partially saponified polyvinyl acetate (average saponification degree 72 mole percent; polymerization degree 750) as suspending and dispersing agent, and 550 ppm (on vinyl chloride monomer basis) of tert-butyl peroxyneodecanoate was added. Then, the polymerizer was deaerated to 45 mmHg and, thereafter, 33 kg of vinyl chloride monomer was charged thereinto and stirring was started.

The polymerizer was heated to 57° C. to thereby initiate the polymerization and this temperature was maintained until termination of the polymerization reaction.

When the conversion by polymerization reached 90%, the reaction was discontinued, the unreacted monomer in the polymerizer was recovered, and the polymer slurry was then discharged out of the system and dehydrated and dried to give PVC. The PVC obtained had a BET specific surface area value of 0.7 m²/g. The ESCA value indicative of the skin layer occurrence extent was 0.20.

The CPVC preparation was made in the same manner as in Example 19.

The CPVC obtained was dissolved in tetrahydrofuran and a solution with a concentration of 1 g/kg was prepared. This solution was measured for absorbance at the wavelength 235 nm (cell length 1 cm, measuring temperature 23° C.). The absorbance was 0.19. The CPVC obtained had a void ratio of 27.3% by volume, a specific surface area of 1.8 m²/g and a void volume of 1.1% by volume.

COMPARATIVE EXAMPLE 12

The PVC preparation was made in the same manner as in Example 19.

CPVC Preparation

A glass-lined pressure-resistant reactor (capacity 300 liters) was charged with 150 kg of deionized water and 40 kg of the PVC obtained in the above manner, the PVC was dispersed in water by stirring and then the inside air was suctioned by a vacuum pump and the pressure was thereby reduced to a gauge pressure of −0.8 kgf/cm². Pressure recovery was effected with nitrogen gas and the reactor inside was again suctioned by a vacuum pump to eliminate oxygen from the reactor inside. During this operation, the reactor inside was warmed by passing a heated oil through a jacket. When the reactor inside temperature reached 70° C., the feeding of chlorine gas was started and the reaction was allowed to proceed at a constant temperature of 85° C. The degree of chlorination was calculated based on the concentration of hydrogen chloride generated in the reactor and, at and from the time point when the degree of chlorination reached 60% by weight, an aqueous solution of hydrogen peroxide with a concentration of 400 ppm was added continuously at a rate of 1.0 kg/hr and the reaction was continued. When the degree of chlorination reached 66.5% by weight, the feeding of chlorine gas was discontinued and the chlorination reaction was terminated. The amount of hydrogen peroxide added during the reaction was 100 ppm relative to the amount of the resin charged.

Further, the unreacted chlorine was purged by blowing nitrogen gas into the reactor, and the resin obtained was washed with water, dehydrated and dried to give powdery CPVC. The CPVC obtained had a chlorine content of 66.5% by weight.

The CPVC obtained was dissolved in tetrahydrofuran and a solution with a concentration of 1 g/kg was prepared. This solution was measured for absorbance at the wavelength 235 nm (cell length 1 cm, measuring temperature 23° C.). The absorbance was 0.26. The CPVC obtained had a void ratio of 37.2% by volume, a specific surface area of 10.2 m²/g and a void volume of 11.7% by volume.

COMPARATIVE EXAMPLE 13

The PVC preparation was made in the same manner as in

EXAMPLE 19.

CPVC Preparation

A glass-lined pressure-resistant reactor (capacity 300 liters) was charged with 150 kg of deionized water and 40 kg of the PVC obtained in the above manner, the PVC was dispersed in water by stirring and then the inside air was suctioned by a vacuum pump and the pressure was thereby reduced to a gauge pressure of −0.8 kgf/cm². Pressure recovery was effected with nitrogen gas and the reactor inside was again suctioned by a vacuum pump to eliminate oxygen from the reactor inside. During this operation, the reactor inside was warmed by passing a heated oil through a jacket. When the reactor inside temperature reached 90°

C., the feeding of chlorine gas was started and the reaction was allowed to proceed at a constant temperature of 140° C. The degree of chlorination was calculated based on the concentration of hydrogen chloride generated in the reactor and, at and from the time point when the degree of chlorination reached 66.5% by weight, the feeding of chlorine gas was discontinued and the chlorination reaction was terminated.

Further, the unreacted chlorine was purged by blowing nitrogen gas into the reactor, and the resin obtained was washed with water, dehydrated and dried to give powdery CPVC. The CPVC obtained had a chlorine content of 66.5% by weight.

The CPVC obtained was dissolved in tetrahydrofuran and a solution with a concentration of 1 g/kg was prepared. This solution was measured for absorbance at the wavelength 235 nm (cell length 1 cm, measuring temperature 23° C.). The absorbance was 0.41. The CPVC obtained had a void ratio of 28.8% by volume, a specific surface area of 1.9 $m^2/g$ and a void volume of 1.3% by volume.

was allowed to proceed at 70° C. under light irradiation using a high-pressure mercury lamp. The degree of chlorination was calculated based on the concentration of hydrogen chloride generated in the reactor and, at and from the time point when the degree of chlorination reached 66.5% by weight, the feeding of chlorine gas was discontinued and the chlorination reaction was terminated.

Further, the unreacted chlorine was purged by blowing nitrogen gas into the reactor, and the resin obtained was washed with water, dehydrated and dried to give powdery CPVC. The CPVC obtained had a chlorine content of 66.5% by weight.

The CPVC obtained was dissolved in tetrahydrofuran and a solution with a concentration of 1 g/kg was prepared. This solution was measured for absorbance at the wavelength 235 nm (cell length 1 cm, measuring temperature 23° C.). The absorbance was 0.38. The CPVC obtained had a void ratio of 37.8% by volume, a specific surface area of 11.5 $m^2/g$ and a void volume of 12.2% by volume.

TABLE 5

|  | Example | | | Compar. Ex. | | | |
| --- | --- | --- | --- | --- | --- | --- | --- |
|  | 19 | 20 | 21 | 11 | 12 | 13 | 14 |
| PVC | | | | | | | |
| BET specific surface area ($m^2/g$) | 3.7 | 2.1 | 3.7 | 0.7 | 3.7 | 3.7 | 3.7 |
| ESCA value | 0.80 | 0.73 | 0.80 | 0.20 | 0.80 | 0.80 | 0.80 |
| CPVC | | | | | | | |
| Reaction temp. (° C.) | 110 | 110 | 120 | 110 | 85 | 140 | 70 |
| Amount of $H_2O_2$ (ppm based on PVC) | 4 | 4 | 2 | 4 | 100 | — | — |
| Degree of chlorination (wt %) | 66.5 | 66.5 | 66.5 | 66.5 | 66.5 | 66.5 | 66.5 |
| Void ratio (vol. %) | 34.6 | 33.8 | 32.8 | 27.3 | 37.2 | 28.8 | 37.8 |
| Specific surface area ($m^2/g$) | 6.4 | 5.2 | 3.5 | 1.8 | 10.2 | 1.9 | 11.5 |
| Void volume (vol. %) | 7.8 | 6.3 | 4.7 | 1.1 | 11.7 | 1.3 | 12.2 |
| Absorbance (wavelength 235 nm) | 0.13 | 0.14 | 0.11 | 0.19 | 0.26 | 0.41 | 0.38 |
| Evaluation | | | | | | | |
| Gelation temp. (° C.) | 173 | 175 | 176 | 191 | 171 | 182 | 171 |
| Heat stability (min.) | 39 | 36 | 40 | 30 | 28 | 25 | 25 |

COMPARATIVE EXAMPLE 14

The PVC preparation was made in the same manner as in Example 19.

CPVC Preparation

A titanium-made reactor for photochlorination (capacity 300 liters) was charged with 150 kg of deionized water and 40 kg of the PVC obtained in the above manner, the PVC was dispersed in water by stirring and then the inside air was suctioned by a vacuum pump and the pressure was thereby reduced to a gauge pressure of −0.8 kgf/$cm^2$. Pressure recovery was effected with nitrogen gas and the reactor inside was again suctioned by a vacuum pump to eliminate oxygen from the reactor inside. During this operation, the reactor inside was warmed by passing a heated oil through a jacket. When the reactor inside temperature reached 70° C., the feeding of chlorine gas was started and the reaction

EXAMPLE 22

The PVC preparation and CPVC preparation were made in the same manner as in Example 21.

The CPVC obtained was dissolved in tetrahydrofuran and subjected to methanol precipitation evaluation. As a result, the addition amount Y at the time of initiation of precipitation was 42 g, and the amount Z at the time of 80% precipitation was 55 g. The CPVC obtained had a void ratio of 32.8% by volume, a specific surface area of 3.5 $m^2/g$, and a void volume of 4.7% by volume.

EXAMPLE 23

The PVC preparation was made in the same manner as in Example 22.

CPVC Preparation

The preparation was made in the same manner as in Example 22 except that the chlorine content was raised to 68.0% by weight and that the amount of hydrogen peroxide added during the reaction was 8 ppm relative to the charged resin amount.

The CPVC obtained was dissolved in tetrahydrofuran and subjected to methanol precipitation evaluation. As a result, the addition amount Y at the time of initiation of precipitation was 36 g, and the amount Z at the time of 80% precipitation was 49 g. The CPVC obtained had a void ratio of 33.5% by volume, a specific surface area of 4.7 m$^2$/g, and a void volume of 5.8% by volume.

EXAMPLE 24

The PVC preparation was made in the same manner as in Example 22.

CPVC Preparation

The preparation was made in the same manner as in Example 22 except that the reaction temperature was 130° C. and that the addition of the aqueous solution of hydrogen peroxide was omitted.

The CPVC obtained was dissolved in tetrahydrofuran and subjected to methanol precipitation evaluation. As a result, the addition amount Y at the time of initiation of precipitation was 44 g, and the amount Z at the time of 80% precipitation was 52 g. The CPVC obtained had a void ratio of 30.9% by volume, a specific surface area of 2.5 m$^2$/g, and a void volume of 2.9% by volume.

EXAMPLE 25

The PVC preparation was made in the same manner as in Example 22.

CPVC Preparation

A glass-lined pressure-resistant reactor (capacity 300 liters) was charged with 150 kg of deionized water and 40 kg of the PVC obtained in the above manner, the PVC was dispersed in water by stirring and then the inside air was suctioned by a vacuum pump and the pressure was thereby reduced to a gauge pressure of −0.8 kgf/cm$^2$. Pressure recovery was effected with nitrogen gas and the reactor inside was again suctioned by a vacuum pump to eliminate oxygen from the reactor inside. During this operation, the reactor inside was warmed by passing a heated oil through a jacket.

When the reactor inside temperature reached 80° C., the feeding of chlorine gas was started and the reaction was allowed to proceed at a constant temperature of 100° C. The degree of chlorination was calculated based on the concentration of hydrogen chloride generated in the reactor and, at and from the time point when the degree of chlorination reached 62% by weight, an aqueous solution of hydrogen peroxide with a concentration of 100 ppm was added continuously at a rate of 0.5 kg/hr and the reaction was continued. When the degree of chlorination reached 66.5% by weight, the feeding of chlorine gas was discontinued and the chlorination reaction was terminated. The amount of hydrogen peroxide added during the reaction was 10 ppm relative to the amount of the resin charged.

Further, the unreacted chlorine was purged by blowing nitrogen gas into the reactor, and the resin obtained was washed with water, dehydrated and dried to give powdery CPVC. The CPVC obtained had a chlorine content of 66.5% by weight.

The CPVC obtained was dissolved in tetrahydrofuran and subjected to methanol precipitation evaluation. As a result, the addition amount Y at the time of initiation of precipitation was 35 g, and the amount Z at the time of 80% precipitation was 62 g. The CPVC obtained had a void ratio of 35.2% by volume, a specific surface area of 8.3 m$^2$/g, and a void volume of 9.2% by volume.

COMPARATIVE EXAMPLE 15

The PVC preparation and CPVC preparation were made both in the same manner as in Comparative Example 13.

The CPVC obtained was dissolved in tetrahydrofuran and subjected to methanol precipitation evaluation. As a result, the addition amount Y at the time of initiation of precipitation was 46 g, and the amount Z at the time of 80% precipitation was 51 g. The CPVC obtained had a void ratio of 28.8% by volume, a specific surface area of 1.9 m$^2$/g, and a void volume of 1.3% by volume.

COMPARATIVE EXAMPLE 16

The PVC preparation was made in the same manner as in Example 22.

CPVC Preparation

A titanium-made reactor for photochlorination (capacity 300 liters) was charged with 150 kg of deionized water and 40 kg of the PVC obtained in the above manner, the PVC was dispersed in water by stirring and then the inside air was suctioned by a vacuum pump and the pressure was thereby reduced to a gauge pressure of −0.8 kgf/cm$^2$. Pressure recovery was effected with nitrogen gas and the reactor inside was again suctioned by a vacuum pump to eliminate oxygen from the reactor inside. During this operation, the reactor inside was warmed by passing a heated oil through a jacket. When the reactor inside temperature reached 70° C., the feeding of chlorine gas was started and the reaction was allowed to proceed at 70° C. under irradiation by a high pressure mercury lamp. The degree of chlorination was calculated based on the concentration of hydrogen chloride generated in the reactor and, at and from the time point when the degree of chlorination reached 68.0% by weight, the feeding of chlorine gas was discontinued and the chlorination reaction was terminated.

Further, the unreacted chlorine was purged by blowing nitrogen gas into the reactor, and the resin obtained was washed with water, dehydrated and dried to give powdery CPVC. The CPVC obtained had a chlorine content of 68.0% by weight.

The CPVC obtained was dissolved in tetrahydrofuran and subjected to methanol precipitation evaluation. As a result, the addition amount Y at the time of initiation of precipitation was 25 g, and the amount Z at the time of 80% precipitation was 60 g. The CPVC obtained had a void ratio of 38.5% by volume, a specific surface area of 11.8 m$^2$/g, and a void volume of 13.6% by volume.

COMPARATIVE EXAMPLE 17

The PVC preparation was made in the same manner as in Comparative Example 11.

The CPVC preparation was made in the same manner as in Example 22.

Test for Precipitation by Addition of Methanol

Three grams (3 g) of each chlorinated vinyl chloride resin obtained was completely dissolved in 60 g of tetrahydrofuran at 20° C. and then methanol was added gradually to thereby cause precipitation. Based on the chlorine content X (% by weight) of the chlorinated vinyl chloride resin as well as the amount Y (g) of methanol added to the time point at which the precipitation of the chlorinated vinyl chloride resin began and the amount Z (g) of methanol added to the time point at which the precipitation of the chlorinated vinyl chloride resin amounted to 80% by weight, both determined in the above manner, it was examined whether the following relations (1) and (2) were satisfied or not.

$$-3.9X+305 \geq Y \geq -3.9X+300 \quad (1)$$

$$-3.2X+270 \geq Z \geq -3.2X+265 \quad (2).$$

The results of the above test are shown in Table 6.

saponification degree 72 mole percent; polymerization degree 700), 1,600 ppm of sorbitan monolaurate (HLB 8.6), 1,500 ppm of lauric acid, 100 ppm of polyacrylamide (Brookfield viscosity of a 0.1% (by weight) aqueous solution at 20° C. and 1 atm.: 51 cps) and 500 ppm of tert-butyl peroxyneodecanoate. Then, the polymerizer was deaerated to 45 mmHg and, thereafter, 33 kg of vinyl chloride monomer was charged thereinto and stirring was started. The polymerizer was heated to 57° C to thereby initiate the polymerization and this temperature was maintained until termination of the polymerization reaction.

When the conversion by polymerization reached 90%, the reaction was discontinued, the unreacted monomer in the

TABLE 6

|  | Example | | | | Compar. Ex. | | |
| --- | --- | --- | --- | --- | --- | --- | --- |
|  | 22 | 23 | 24 | 25 | 15 | 16 | 17 |
| PVC |  |  |  |  |  |  |  |
| BET specific surface area ($m^2$/g) | 3.7 | 3.7 | 3.7 | 3.7 | 3.7 | 3.7 | 0.7 |
| ESCA value | 0.80 | 0.80 | 0.80 | 0.80 | 0.80 | 0.80 | 0.20 |
| CPVC |  |  |  |  |  |  |  |
| Reaction temperature (° C.) | 120 | 120 | 130 | 100 | 140 | 70 | 120 |
| Amount of $H_2O_2$ (ppm based on PVC) | 2 | 8 | — | 10 | — | — | 2 |
| Degree of chlorination (wt %) | 66.5 | 68.0 | 66.5 | 66.5 | 66.5 | 68.0 | 66.5 |
| Void ratio (vol. %) | 32.8 | 33.5 | 30.9 | 35.2 | 28.8 | 38.5 | Not deter mined |
| Specific surface area ($m^2$/g) | 3.5 | 4.7 | 2.5 | 8.3 | 1.9 | 11.8 | Not deter mined |
| Void volume (vol. %) | 4.7 | 5.8 | 2.9 | 9.2 | 1.3 | 13.6 | Not deter mined |
| Methanol amount Y (g) at start of precipitation | 42 | 36 | 44 | 35 | 46 | 25 | Not deter mined |
| Methanol amount Z (g) at 80% precipitation | 55 | 49 | 52 | 62 | 51 | 60 | Not deter mined |
| Relation (1) | Satis fied | Satis fied | Satis fied | Not satis fied | Not satis fied | Not satis fied | Not deter mined |
| Relation (2) | Satis fied | satis fied | Satis fied | Not satis fied | Not satis fied | Not satis fied | Not deter mined |
| Evaluation |  |  |  |  |  |  |  |
| Gelation temp. (° C.) | 176 | 181 | 178 | 175 | 182 | 177 | 195 |
| Heat stability (min.) | 40 | 38 | 41 | 31 | 25 | 21 | 30 |

EXAMPLE 26

PVC Preparation

A polymerizer (pressure-resistant autoclave; capacity 100 liters) was charged with 50 kg of deionized water, 400 ppm (on vinyl chloride monomer basis; hereinafter same shall apply) of partially saponified polyvinyl acetate (average polymerizer was recovered, and the polymer slurry was then discharged out of the system and dehydrated and dried to give PVC. The PVC obtained had a BET specific surface area value of 3.7 $m^2$/g. The ESCA value indicative of the skin layer occurrence extent was 0.80. The BET specific surface area and ESCA value were determined by the methods mentioned herein.

CPVC Preparation

A glass-lined pressure-resistant reactor (capacity 300 liters) was charged with 150 kg of deionized water and 40 kg of the PVC obtained in the above manner, the PVC was dispersed in water by stirring and then the inside air was suctioned by a vacuum pump and the pressure was thereby reduced to a gauge pressure of −0.8 kgf/cm². Pressure recovery (recovery to zero (0) gauge pressure) was effected with nitrogen gas and the reactor inside was again suctioned by a vacuum pump to thereby eliminate oxygen from the reactor inside. During this operation, the reactor inside was warmed by passing a heated oil through a jacket.

When the reactor inside temperature reached 90° C., the feeding of chlorine gas was started and the reaction was allowed to proceed at a constant temperature of 110° C. The degree of chlorination was calculated based on the concentration of hydrogen chloride produced in the reactor and, at and from the time point when the degree of chlorination reached 63% by weight, an aqueous solution of hydrogen peroxide with a concentration of 100 ppm was added continuously at a rate of 0.5 kg/hr and the reaction was continued. When the degree of chlorination reached 66.5% by weight, the feeding of chlorine gas was discontinued and the chlorination reaction was terminated. The amount of hydrogen peroxide added during the reaction was 4 ppm relative to the amount of the resin charged.

Further, the unreacted chlorine was purged by blowing nitrogen gas into the reactor, and the resin obtained was washed with water, dehydrated and dried to give powdery CPVC. The CPVC obtained had a chlorine content of 66.5% by weight.

The CPVC obtained had a void ratio of 34.6% by volume, a specific surface area of 6.4 m²/g and a void volume for the range 0.001 to 0.1 μm (hereinafter referred to "void volume") of 7.8% by volume.

EXAMPLE 27

The PVC preparation was made in the same manner as in Example 26.

CPVC Preparation

A glass-lined pressure-resistant reactor (capacity 300 liters) was charged with 150 kg of deionized water and 40 kg of the PVC obtained in the above manner, the PVC was dispersed in water by stirring and then the inside air was suctioned by a vacuum pump and the pressure was thereby reduced to a gauge pressure of −0.8 kgf/cm². Pressure recovery was effected with nitrogen gas and the reactor inside was again suctioned by a vacuum pump to thereby eliminate oxygen from the reactor inside. During this operation, the reactor inside was warmed by passing a heated oil through a jacket.

When the reactor inside temperature reached 70° C., the reaction was allowed to proceed while the reactor inside was irradiated with ultraviolet rays using a mercury lamp. The degree of chlorination was calculated based on the concentration of hydrogen chloride generated in the reactor and, when the degree of chlorination reached 66.5% by weight, the chlorination reaction was terminated.

Further, the unreacted chlorine was purged by blowing nitrogen gas into the reactor, and the resin obtained was washed with water, dehydrated and dried to give powdery CPVC. The CPVC obtained had a chlorine content of 66.5% by weight.

The CPVC obtained had a void ratio of 35.2% by volume, a specific surface area of 6.6 m²/g and a void volume of 8.1% by volume.

EXAMPLE 28

The PVC preparation was made in the same manner as in Example 26.

CPVC Preparation

A glass-lined pressure-resistant reactor (capacity 300 liters) was charged with 150 kg of deionized water and 40 kg of the PVC obtained in the above manner, the PVC was dispersed in water by stirring and then the inside air was suctioned by a vacuum pump and the pressure was thereby reduced to a gauge pressure of −0.8 kgf/cm². Pressure recovery was effected with nitrogen gas and the reactor inside was again suctioned by a vacuum pump to thereby eliminate oxygen from the reactor inside. During this operation, the reactor inside was warmed by passing a heated oil through a jacket.

When the reactor inside temperature reached 85° C., the feeding of chlorine gas was started and the reaction was allowed to proceed at a constant temperature of 90° C. The degree of chlorination was calculated based on the concentration of hydrogen chloride generated in the reactor and, at and after the degree of chlorination reached 62% by weight, an aqueous solution of hydrogen peroxide with a concentration of 100 ppm was added continuously at a rate of 0.5 kg/hr, and the reaction was continued. When the degree of chlorination reached 66.5% by weight, the feeding of chlorine gas was discontinued and the chlorination reaction was terminated. The amount of hydrogen peroxide added during the reaction was 8 ppm relative to the charged resin amount.

The CPVC obtained had a void ratio of 35.0% by volume, a specific surface area of 6.6 m²/g and a void volume of 8.0% by volume.

EXAMPLE 29

The PVC preparation was made in the same manner as in Example 26.

The CPVC preparation was made in the same manner as in Example 26 except that the reaction temperature was 130° C. and that the addition of hydrogen peroxide was omitted.

Further, the unreacted chlorine was purged by blowing nitrogen gas into the reactor, and the resin obtained was washed with water, dehydrated and dried to give powdery CPVC. The CPVC obtained had a chlorine content of 66.5% by weight.

The CPVC obtained had a void ratio of 33.9% by volume, a specific surface area of 6.1 m²/g and a void volume of 7.6% by volume.

EXAMPLE 30

The PVC preparation was made in the same manner as in Example 26 except that the partially saponified polyvinyl acetate used in Example 26 was used in an amount of 550 ppm.

The CPVC preparation was made in the same manner as in Example 26.

The CPVC obtained had a void ratio of 33.8% by volume, a specific surface area of 5.2 m²/g and a void volume of 6.3% by volume.

EXAMPLE 31

The PVC preparation was made in the same manner as in Example 26.

The CPVC preparation was made as in Example 26 except that the degree of chlorination of CPVC was made 64.0% by weight and that the addition of hydrogen peroxide was omitted.

The CPVC obtained had a void ratio of 34.1% by volume, a specific surface area of 6.3 m²/g and a void volume of 7.6% by volume.

EXAMPLE 32

The PVC preparation was made in the same manner as in Example 26.

The CPVC preparation was made in the same manner as in Example 26 except that the degree of chlorination of CPVC was made 70.0% by weight. The amount of hydrogen peroxide added was 10 ppm relative to the charged resin amount.

The CPVC obtained had a void ratio of 35.3% by volume, a specific surface area of 6.7 m²/g and a void volume of 8.1% by volume.

COMPARATIVE EXAMPLE 18

PVC Preparation

A polymerizer (pressure-resistant autoclave; capacity 100 liters) was charged with 50 kg of deionized water and 1,300 ppm (on vinyl chloride monomer basis) of partially saponified polyvinyl acetate (average saponification degree 72 mole percent; polymerization degree 750) as suspending and dispersing agent, and 550 ppm (on vinyl chloride monomer basis) of tert-butyl peroxyneodecanoate was added. Then, the polymerizer was deaerated to 45 mmHg and, thereafter, 33 kg of vinyl chloride monomer was charged thereinto and stirring was started. The polymerizer was heated to 57° C. to thereby initiate the polymerization and this temperature was maintained until termination of the polymerization reaction.

When the conversion by polymerization reached 90%, the reaction was discontinued, the unreacted monomer in the polymerizer was recovered, and the polymer slurry was then discharged out of the system and dehydrated and dried to give PVC. The PVC obtained had a BET specific surface area value of 3.7 m²/g. The ESCA value indicative of the'skin layer occurrence extent was 0.80. The BET specific surface area measurement and ESCA were carried out by the method described herein.

The CPVC preparation was made in the same manner as in Example 26.

The CPVC obtained had a void ratio of 27.3% by volume, a specific surface area of 1.8 m²/g and a void volume of 1.1% by volume.

COMPARATIVE EXAMPLE 19

The PVC preparation was made in the same manner as in Comparative Example 18.

The CPVC preparation was made in the same manner as in Example 27.

The CPVC obtained had a void ratio of 27.9% by volume, a specific surface area of 2.0 m2/g and a void volume of 1.4% by volume.

COMPARATIVE EXAMPLE 20

The PVC preparation was made in the same manner as in Example 26.

The CPVC preparation was made in the same manner as in. Example 26 except that the reaction temperature was 140° C. and that the addition of hydrogen peroxide was omitted.

The CPVC obtained had a void ratio of 28.8% by volume, a specific surface area of 1.9 m²/g and a void volume of 1.3% by volume.

COMPARATIVE EXAMPLE 21

The PVC preparation was made in the same manner as in Example 26.

The CPVC preparation was made in the same manner as in Example 26 except that the degree of chlorination of CPVC was made 73.0% by weight. The amount of hydrogen peroxide added was 40 ppm relative to the charged resin amount.

The CPVC obtained had a void ratio of 36.8% by volume, a specific surface area of 10.0 m²/g and a void volume of 12.1% by volume.

The CPVCs obtained in the above Examples 26 to 32 and Comparative Examples 18 to 21 were subjected to performance evaluation. The results obtained are shown in Table 7.

TABLE 7

| | Example | | | | | | | Compar. Ex. | | | |
|---|---|---|---|---|---|---|---|---|---|---|---|
| | 26 | 27 | 28 | 29 | 30 | 31 | 32 | 18 | 19 | 20 | 21 |
| PVC | | | | | | | | | | | |
| BET specific surface are (m²/g) | 3.7 | 3.7 | 3.7 | 3.7 | 2.1 | 3.7 | 3.7 | 0.7 | 0.7 | 3.7 | 3.7 |
| ESCA value | 0.8 | 0.8 | 0.8 | 0.8 | 0.73 | 0.8 | 0.8 | 0.2 | 0.2 | 0.8 | 0.8 |
| CPVC | | | | | | | | | | | |
| Chlorination method *1 | Thermal | Photo | Thermal | Thermal | Thermal | Thermal | Thermal | Thermal | Photo | Thermal | Thermal |
| Reaction temp. (° C.) | 110 | 70 | 90 | 130 | 110 | 110 | 110 | 110 | 70 | 140 | 110 |
| Amount of $H_2O_2$ (ppm based on PVC) | 4 | — | 8 | — | 4 | — | 10 | 4 | — | — | 40 |
| Degree of chlorination (wt %) | 66.5 | 66.5 | 66.5 | 66.5 | 66.5 | 64 | 70 | 66.5 | 66.5 | 66.5 | 73 |
| Void ratio (vol. %) | 34.6 | 35.2 | 35 | 33.9 | 33.8 | 34.1 | 35.3 | 27.3 | 27.9 | 28.8 | 36.8 |
| BET specific surface area (m²/g) | 6.4 | 6.6 | 6.6 | 6.1 | 5.2 | 6.3 | 6.7 | 1.8 | 2 | 1.9 | 10 |
| Void volume (vol. %) | 7.8 | 8.1 | 8 | 7.6 | 6.3 | 7.6 | 8.1 | 1.1 | 1.4 | 1.3 | 12.1 |
| Evaluation | | | | | | | | | | | |

TABLE 7-continued

|  | Example | | | | | | | Compar. Ex. | | | |
| --- | --- | --- | --- | --- | --- | --- | --- | --- | --- | --- | --- |
|  | 26 | 27 | 28 | 29 | 30 | 31 | 32 | 18 | 19 | 20 | 21 |
| Gelation temp (° C.) | 173 | 168 | 170 | 176 | 175 | 162 | 179 | 191 | 188 | 182 | 195 |
| Heat stability (min.) | 40 | 33 | 39 | 36 | 38 | 33 | 43 | 31 | 27 | 25 | 45 |

Note)
*1: Thermal . . . Thermal chlorination; Photo . . . Photochlorination

EXAMPLE 33

The PVC preparation and CPVC preparation were made both in the same manner as in Example 26.

The CPVC obtained was dissolved in tetrahydrofuran and a solution with a concentration of 1 g/kg was prepared. This solution was measured for absorbance at the wavelength 235 nm (cell length 1 cm, measuring temperature 23° C.) The absorbance was 0.13.

EXAMPLE 34

The PVC preparation was made in the same manner as in Example 26.

The CPVC preparation was made in the same manner as in Example 27.

The CPVC obtained was dissolved in tetrahydrofuran and a solution with a concentration of 1 g/kg was prepared. This solution was measured for absorbance at the wavelength 235 nm (cell length 1 cm, measuring temperature 23° C.). The absorbance was 0.70.

EXAMPLE 35

The PVC preparation was made in the same manner as in Example 26.

The CPVC preparation was made in the same manner as in Example 28.

The CPVC obtained was dissolved in tetrahydrofuran and a solution with a concentration of 1 g/kg was prepared. This solution was measured for absorbance at the wavelength 235 nm (cell length 1 cm, measuring temperature 23° C.). The absorbance was 0.12.

EXAMPLE 36

The PVC preparation was made in the same manner as in Example 26.

The CPVC preparation was made in the same manner as in Example 29.

The CPVC obtained was dissolved in tetrahydrofuran and a solution with a concentration of 1 g/kg was prepared. This solution was measured for absorbance at the wavelength 235 nm (cell length 1 cm, measuring temperature 23° C.) The absorbance was 0.32.

EXAMPLE 37

The PVC preparation and CPVC preparation were made both in the same manner as in Example 30.

The CPVC obtained was dissolved in tetrahydrofuran and a solution with a concentration of 1 g/kg was prepared. This solution was measured for absorbance at the wavelength 235 nm (cell length 1 cm, measuring temperature 23° C.). The absorbance was 0.14.

EXAMPLE 38

The PVC preparation was made in the same manner as in Example 26.

The CPVC preparation was made in the same manner as in Example 31.

The CPVC obtained was dissolved in tetrahydrofuran and a solution with a concentration of 1 g/kg was prepared. This solution was measured for absorbance at the wavelength 235 nm (cell length 1 cm, measuring temperature 23° C.). The absorbance was 0.10.

EXAMPLE 39

The PVC preparation was made in the same manner as in Example 26.

The CPVC preparation was made in the same manner as in Example 32.

The CPVC obtained was dissolved in tetrahydrofuran and a solution with a concentration of 1 g/kg was prepared. This solution was measured for absorbance at the wavelength 235 nm (cell length 1 cm, measuring temperature 23° C.) The absorbance was 0.29.

COMPARATIVE EXAMPLE 22

The PVC preparation and CPVC preparation were made both in the same manner as in Comparative Example 18.

The CPVC obtained was dissolved in tetrahydrofuran and a solution with a concentration of 1 g/kg was prepared. This solution was measured for absorbance at the wavelength 235 nm (cell length 1 cm, measuring temperature 23° C.). The absorbance was 0.27.

COMPARATIVE EXAMPLE 23

The PVC preparation was made in the same manner as in Comparative Example 18.

The CPVC preparation was made in the same manner as in Comparative Example 19.

The CPVC obtained was dissolved in tetrahydrofuran and a solution with a concentration of 1 g/kg was prepared. This solution was measured for absorbance at the wavelength 235 nm (cell length 1 cm, measuring temperature 23° C.). The absorbance was 0.85.

COMPARATIVE EXAMPLE 24

The PVC preparation was made in the same manner as in Example 26.

CPVC Preparation

A glass-lined pressure-resistant reactor (capacity 300 liters) was charged with 150 kg of deionized water and 40 kg of the PVC obtained in the above manner, the PVC was dispersed in water by stirring and then the inside air was suctioned by a vacuum pump and the pressure was thereby reduced to a gauge pressure of −0.8 kgf/cm$^2$. Pressure recovery was effected with nitrogen gas and the reactor inside was again suctioned by a vacuum pump to eliminate oxygen from the reactor inside. During this operation, the reactor inside was warmed by passing a heated oil through a jacket.

When the reactor inside temperature reached 60° C., the feeding of chlorine gas was started and the reaction was allowed to proceed at a constant temperature of 65° C. The degree of chlorination was calculated based on the concentration of hydrogen chloride generated in the reactor and, at and from the time point when the degree of chlorination reached 63% by weight, an aqueous solution of hydrogen peroxide with a concentration of 500 ppm was added continuously at a rate of 0.5 kg/hr and the reaction was continued. When the degree of chlorination reached 66.5% by weight, the feeding of chlorine gas was discontinued and the chlorination reaction was terminated. The amount of hydrogen peroxide added during the reaction was 500 ppm relative to the amount of the resin charged.

Further, the unreacted chlorine was purged by blowing nitrogen gas into the reactor, and the resin obtained was washed with water, dehydrated and dried to give powdery CPVC. The CPVC obtained had a chlorine content of 66.5% by weight.

The CPVC obtained was dissolved in tetrahydrofuran and a solution with a concentration of 1 g/kg was prepared. This solution was measured for absorbance at the wavelength 235 nm (cell length 1 cm, measuring temperature 23C). The absorbance was 1.32. The CPVC obtained had a void ratio of 35.9% by volume, a specific surface area value of 6.9 m$^2$/g and a void volume of 8.3% by volume.

COMPARATIVE EXAMPLE 25

The PVC preparation was made in the same manner as in Example 26.

The CPVC preparation was made in the same manner as in Example 27 except that the reaction temperature was 60° C.

The CPVC obtained was dissolved in tetrahydrofuran and a solution with a concentration of 1 g/kg was prepared. This solution was measured for absorbance at the wavelength 235 nm (cell length 1 cm, measuring temperature 23C). The absorbance was 0.92. The CPVC obtained had avoid ratio of 36.0% by volume, a specific surface area value of 7.0 m$^2$/g and a void volume of 8.5% by volume.

COMPARATIVE EXAMPLE 26

The PVC preparation was made in the same manner as in Example 26.

The CPVC preparation was made in the same manner as in Comparative Example 20.

The CPVC obtained was dissolved in tetrahydrofuran and a solution with a concentration of 1 g/kg was prepared. This solution was measured for absorbance at the wavelength 235 nm (cell length 1 cm, measuring temperature 23° C.). The absorbance was 0.41.

COMPARATIVE EXAMPLE 27

The PVC preparation was made in the same manner as in Example 26.

The CPVC preparation was made in the same manner as in Comparative Example 21.

The CPVC obtained was dissolved in tetrahydrofuran and a solution with a concentration of 1 g/kg was prepared. This solution was measured for absorbance at the wavelength 235 nm (cell length 1 cm, measuring temperature 23° C.). The absorbance was 0.52.

The CPVC obtained in the above Examples 33 to 39 and Comparative Examples 22 to 27 were subjected to performance evaluation. The results are shown in Table 8.

TABLE 8

| | Example | | | | | | | Compar. Ex. | | | | | |
|---|---|---|---|---|---|---|---|---|---|---|---|---|---|
| | 33 | 34 | 35 | 36 | 37 | 38 | 39 | 22 | 23 | 24 | 25 | 26 | 27 |
| PVC | | | | | | | | | | | | | |
| BET specific surface are (m$^2$/g) | 3.7 | 3.7 | 3.7 | 3.7 | 2.1 | 3.7 | 3.7 | 0.7 | 0.7 | 3.7 | 3.7 | 3.7 | 3.7 |
| ESCA value | 0.8 | 0.8 | 0.8 | 0.8 | 0.73 | 0.8 | 0.8 | 0.2 | 0.2 | 0.8 | 0.8 | 0.8 | 0.8 |
| CPVC | | | | | | | | | | | | | |
| Chlorination method *1 | Thermal | Photo | Thermal | Thermal | Thermal | Thermal | Thermal | Thermal | Photo | Thermal | Photo | Thermal | Thermal |
| Reaction temperature (° C.) | 110 | 70 | 90 | 130 | 110 | 110 | 110 | 110 | 70 | 65 | 60 | 110 | 110 |
| Amount of H$_2$O$_2$ (ppm based on PVC) | 4 | — | 8 | — | 4 | — | 10 | 4 | — | 500 | — | — | 40 |
| Degree of chlorination (wt %) | 66.5 | 66.5 | 66.5 | 66.5 | 66.5 | 64 | 70 | 66.5 | 66.5 | 66.5 | 66.5 | 66.5 | 73 |
| Void ratio (vol. %) | 34.6 | 35.2 | 35 | 33.9 | 33.8 | 34.1 | 35.3 | 27.3 | 27.9 | 35.9 | 36 | 28.8 | 36.8 |
| BET specific surface area (m$^2$/g) | 6.4 | 6.6 | 6.6 | 6.1 | 5.2 | 6.3 | 6.7 | 1.8 | 2 | 6.9 | 7 | 1.9 | 10 |
| Void volume (vol. %) | 7.8 | 8.1 | 8 | 7.6 | 6.3 | 7.6 | 8.1 | 1.1 | 1.4 | 8.3 | 8.5 | 1.3 | 12.1 |
| Absorbance (wavelength 235 nm) | 0.13 | 0.7 | 0.12 | 0.32 | 0.14 | 0.1 | 0.29 | 0.27 | 0.85 | 1.32 | 0.92 | 0.41 | 0.52 |
| Evaluation | | | | | | | | | | | | | |
| Gelation temp. (° C.) | 173 | 168 | 170 | 176 | 175 | 162 | 179 | 191 | 188 | 167 | 165 | 182 | 195 |
| Heat stability (min.) | 40 | 33 | 39 | 36 | 38 | 33 | 43 | 34 | 26 | 19 | 27 | 25 | 45 |

Note)
*1: Thermal . . . Thermal chlorination; Photo . . . Photochlorination

EXAMPLE 40

PVC Preparation

A polymerizer (pressure-resistant autoclave; capacity 100 liters) was charged with 50 kg of deionized water, 400 ppm (on vinyl chloride monomer basis; hereinafter same shall apply) of partially saponified polyvinyl acetate (average saponification degree 72 mole percent; polymerization degree 700), 1,600 ppm of sorbitan monolaurate (HLB 8.6), 1,500 ppm of lauric acid, 100 ppm of polyacrylamide (Brookfield viscosity of a 0.1% (by weight) aqueous solution at 20° C. and 1 atm.: 51 cps) and 500 ppm of tert-butyl peroxyneodecanoate. Then, the polymerizer was deaerated to 45 mmHg and, thereafter, 33 kg of vinyl chloride monomer was charged thereinto and stirring was started. The polymerizer was heated to 57° C. to thereby initiate the polymerization and this temperature was maintained until termination of the polymerization reaction.

When the conversion by polymerization reached 90%, the reaction was discontinued, the unreacted monomer in the polymerizer was recovered, and the polymer slurry was then discharged out of the system and dehydrated and dried to give PVC. The PVC obtained had a BET specific surface area value of 3.7 $m^2/g$. The ESCA value indicative of the skin layer occurrence extent was 0.80. The BET specific surface area and ESCA value were determined by the methods mentioned herein.

CPVC Preparation

A glass-lined pressure-resistant reactor (capacity 300 liters) was charged with 150 kg of deionized water and 40 kg of the PVC obtained in the above manner, the PVC was dispersed in water by stirring and then the inside air was suctioned by a vacuum pump and the pressure was thereby reduced to a gauge pressure of −0.8 $kgf/cm^2$. Pressure recovery (recovery to zero (0) gauge pressure) was effected with nitrogen gas and the reactor inside was again suctioned by a vacuum pump to thereby eliminate oxygen from the reactor inside. During this operation, the reactor inside was warmed by passing a heated oil through a jacket.

When the reactor inside temperature reached 90° C., the feeding of chlorine gas was started and the reaction was allowed to proceed at a constant temperature of 110° C. The degree of chlorination was calculated based on the concentration of hydrogen chloride produced in the reactor and, at and from the time point when the degree of chlorination reached 63% by weight, an aqueous solution of hydrogen peroxide with a concentration of 100 ppm was added continuously at a rate of 0.5 kg/hr and the reaction was continued. When the degree of chlorination reached 72.1% by weight, the feeding of chlorine gas was discontinued and the chlorination reaction was terminated. The amount of hydrogen peroxide added during the reaction was 30 ppm relative to the amount of the resin charged.

Further, the unreacted chlorine was purged by blowing nitrogen gas into the reactor, and the resin obtained was washed with water, dehydrated and dried to give powdery CPVC. The CPVC obtained had a chlorine content of 72.1% by weight.

The CPVC obtained had a void ratio of 36.4% by volume, a specific surface area of 9.7 $m^2/g$ and a void volume for the range 0.001 to 0.1 μm (hereinafter referred to "void volume") of 11.6% by volume. The ESCA value was 0.70.

EXAMPLE 41

The PVC preparation was made in the same manner as in Example 1 except that the partially saponified polyvinyl acetate was used in an amount of 550 ppm.

The CPVC preparation was made in the same manner as in Example 40.

The CPVC obtained had a void ratio of 33.8% by volume, a specific surface area of 6.2 $m^2/g$ and a void volume of 7.1% by volume. The ESCA value was 0.52.

EXAMPLE 42

The PVC preparation was made in the same manner as in Example 40.

The CPVC preparation was made in the same manner as in Example 40 except that the reaction temperature was 130° C. The amount of hydrogen peroxide added during the reaction was 15 ppm relative to the amount of the resin charged.

The CPVC obtained had a void ratio of 34.1% by volume, a specific surface area of 5.8 $m^2/g$ and a void volume of 6.2% by volume. The ESCA value was 0.68.

EXAMPLE 43

The PVC preparation was made in the same manner as in Example 41.

The CPVC preparation was made in the same manner as in Example 40 except that the final degree of chlorination was 75.7% by weight. The amount of hydrogen peroxide added during the reaction was 50 ppm relative to the amount of the resin charged.

The CPVC obtained had a void ratio of 34.7% by volume, a specific surface area of 7.3 $m^2/g$ and a void volume of 8.3% by volume. The ESCA value was 0.61.

COMPARATIVE EXAMPLE 28

PVC Preparation

A polymerizer (pressure-resistant autoclave; capacity 100 liters) was charged with 50 kg of deionized water and 1,300 ppm (on vinyl chloride monomer basis) of partially saponified polyvinyl acetate (average saponification degree 72 mole percent; polymerization degree 750) as suspending and dispersing agent, and 550 ppm (on vinyl chloride monomer basis) of tert-butyl peroxyneodecanoate was added. Then, the polymerizer was deaerated to 45 mmHg and, thereafter, 3.3 kg of vinyl chloride monomer was charged thereinto and stirring was started. The polymerizer was heated to 57° C. to thereby initiate the polymerization and this temperature was maintained until termination of the polymerization reaction.

When the conversion by polymerization reached 90%, the reaction was discontinued, the unreacted monomer in the polymerizer was recovered, and the polymer slurry was then discharged out of the system and dehydrated and dried to give PVC. The PVC obtained had a BET specific surface area value of 0.7 $m^2/g$. The ESCA value indicative of the skin layer occurrence extent was 0.20. The BET specific surface area measurement and ESCA were carried out by the method described herein.

The CPVC preparation was made in the same manner as in Example 40.

The CPVC obtained had a void ratio of 28.2% by volume, a specific surface area of 2.3 $m^2/g$ and a void volume of 1.7% by volume. The ESCA value was 0.15.

COMPARATIVE EXAMPLE 29

The PVC preparation was made in the same manner as in Example 40.

The CPVC preparation was made in the same manner as in Example 40 except that the reaction temperature was 137° C. and that the addition of hydrogen peroxide was omitted.

The CPVC obtained had a void ratio of 29.5% by volume, a specific surface area of 2.6 m²/g and a void volume of 1.8%, by volume. The ESCA value was 0.64.

COMPARATIVE EXAMPLE 30

The PVC preparation was made in the same manner as in Example 41.

The CPVC preparation was made in the same manner as in Example 40 except that the final degree of chlorination was 70.5% by weight. The amount of hydrogen peroxide added during the reaction was 16 ppm relative to the amount of the resin charged.

The CPVC obtained had a void ratio of 35.9% by volume, a specific surface area of 8.4 m²/g and a void volume of 10.8% by volume. The ESCA value was 0.68.

The CPVC obtained in the above Examples 40–43 and Comparative Examples 28–30 were subjected to performance evaluation. The results are shown in Table 9.

polymerizer was heated to 57° C. to thereby initiate the polymerization and this temperature was maintained until termination of the polymerization reaction.

When the conversion by polymerization reached 90%, the reaction was discontinued, the unreacted monomer in the polymerizer was recovered, and the polymer slurry was then discharged out of the system and dehydrated and dried to give PVC.

CPVC Preparation

A glass-lined pressure-resistant reactor (capacity 300 liters) was charged with 150 kg of deionized water and 40 kg of the PVC obtained in the above manner, the PVC was dispersed in water by stirring and then the inside air was suctioned by a vacuum pump and the pressure was thereby reduced to a gauge pressure of −0.8 kgf/cm². Pressure recovery (recovery to zero (0) gauge pressure) was effected with nitrogen gas and the reactor inside was again suctioned by a vacuum pump to thereby eliminate oxygen from the

TABLE 9

|  | Example | | | | Compar. Ex. | | |
| --- | --- | --- | --- | --- | --- | --- | --- |
|  | 40 | 41 | 42 | 43 | 28 | 29 | 30 |
| PVC | | | | | | | |
| BET specific surface area (m²/g) | 3.7 | 2.0 | 3.7 | 2.0 | 0.7 | 3.7 | 3.7 |
| ESCA value | 0.8 | 0.7 | 0.8 | 0.7 | 0.2 | 0.8 | .08 |
| CPVC | | | | | | | |
| Reaction temp. (° C.) | 110 | 110 | 120 | 110 | 110 | 137 | 110 |
| Amount of H₂O₂ (ppm based on PVC) | 30 | 30 | 15 | 50 | 15 | — | 20 |
| Degree of chlorination (wt %) | 72.1 | 72.1 | 72.1 | 75.7 | 72.1 | 72.1 | 70.5 |
| Void ratio (vol. %) | 36.4 | 33.8 | 34.1 | 34.7 | 28.2 | 29.5 | 35.9 |
| BET specific surface area (m²/g) | 9.7 | 6.2 | 5.8 | 7.3 | 2.3 | 2.6 | 8.4 |
| Void volume (vol. %) | 11.6 | 7.1 | 6.2 | 8.3 | 1.7 | 1.8 | 10.8 |
| ESCA value | 0.70 | 0.52 | 0.68 | 0.61 | 0.15 | 0.64 | 0.68 |
| Evaluation | | | | | | | |
| Gelation temp. (° C.) | 194 | 200 | 195 | 214 | 222 | 226 | 182 |
| Vicat value (° C.) | 161 | 161 | 159 | 183 | 159 | 160 | 148 |

EXAMPLE 44

PVC Preparation

A polymerizer (pressure-resistant autoclave; capacity 100 liters) was charged with 50 kg of deionized water, 400 ppm (on vinyl chloride monomer basis; hereinafter same shall apply) of partially saponified polyvinyl acetate (average saponification degree 72 mole percent; polymerization degree 700), 1,600 ppm of sorbitan monolaurate (HLB 8.6), 1,500 ppm of lauric acid, 100 ppm of polyacrylamide (Brookfield viscosity of a 0.1% (by weight) aqueous solution at 20° C. and 1 atm.: 51 cps) and 500 ppm of tert-butyl peroxyneodecanoate. Then, the polymerizer was deaerated to 45 mmHg and, thereafter, 33 kg of vinyl chloride monomer was charged thereinto and stirring was started. The reactor inside. During this operation, the reactor inside was warmed by passing a heated oil through a jacket.

When the reactor inside temperature reached 90° C., the feeding of chlorine gas was started and the reaction was allowed to proceed at a constant temperature of 110° C. The degree of chlorination was calculated based-on the concentration of hydrogen chloride produced in the reactor and, at and from the time point when the degree of chlorination reached 63% by weight, an aqueous solution of hydrogen peroxide with a concentration of 100 ppm was added continuously at a rate of 0.5 kg/hr and the reaction was continued. When it was confirmed that the degree of chlorination had reached 70.5% by weight, the feeding of chlorine gas was discontinued and the chlorination reaction was terminated.

Further, the unreacted chlorine was purged by blowing nitrogen gas into the reactor, and the resin obtained was washed with water, dehydrated and dried to give powdery CPVC.

The CPVC obtained had a chlorination degree of 70.5% by weight, a void ratio of 35.9% by volume, a specific surface area of 8.4 m$^2$/g, a void volume for the range 0.001 to 0.1 μm (hereinafter referred to "void volume") of 10.8% by volume and an ESCA value of 0.68.

Formulation for CPVC Pipes

The additives specified in Table 10 were added to 100 parts by weight of the above CPVC and the whole was blended with heating in a Henschel mixer.

TABLE 10

| Ingredient | phr |
| --- | --- |
| CPVC | 100.0 |
| Organotin stabilizer | 1.5 |
| MBS | 7.0 |
| Chlorinated polyethylene | 3.0 |
| PE type lubricant | 1.0 |
| Fatty acid type lubricant | 0.5 |
| Ester type lubricant | 0.5 |
| Ester type lubricant | 0.2 |
| Pigment | 0.4 |

Molding of CPVC Pipes

Using the above mixture, molding was carried out under the extrusion conditions mentioned below to give pipes with a bore diameter of 20 mm. Extruder: Nagata Seisakusho model SLM 50 (trademark) (twin-screw two-directional conical extruder); Mold: mold for pipe manufacture, outlet port outer radius 11.66 mm, inside radius 9.4 mm, L/D=60/2.3 (mm), resin-contacting surface chromium-plated, Rmax=5 μm, Ra=0.10 μm (mean of 4 circumferential sites of the outlet port), three bridges; Extruder output: 25 to 30 kg/hr;

Resin temperature: 215 to 217° C.;

Number of revolutions: 20 to 30 rpm;

Barrel temperature: 185 to 210° C.;

Mold temperature: 200 to 215° C.

EXAMPLE 45

The PVC preparation was made in the same manner as in Example 44.

The CPVC preparation was made in the same manner as in Example 1 except that the reaction temperature was 120° C. and that the addition of hydrogen peroxide was started at the time of 65.0% by weight of chlorination. The CPVC obtained had a chlorination degree of 70.5% by weight, a void ratio of 32.1% by volume, a specific surface area of 4.6 m$^2$/g, a void volume of 5.2% by volume and an ESCA value of 0.63.

The compounding and molding were carried out in the same manner as in Example 44.

COMPARATIVE EXAMPLE 31

The PVC preparation was made in the same manner as in Example 44.

The CPVC preparation was made in the same manner as in Example 44 except that the final degree of chlorination was 69.0% by weight. The CPVC obtained had a chlorination degree of 69.0% by weight, a void ratio of 35.0% by volume, a specific surface area of 7.3 m$^2$/g, a void volume of 8.1% by volume and an ESCA value of 0.64.

The compounding and molding were carried out in the same manner as in Example 44.

The CPVC resins and pipes obtained in the above examples and comparative example were evaluated for the following performance characteristics. The results are shown in Table 11.

TABLE 11

|  | Example | | Compar. Ex. |
| --- | --- | --- | --- |
|  | 44 | 45 | 31 |
| CPVC |  |  |  |
| Chlorine content (wt %) | 70.5 | 70.5 | 69.0 |
| Void ratio (vol. %) | 35.9 | 32.1 | 35.0 |
| Void volume (vol. %) | 10.8 | 5.2 | 8.1 |
| Specific surface area (m$^2$/g) | 8.4 | 4.6 | 7.3 |
| ESCA | 0.68 | 0.63 | 0.64 |
| Vicat softening point (° C.) | 147 | 145 | 136 |

EXAMPLE 46

The PVC preparation was made in the same manner as in Example 44.

The CPVC preparation was made in the same manner as in Example 44 except that the final degree of chlorination was 72.1% by weight. The CPVC obtained had a chlorination degree of 72.1% by weight, a void ratio of 36.4% by volume, a specific surface area of 9.7 m$^2$/g, a void volume of 11.6% by volume and an ESCA value of 0.70.

The compounding and molding were carried out in the same manner as in Example 44 except that the resin temperature was 220 to 223° C.

EXAMPLE 47

The PVC preparation was made in the same manner as in Example 44.

The CPVC preparation was made in the same manner as in Example 45 except that the final degree of chlorination was 72.1% by weight. The CPVC obtained had a chlorination degree of 72.1% by weight, a void ratio of 32.6% by volume, a specific surface area of 5.7 m$^2$/g, a void volume of 6.5% by volume and an ESCA value of 0.66.

The compounding and molding were carried out in the same manner as in Example 46.

COMPARATIVE EXAMPLE 32

The PVC preparation was made in the same manner as in Example 44.

The CPVC preparation was made in the same manner as in Example 44 except that the final degree of chlorination was 71.5% by weight. The CPVC obtained had a chlorination degree of 71.5% by weight, a void ratio of 36.1% by volume, a specific surface area of 8.7 m$^2$/g, a void volume of 11.1% by volume and an ESCA value of 0.69.

The compounding and molding were carried out in the same manner as in Example 44.

The CPVC resins and pipes obtained in the above examples and comparative example were evaluated for the following performance characteristics. The results are shown in Table 12.

TABLE 12

|  | Example | | Compar. Ex. |
|---|---|---|---|
|  | 46 | 47 | 32 |
| CPVC | | | |
| Chlorine content (wt %) | 72.1 | 72.1 | 71.5 |
| Void ratio (vol. %) | 36.4 | 32.6 | 36.1 |
| Void volume (vol. %) | 11.6 | 6.5 | 11.1 |
| Specific surface area (m²/g) | 9.7 | 5.7 | 8.7 |
| ESCA | 0.70 | 0.66 | 0.69 |
| Vicat softening point (° C.) | 158 | 156 | 151 |

EXAMPLE 48

The PVC preparation was made in the same manner as in Example 44.

The CPVC preparation was made in the same manner as in Example 44 except that the final degree of chlorination was 74.6% by weight. The CPVC obtained had a chlorination degree of 74.6% by weight, a void ratio of 37.7% by volume, a specific surface area of 10.3 m²/g, a void volume of 11.9% by volume and an ESCA value of 0.74.

The compounding was carried out in the same manner as in Example 44 except that the organotin stabilizer was used in an amount of 2.5 phr.

The molding was carried out in the same manner as in Example 44 except that the resin temperature was 225~228° C.

EXAMPLE 49

The PVC preparation was made in the same manner as in Example 44.

The CPVC preparation was made in the same manner as in Example 45 except that the final degree of chlorination was 74.6% by weight. The CPVC obtained had a chlorination degree of 74.6% by weight, a void ratio of 33.8% by volume, a specific surface area of 6.9 m²/g, a void volume of 7.7% by volume and an ESCA value of 0.70.

The compounding and molding were carried out in the same manner as in Example 48.

COMPARATIVE EXAMPLE 33

The PVC preparation was made in the same manner as in Example 44.

The CPVC preparation was made in the same manner as in Example 44 except that the final degree of chlorination was 73.5% by weight. The CPVC obtained had a chlorination degree of 73.5% by weight, a void ratio of 37.0% by volume, a specific surface area of 10.1 m²/g, a void volume of 11.7% by volume and an ESCA value of 0.72.

The compounding and molding were carried out in the same manner as in Example 46.

The CPVC resins and pipes obtained in the above examples and comparative example were evaluated for the following performance characteristics. The results are shown in Table 13.

TABLE 13

|  | Example | | Compar. Ex. |
|---|---|---|---|
|  | 48 | 49 | 33 |
| CPVC | | | |
| Chlorine content (wt %) | 74.6 | 74.6 | 73.5 |
| Void ratio (vol. %) | 37.7 | 33.8 | 37.0 |
| Void volume (vol. %) | 11.9 | 7.7 | 11.7 |
| Specific surface area (m²/g) | 10.3 | 6.9 | 10.1 |
| ESCA | 0.74 | 0.70 | 0.72 |
| Vicat softening point (° C.) | 173 | 171 | 163 |

EXAMPLE 50

The PVC preparation and CPVC preparation were made in the same manner as in Example 44.

The CPVC obtained had a chlorination degree of 70.5% by weight, a void ratio of 35.9% by volume, a specific surface area of 8.4 m²/g, a void volume of 10.8% by volume and an ESCA value of 0.68.

The compounding and molding were also carried out in the same manner as in Example 44.

EXAMPLE 51

The PVC preparation was made in the same manner as in Example 44.

The CPVC preparation was made in the same manner as in Example 45.

The CPVC obtained had a chlorination degree of 70.5% by weight, a void ratio of 32.1% by volume, a specific surface area of 4.6 m²/g, a void volume of 5.2% by volume and an ESCA value of 0.63.

The compounding and molding were carried out in the same manner as in Example 44.

COMPARATIVE EXAMPLE 34

PVC Preparation

A polymerizer (pressure-resistant autoclave; capacity 100 liters) was charged with 50 kg of deionized water and 1,300 ppm (on vinyl chloride monomer basis) of partially saponified polyvinyl acetate (average saponification degree 72 mole percent; polymerization degree 750) as suspending and dispersing agent, and 550 ppm (on vinyl chloride monomer basis) of tert-butyl peroxyneodecanoate was added. Then, the polymerizer was deaerated to 45 mmHg and, thereafter, 33 kg of vinyl chloride monomer was charged thereinto and stirring was started. The polymerizer was heated to 57° C. to thereby initiate the polymerization and this temperature was maintained until termination of the polymerization reaction. When the conversion by polymerization reached 90%, the reaction was discontinued, the unreacted monomer in the polymerizer was recovered, and the polymer slurry was then discharged out of the system and dehydrated and dried to give PVC.

The CPVC preparation was made in the same manner as in Example 44. The CPVC obtained had a chlorination degree of 70.5% by weight, a void ratio of 27.3% by volume, a specific surface area value of 1.7 m²/g, a void volume of 1.2% by volume and an ESCA value of 0.15.

The compounding and molding were carried out in the same manner as in Example 44.

COMPARATIVE EXAMPLE 35

The PVC preparation was made in the same manner as in Example 44.

CPVC Preparation

A glass-lined pressure-resistant reactor (capacity 300 liters) was charged with 150 kg of deionized water and 40 kg of the PVC obtained in the above manner, the PVC was dispersed in water by stirring and then the inside air was suctioned by a vacuum pump and the pressure was thereby reduced to a gauge pressure of −0.8 kgf/cm². Pressure recovery was effected with nitrogen gas and the reactor inside was again suctioned by a vacuum pump to thereby eliminate oxygen from the reactor inside. During this operation, the reactor inside was warmed by passing a heated oil through a jacket. When the reactor inside temperature reached 90° C., the feeding of chlorine gas was started and the reaction was allowed to proceed at a constant temperature of 140° C. The degree of chlorination was calculated based on the concentration of hydrogen chloride produced in the reactor and, at the time point when the degree of chlorination was confirmed to have reached 70.5% by weight, the feeding of chlorine gas was discontinued and the chlorination reaction was terminated.

Further, the unreacted chlorine was purged by blowing nitrogen gas into the reactor, and the resin obtained was washed with water, dehydrated and dried to give powdery CPVC. The CPVC obtained had a chlorination degree of 70.5% by weight, a void ratio of 27.9% by volume, a specific surface area of 1.8 m²/g, a void volume of 1.1% by volume and an ESCA value of 0.42.

The compounding and molding were carried out in the same manner as in Example 44.

COMPARATIVE EXAMPLE 36

The PVC preparation and CPVC preparation were made in the same manner as in Comparative Example 31.

The CPVC obtained had a chlorination degree of 69.0% by weight, a void ratio of 35.0% by volume, a specific surface area of 7.3 m²/g, a void volume of 8.1% by volume and an ESCA value of 0.64.

The compounding and molding were carried out in the same manner as in Example 44.

The CPVC resins and pipes obtained in the above examples and comparative examples were evaluated for the following performance characteristics. The results are shown in Table 14.

TABLE 14

| | Example | | Compar. Ex. | | |
| --- | --- | --- | --- | --- | --- |
| | 50 | 51 | 34 | 35 | 36 |
| CPVC | | | | | |
| Chlorine content (wt %) | 70.5 | 70.5 | 70.5 | 70.5 | 69.0 |
| Void ratio (vol. %) | 35.9 | 32.1 | 27.3 | 27.9 | 35.0 |
| Void volume (vol. %) | 10.8 | 5.2 | 1.2 | 1.1 | 8.1 |

TABLE 14-continued

| | Example | | Compar. Ex. | | |
| --- | --- | --- | --- | --- | --- |
| | 50 | 51 | 34 | 35 | 36 |
| Specific surface area (m²/g) | 8.4 | 4.6 | 1.7 | 1.8 | 7.3 |
| ESCA | 0.68 | 0.63 | 0.15 | 0.42 | 0.64 |
| Pipe evaluation | | | | | |
| Vicat softening point (° C.) | 147 | 145 | 147 | 142 | 136 |
| Charpy (kgf · cm/cm²) | 19 | 18 | 9 | 8 | 23 |

EXAMPLE 52

The PVC preparation was made in the same manner as in Example 44.

The CPVC preparation was made in the same manner as in Example 46.

The CPVC obtained had a chlorination degree of 72.1% by weight, a void ratio of 36.4% by volume, a specific surface area of 9.7 m²/g, a void volume of 11.6% by volume and an ESCA value of 0.70.

The compounding and molding were carried out in the same manner as in Example 46.

EXAMPLE 53

The PVC preparation was made in the same manner as in Example 44.

The CPVC preparation was made in the same manner as in Example 47.

The CPVC obtained had a chlorination degree of 72.1% by weight, a void ratio of 32.6% by volume, a specific surface area of 5.7 m²/g, a void volume of 6.5% by volume and an ESCA value of 0.66.

The compounding and molding were carried out in the same manner as in Example 46.

COMPARATIVE EXAMPLE 37

The PVC preparation was made in the same manner as in Example 44.

CPVC Preparation

A glass-lined pressure-resistant reactor (capacity 300 liters) was charged with 150 kg of deionized water and 40 kg of the PVC obtained in the above manner, the PVC was dispersed in water by stirring and then the inside air was suctioned by a vacuum pump and the pressure was thereby reduced to a gauge pressure of −0.8 kgf/cm². Pressure recovery was effected with nitrogen gas and the reactor inside was again suctioned by a vacuum pump to thereby eliminate oxygen from the reactor inside. During this operation, the reactor inside was warmed by passing a heated oil through a jacket.

When the reactor inside temperature reached 90° C., the feeding of chlorine gas was started and the reaction was allowed to proceed at a constant temperature of 135° C. The degree of chlorination was calculated based on the concentration of hydrogen chloride generated in the reactor and, at the time point when the degree of chlorination was confirmed to have reached 72.1% by weight, the feeding of chlorine gas was discontinued and the chlorination reaction was terminated.

Further, the unreacted chlorine was purged by blowing nitrogen gas into the reactor, and the resin obtained was washed with water, dehydrated and dried to give powdery CPVC. The CPVC obtained had a chlorination degree of 72.1% by weight, a void ratio of 29.5% by volume, a specific surface area of 2.6 m$^2$/g, a void volume of 1.8% by volume and an ESCA value of 0.64.

The compounding and molding were carried out in the same manner as in Example 46.

COMPARATIVE EXAMPLE 38

The PVC preparation and CPVC preparation were made in the same manner as in Comparative Example 32.

The CPVC obtained had a chlorination degree of 71.5% by weight, a void ratio of 36.1% by volume, a specific surface area of 8.7 m$^2$/g, a void volume of 11.1% by volume and an ESCA value of 0.69.

The compounding and molding were carried out in the same manner as in Example 46.

The CPVC resins and pipes obtained in the above examples and comparative examples were evaluated for the following performance characteristics. The results are shown in Table 15.

TABLE 15

|  | Example | | Compar. Ex. | |
| --- | --- | --- | --- | --- |
|  | 52 | 53 | 37 | 38 |
| CPVC |  |  |  |  |
| Chlorine content (wt %) | 72.1 | 72.1 | 72.1 | 71.5 |
| Void ratio (vol. %) | 36.4 | 32.6 | 29.5 | 36.1 |
| Void volume (vol. %) | 11.6 | 6.5 | 1.8 | 11.1 |
| Specific surface area (m$^2$/g) | 9.7 | 5.7 | 2.6 | 8.7 |
| ESCA | 0.70 | 0.66 | 0.64 | 0.69 |
| Pipe evaluation |  |  |  |  |
| Vicat softening point (° C.) | 158 | 156 | 156 | 151 |
| Charpy (kgf · cm/cm$^2$) | 17 | 15 | 7 | 18 |

EXAMPLE 54

The PVC preparation was made in the same manner as in Example 44.

The CPVC preparation was made in the same manner as in Example 48.

The CPVC obtained had a chlorination degree of 74.6% by weight, a void ratio of 37.7% by volume, a specific surface area of 10.3 m$^2$/g, a void volume of 11.9% by volume and an ESCA value of 0.74.

The compounding was carried out in the same manner as in Example 44 except that the organotin stabilizer was used in an amount of 2.5 phr.

The molding was carried out in the same manner as in Example 48.

EXAMPLE 55

The PVC preparation was made in the same manner as in Example 44.

The CPVC preparation was made in the same manner as in Example 49.

The CPVC obtained had a chlorination degree of 74.6% by weight, a void ratio of 33.8% by volume, a specific surface area of 6.9 m$^2$/g, a void volume of 7.7% by volume and an ESCA value of 0.70.

The compounding and molding were carried out in the same manner as in Example 54.

COMPARATIVE EXAMPLE 39

The PVC preparation was made in the same manner as in Example 44.

The CPVC preparation was made in the same manner as in Comparative Example 37 except that the final degree of chlorination was 74.6% by weight.

The CPVC obtained had a chlorination degree of 74.6% by weight, a void ratio of 29.8% by volume, a'specific surface area of 2.8 m$^2$/g, a void volume of 1.9% by volume and an ESCA value of 0.65.

The compounding and molding were carried out in the same manner as in Example 54.

COMPARATIVE EXAMPLE 40

The PVC preparation and CPVC preparation were made in the same manner as in Comparative Example 33.

The CPVC obtained had a chlorination degree of 73.5% by weight, a void ratio of 37.0% by volume, a specific surface area of 10.1 m$^2$/g, a void volume of 11.7% by volume and an ESCA value of 0.72.

The compounding and molding were carried out in the same manner as in Example 46.

The CPVC resins and pipes obtained in the above examples and comparative examples were evaluated for the following performance characteristics. The results are shown in Table 16.

TABLE 16

|  | Example | | Compar. Ex. | |
| --- | --- | --- | --- | --- |
|  | 54 | 55 | 39 | 40 |
| CPVC |  |  |  |  |
| Chlorine content (wt %) | 74.6 | 74.6 | 74.6 | 73.5 |
| Void ratio (vol. %) | 37.7 | 33.8 | 29.8 | 37.0 |
| Void volume (vol. %) | 11.9 | 7.7 | 1.9 | 11.7 |
| Specific surface area (m$^2$/g) | 10.3 | 6.9 | 2.8 | 10.1 |
| ESCA | 0.74 | 0.70 | 0.65 | 0.72 |
| Pipe evaluation |  |  |  |  |
| Vicat softening point (° C.) | 172 | 170 | 171 | 163 |
| Charpy (kgf · cm/cm$^2$) | 15 | 14 | 5 | 16 |

EXAMPLE 56

The PVC preparation was made in the same manner as in Example 44.

The CPVC preparation was made in the same manner as in Example 44 except that the final degree of chlorination was 71.5% by weight.

The CPVC obtained had a chlorination degree of 71.5% by weight, a void ratio of 36.2% by volume, a specific surface area of 8.6 m$^2$/g, a void volume of 11.1% by volume and an ESCA value of 0.70.

Formulation for CPVC Pipes

The additives specified in Table 17 were added to 100 parts by weight of the above CPVC and the whole was blended with heating in a Henschel mixer.

TABLE 17

| Ingredient | phr |
|---|---|
| CPVC | 100.0 |
| Organotin stabilizer | 1.5 |
| MBS | 10.0 |
| Chlorinated polyethylene | 3.0 |
| PE type lubricant | 1.0 |
| Fatty acid type lubricant | 0.5 |
| Ester type lubricant | 0.5 |
| Ester type lubricant | 0.2 |
| Pigment | 0.4 |

The molding was carried out in the same manner as in Example 44.

EXAMPLE 57

The PVC preparation was made in the same manner as in Example 44.

The CPVC preparation was made in the same manner as in Example 45 except that the final degree of chlorination was 71.5% by weight.

The CPVC obtained had a chlorination degree of 71.5% by weight, a void ratio of 33.0% by volume, a specific surface area of 5.4 m$^2$/g, a void volume of 6.3% by volume and an ESCA value of 0.68.

The compounding and molding were carried out in the same manner as in Example 56.

COMPARATIVE EXAMPLE 41

PVC Preparation

A polymerizer (pressure-resistant autoclave; capacity 100 liters) was charged with 50 kg of deionized water and 1,300 ppm (on vinyl chloride monomer basis) of partially saponified polyvinyl acetate (average saponification degree 72 mole percent; polymerization degree 750) as suspending and dispersing agent, and 550 ppm (on vinyl chloride monomer basis) of tert-butyl peroxyneodecanoate was added. Then, the polymerizer was deaerated to 45 mmHg and, thereafter, 33 kg of vinyl chloride monomer was charged thereinto and stirring was started.

The polymerizer was heated to 57° C. to thereby initiate the polymerization and this temperature was maintained until termination of the polymerization reaction. When the conversion by polymerization reached 90%, the reaction was discontinued, the unreacted monomer in the polymerizer was recovered, and the polymer slurry was then discharged out of the system and dehydrated and dried to give PVC.

The CPVC preparation was made in the same manner as in Example 56.

The CPVC obtained had a chlorination degree of 71.5% by weight, a void ratio of 29.2% by volume, a specific surface area value of 1.6 m$^2$/g, a void volume of 1.2% by volume and an ESCA value of 0.16.

The compounding and molding were carried out in the same manner as in Example 56.

COMPARATIVE EXAMPLE 42

The PVC preparation was made in the same manner as in Example 44.

CPVC Preparation

A glass-lined pressure-resistant reactor (capacity 300 liters) was charged with 150 kg of deionized water and 40 kg of the PVC obtained in the above manner, the PVC was dispersed in water by stirring and then the inside air was suctioned by a vacuum pump and the pressure was thereby reduced to a gauge pressure of −0.8 kgf/cm$^2$. Pressure recovery was effected with nitrogen gas and the reactor inside was again suctioned by a vacuum pump to thereby eliminate oxygen from the reactor inside. During this operation, the reactor inside was warmed by passing a heated oil through a jacket. When the reactor inside temperature reached 90° C., the feeding of chlorine gas was started and the reaction was allowed to proceed at a constant temperature of 140° C. The degree of chlorination was calculated based on the concentration of hydrogen chloride produced in the reactor and, at the time point when the degree of chlorination was confirmed to have reached 71.5% by weight, the feeding of chlorine gas was discontinued and the chlorination reaction was terminated.

Further, the unreacted chlorine was purged by blowing nitrogen gas into the reactor, and the resin obtained was washed with water, dehydrated and dried to give powdery CPVC. The CPVC obtained had a chlorination degree of 71.5% by weight, a void ratio of 28.2% by volume, a specific surface area of 1.9 m$^2$/g, a void volume of 1.5% by volume and an ESCA value of 0.50.

The compounding and molding were carried out in the same manner as in Example 56.

COMPARATIVE EXAMPLE 43

The PVC preparation and CPVC preparation were made in the same manner as in Comparative Example 31.

The CPVC obtained had a chlorination degree of 69.0% by weight, a void ratio of 35.0% by volume, a specific surface area of 7.3 m$^2$/g, a void volume of 8.1% by volume and an ESCA value of 0.64.

The compounding and molding were carried out in the same manner as in Example 56.

The CPVC resins and pipes obtained in the above examples and comparative examples were evaluated for the following performance characteristics. The results are shown in Table 18.

TABLE 18

|  | Example | | Compar. Ex. | | |
|---|---|---|---|---|---|
|  | 56 | 57 | 41 | 42 | 43 |
| CPVC | | | | | |
| Chlorine content (wt %) | 71.5 | 71.5 | 71.5 | 71.5 | 69.0 |
| Void ratio (vol. %) | 36.2 | 33.0 | 29.2 | 28.2 | 35.0 |
| Void volume (vol. %) | 11.1 | 6.3 | 1.2 | 1.5 | 8.1 |
| Specific surface area (m$^2$/g) | 8.6 | 5.4 | 1.6 | 1.9 | 7.3 |
| ESCA | 0.70 | 0.68 | 0.16 | 0.50 | 0.64 |
| Pipe evaluation | | | | | |
| Vicat softening point (° C.) | 146 | 145 | 145 | 142 | 136 |
| Charpy (kgf · cm/cm$^2$) | 25 | 21 | 14 | 8 | 32 |

EXAMPLE 58

The PVC preparation was made in the same manner as in Example 44.

The CPVC preparation was made in the same manner as in Example 46 except that the final degree of chlorination was 73.1% by weight.

The CPVC obtained had a chlorination degree of 73.1% by weight, a void ratio of 36.6% by volume, a specific surface area of 10.0 $m^2/g$, a void volume of 11.7% by volume and an ESCA value of 0.70.

The compounding was carried out in the same manner as in Example 46.

The molding was carried out in the same manner as in Example 46.

EXAMPLE 59

The PVC preparation was made in the same manner as in Example 31.

The CPVC preparation was made in the same manner as in Example 47 except that the final degree of chlorination was 73.1% by weight.

The CPVC obtained had a chlorination degree of 73.1% by weight, a void ratio of 33.0% by volume, a specific surface area of 6.0 $m^2/g$, a void volume of 6.8% by volume and an ESCA value of 0.66.

The compounding and molding were carried out in the same manner as in Example 58.

COMPARATIVE EXAMPLE 44

The PVC preparation was made in the same manner as in Example 44.

CPVC Preparation

A glass-lined pressure-resistant reactor (capacity 300 liters) was charged with 150 kg of deionized water and 40 kg of the PVC obtained in the above manner, the PVC was dispersed in water by stirring and then the inside air was suctioned by a vacuum pump and the pressure was thereby reduced to a gauge pressure of −0.8 kgf/cm. Pressure recovery was effected with nitrogen gas and the reactor inside was again suctioned by a vacuum pump to thereby eliminate oxygen from the reactor inside. During this operation, the reactor inside was warmed by passing a heated oil through a jacket.

When the reactor inside temperature reached 90° C., the feeding of chlorine gas was started and the reaction was allowed to proceed at a constant temperature of 135° C. The degree of chlorination was calculated based on the concentration of hydrogen chloride generated in the reactor and, at the time point when the degree of chlorination was confirmed to have reached 73.1% by weight, the feeding of chlorine gas was discontinued and the chlorination reaction was terminated.

Further, the unreacted chlorine was purged by blowing nitrogen gas into the reactor, and the resin obtained was washed with water, dehydrated and dried to give powdery CPVC.

The CPVC obtained had a chlorination degree of 73.1% by weight, a void ratio of 29.6% by volume, a specific surface area of 2.8 $m^2/g$, a void volume of 2.0% by volume and an ESCA value of 0.64.

The compounding and molding were carried out in the same manner as in Example 58.

COMPARATIVE EXAMPLE 45

The PVC preparation and CPVC preparation were made in the same manner as in Comparative Example 32.

The CPVC obtained had a chlorination degree of 71.5% by weight, a void ratio of 36.1% by volume, a specific surface area of 8.7 $m^2/g$, a void volume of 11.1% by volume and an ESCA value of 0.69.

The compounding and molding were carried out in the same manner as in Example 46.

The CPVC resins and pipes obtained in the above examples and comparative examples were evaluated for the following performance characteristics. The results are shown in Table 19.

TABLE 19

|  | Example | | Compar. Ex. | |
| --- | --- | --- | --- | --- |
|  | 58 | 59 | 44 | 45 |
| CPVC |  |  |  |  |
| Chlorine content (wt %) | 73.1 | 73.1 | 73.1 | 71.5 |
| Void ratio (vol. %) | 36.6 | 33.0 | 29.6 | 36.1 |
| Void volume (vol. %) | 11.7 | 6.8 | 2.0 | 11.1 |
| Specific surface area ($m^2/g$) | 10.0 | 6.0 | 2.8 | 8.7 |
| ESCA | 0.70 | 0.66 | 0.64 | 0.69 |
| Pipe evaluation |  |  |  |  |
| Vicat softening point (° C.) | 156 | 155 | 156 | 151 |
| Charpy (kgf · $cm/cm^2$) | 23 | 21 | 12 | 25 |

EXAMPLE 60

The PVC preparation was made in the same manner as in Example 44.

The CPVC preparation was made in the same manner as in Example 48 except that the final degree of chlorination was 75.6% by weight.

The CPVC obtained had a chlorination degree of 75.6% by weight, a void ratio of 37.8% by volume, a specific surface area of 10.5 $m^2/g$, a void volume of 12.0% by volume and an ESCA value of 0.72.

The compounding was carried out in the same manner as in Example 44 except that the organotin stabilizer was used in an amount of 2.5 phr and MBS in an amount of 12.0 phr.

The molding was carried out in the same manner as in Example 48.

EXAMPLE 61

The PVC preparation was made in the same manner as in Example 44.

The CPVC preparation was made in the same manner as in Example 49 except that the final degree of chlorination was 75.6% by weight.

The CPVC obtained had a chlorination degree of 75.6% by weight, a void ratio of 34.0% by volume, a specific surface area of 7.2 $m^2/g$, a void volume of 7.9% by volume and an ESCA value of 0.70.

The compounding and molding were carried out in the same manner as in Example 60.

COMPARATIVE EXAMPLE 46

The PVC preparation was made in the same manner as in Example 44.

The CPVC preparation was made in the same manner as in Comparative Example 44 except that the final degree of chlorination was 75.6% by weight.

The CPVC obtained had a chlorination degree of 75.6% by weight, a void ratio of 30.0% by volume, a specific surface area of 2.9 m$^2$/g, a void volume of 2.0% by volume and an ESCA value of 0.55.

The compounding and molding were carried out in the same manner as in Example 60.

COMPARATIVE EXAMPLE 47

The PVC preparation was made in the same manner as in Example 44.

The CPVC preparation was made in the same manner as in Comparative Example 33.

The CPVC obtained had a chlorination degree of 75.5% by weight, a void ratio of 37.0% by volume, a specific surface area of 10.1 m$^2$/g, a void volume of 11.7% by volume and an ESCA value of 0.72.

The compounding and molding were carried out in the same manner as in Example 60.

The CPVC resins and pipes obtained in the above examples and comparative examples were evaluated for the following performance characteristics. The results are shown in Table 20.

TABLE 20

|  | Example | | Compar. Ex. | |
| --- | --- | --- | --- | --- |
|  | 60 | 61 | 46 | 47 |
| CPVC | | | | |
| Chlorine content (wt %) | 75.6 | 75.6 | 75.6 | 75.5 |
| Void ratio (vol. %) | 37.8 | 34.0 | 30.0 | 37.0 |
| Void volume (vol. %) | 12.0 | 7.9 | 2.0 | 11.7 |
| Specific surface area (m$^2$/g) | 10.5 | 7.2 | 2.9 | 10.1 |
| ESCA | 0.72 | 0.70 | 0.55 | 0.72 |
| Pipe evaluation | | | | |
| Vicat softening point (° C.) | 171 | 172 | 171 | 163 |
| Charpy (kgf · cm/cm$^2$) | 21 | 20 | 9 | 25 |

EXAMPLE 62

PVC Preparation

A polymerizer (pressure-resistant autoclave; capacity 100 liters) was charged with 50 kg of deionized water and 400 ppm (on vinyl chloride monomer basis; hereinafter same shall apply) of partially saponified polyvinyl acetate (average saponification degree 72 mole percent; polymerization degree 700), 1,600 ppm of sorbitan monolaurate (HLB 8.6), 1,500 ppm of lauric acid, 100 ppm of polyacrylamide (Brookfield viscosity of a 0.1% (by weight) aqueous solution at 20° C. and 1 atm.: 51 cps) and 500 ppm of tert-butyl peroxyneodecanoate. Then, the polymerizer was deaerated to 45 mmHg and, thereafter, 33 kg of vinyl chloride monomer was charged thereinto and stirring was started. The polymerizer was heated to 64° C. to thereby initiate the polymerization and this temperature was maintained until termination of the polymerization reaction.

When the conversion by polymerization reached 90%, the reaction was discontinued, the unreacted monomer in the polymerizer was recovered, and the polymer slurry-was then discharged out of the system and dehydrated and dried to give PVC.

The CPVC preparation was made in the same manner as in Example 44.

The CPVC obtained had a chlorination degree of 70.5% by weight, a void ratio of 36.1% by volume, a specific surface area of 8.8 m$^2$/g, a void volume of 11.3% by volume and an ESCA value of 0.69.

Formulation for CPVC Joints

The additives specified in Table 21 were added to 100 parts by weight of the above CPVC and the whole was blended with heating in a Henschel mixer.

TABLE 21

| Ingredient | phr |
| --- | --- |
| CPVC | 100.0 |
| Organotin stabilizer | 4.0 |
| MBS | 3.0 |
| PE type lubricant | 1.0 |
| Ester type lubricant | 0.5 |
| Pigment | 1.0 |

Molding of CPVC Joints

Using the above mixture, molding was carried out under the following extrusion conditions.

Injection molding machine: Nippon Seikosho model J100E-C5 (trademark)

Configuration: Socket (nominal diameter 20 mm; L 56 mm);

Nozzle temperature: 220° C.;

Barrel temperatures: 210° C., 205° C. and 200° C. in the order of distance from the nozzle side;

Mold temperature: 35° C.;

Rate of injection: 30%;

Injection pressure: 60 kgf/cm$^2$.

EXAMPLE 63

The PVC preparation was made in the same manner as in Example 62 except that the partially saponified polyvinyl acetate was used in an amount of 650 ppm.

The CPVC preparation was made in the same manner as in Example 44.

The CPVC obtained had a chlorination degree of 70.5% by weight, a void ratio of 33.8% by volume, a specific surface area of 5.5 m$^2$/g, a void volume of 6.7% by volume and an ESCA value of 0.49.

The compounding and molding were carried out in the same manner as in Example 62.

EXAMPLE 64

The PVC preparation was made in the same manner as in Example 62.

The CPVC preparation was made in the same manner as in Example 46.

The CPVC obtained had a chlorination degree of 72.1% by weight, a void ratio of 35.8% by volume, a specific surface area of 9.5 m²/g, a void volume of 10.9% by volume and an ESCA value of 0.66.

The compounding and molding were carried out in the same manner as in Example 62 except that the nozzle temperature was 225° C. and the barrel temperatures were 215° C., 210° C. and 205° C. in the order distance from the nozzle side.

EXAMPLE 65

The PVC preparation was made in the same manner as in Example 63.

The CPVC preparation was made in the same manner as in Example 46.

The CPVC obtained had a chlorination degree of 72.1% by weight, a void ratio of 32.8% by volume, a specific surface area of 6.1 m²/g, a void volume of 6.8% by volume and an ESCA value of 0.50.

The compounding and molding were carried out in the same manner as in Example 64.

EXAMPLE 66

The PVC preparation was made in the same manner as in Example 62.

The CPVC preparation was made in the same manner as in Example 44 except that the final degree of chlorination was 74.5%.

The CPVC obtained had a chlorination degree of 74.5% by weight, a void ratio of 36.2% by volume, a specific surface area of 8.9 m²/g, a void volume of 10.9% by volume and an ESCA value of 0.70.

The compounding and molding were carried out in the same manner as in Example 62 except that the organotin stabilizer was used in an amount of 5.0 phr and that the nozzle temperature was 240° C. and the barrel temperatures were 230° C., 225° C. and 220° C. in the order of distance from the nozzle side.

EXAMPLE 67

The PVC preparation was made in the same manner as in Example 63.

The CPVC preparation was made in the same manner as in Example 48.

The CPVC obtained had a chlorination degree of 74.5% by weight, a void ratio of 32.8% by volume, a specific surface area of 5.4 m²/g, a void volume of 6.5% by volume and an ESCA value of 0.51.

The compounding and molding were carried out in the same manner as in Example 66.

COMPARATIVE EXAMPLE 48

The PVC preparation was made in the same manner as in Example 62.

The CPVC preparation was made in the same manner as in Example 44 except that the final degree of chlorination was 69.0% by weight.

The CPVC obtained had a chlorination degree of 69.0% by weight, a void ratio of 34.9% by volume, a specific surface area of 8.5 m²/g, a void volume of 10.1% by volume and an ESCA value of 0.63.

The compounding and molding were carried out in the same manner as in Example 62.

The CPVC joints obtained in the above Examples 62~67 and Comparative Example 48 were measured for Vicat softening temperature. The results are shown in Table 22.

TABLE 22

|  | Example | | | | | | Compar Ex. |
| --- | --- | --- | --- | --- | --- | --- | --- |
|  | 62 | 63 | 64 | 65 | 66 | 67 | 48 |
| CPVC |  |  |  |  |  |  |  |
| Chlorine content (wt %) | 70.5 | 70.5 | 72.1 | 72.1 | 74.5 | 74.5 | 69.0 |
| Void ratio (vol. %) | 36.1 | 33.8 | 35.8 | 32.8 | 36.2 | 32.8 | 34.9 |
| Void volume (vol. %) | 11.3 | 6.7 | 10.9 | 6.8 | 10.9 | 6.5 | 10.1 |
| Specific surface area (m²/g) | 8.8 | 5.5 | 9.5 | 6.1 | 8.9 | 5.4 | 8.5 |
| ESCA value | 0.69 | 0.49 | 0.66 | 0.50 | 0.70 | 0.51 | 0.63 |
| Vicat softening point (° C.) | 147 | 148 | 157 | 156 | 172 | 171 | 135 |

EXAMPLE 68

The PVC preparation was made in the same manner as in Example 62.

The CPVC preparation was made in the same manner as in Example 44.

The CPVC obtained had a chlorination degree of 70.5% by 10 weight, a void ratio of 36.1% by volume, a specific surface area of 8.8 m²/g, a void volume of 11.3% by volume and an ESCA value of 0.69.

The compounding and molding were carried out in the same manner as in Example 62.

EXAMPLE 69

The PVC preparation was made in the same manner as in Example 63.

The CPVC preparation was made in the same manner as in Example 44.

The CPVC obtained had a chlorination degree of 70.5% by weight, a void ratio of 33.8% by volume, a specific surface area of 5.5 m²/g, a void volume of 6.7% by volume and an ESCA value of 0.49.

The compounding and molding were carried out in the same manner as in Example 62.

COMPARATIVE EXAMPLE 49

PVC Preparation

A polymerizer (pressure-resistant autoclave; capacity 100 liters) was charged with 50 kg of deionized water and 1,200 ppm (on vinyl chloride monomer basis) of partially saponified polyvinyl acetate (average saponification degree 72 mole percent; polymerization degree 720) as suspending and dispersing agent, and 500 ppm (on vinyl chloride monomer basis) of tert-butyl peroxyneodecanoate was added. Then, the polymerizer was deaerated to 45 mmHg and, thereafter, 33 kg of vinyl chloride monomer was charged thereinto and stirring was started.

The polymerizer was heated to 64° C. to thereby initiate the polymerization and this temperature was maintained until termination of the polymerization reaction. When the conversion by polymerization reached 90%, the reaction was discontinued, the unreacted monomer in the polymerizer was recovered, and the polymer slurry was then discharged out of the system and dehydrated and dried to give PVC.

The CPVC preparation was made in the same manner as in Example 44.

The CPVC obtained had a chlorination degree of 70.5% by weight, a void ratio of 26.8% by volume, a specific surface area value of 1.8 m²/g, a void volume of 2.0% by volume and an ESCA value of 0.21.

The compounding and molding were carried out in the same manner as in Example 62.

COMPARATIVE EXAMPLE 50

The PVC preparation was made in the same manner as in Example 62.

The CPVC preparation was made in the same manner as in Comparative Example 35.

The CPVC obtained had a chlorination degree of 70.5% by weight, a void ratio of 33.2% by volume, a specific surface area value of 3.6 m²/g, a void volume of 3.2% by volume and an ESCA value of 0.63.

The compounding and molding were carried out in the same manner as in Example 62.

COMPARATIVE EXAMPLE 51

The PVC preparation was made in the same manner as in Example 63.

The CPVC preparation was made in the same manner as in Comparative Example 31.

The CPVC obtained had a chlorination degree of 69.0% by weight, a void ratio of 34.9% by volume, a specific surface area value of 8.5 m²/g, a void volume of 10.1% by volume and an ESCA value of 0.63.

The compounding and molding were carried out in the same manner as in Example 62.

The CPVC joints obtained in the above Examples 68 and 69 and Comparative Examples 49~51 were measured for Vicat softening temperature. The results are shown in Table 23.

TABLE 23

|  | Example | | Compar. Ex. | | |
|---|---|---|---|---|---|
|  | 68 | 69 | 49 | 50 | 51 |
| CPVC | | | | | |
| Chlorine content (wt %) | 70.5 | 70.5 | 70.5 | 70.5 | 69.0 |
| Void ratio (vol. %) | 36.1 | 33.8 | 26.8 | 33.2 | 34.9 |

TABLE 23-continued

|  | Example | | Compar. Ex. | | |
|---|---|---|---|---|---|
|  | 68 | 69 | 49 | 50 | 51 |
| Void volume (vol. %) | 11.3 | 6.7 | 2.0 | 3.2 | 10.1 |
| Specific surface area (m²/g) | 8.8 | 5.5 | 1.8 | 3.6 | 8.5 |
| ESCA value | 0.69 | 0.49 | 0.21 | 0.63 | 0.63 |
| Joint evaluation | | | | | |
| Vicat softening point (° C.) | 147 | 148 | 146 | 142 | 136 |
| Charpy (kgf · cm/cm²) | 18 | 18 | 8 | 9 | 22 |

EXAMPLE 70

The PVC preparation was made in the same manner as in Example 62.

The CPVC preparation was made in the same manner as in Example 46.

The CPVC obtained had a chlorination degree of 72.1% by weight, a void ratio of 35.8% by volume, a specific surface area value of 9.5 m²/g, a void volume of 10.9% by volume and an ESCA value of 0.66.

The compounding and molding were carried out in the same manner as in Example 64.

EXAMPLE 71

The PVC preparation was made in the same manner as in Example 63.

The CPVC preparation was made in the same manner as in Example 46.

The CPVC obtained had a chlorination degree of 72.1% by weight, a void ratio of 32.8% by volume, a specific surface area value of 6.1 m²/g, a void volume of 6.8% by volume and an ESCA value of 0.50.

The compounding and molding were carried out in the same manner as in Example 64.

COMPARATIVE EXAMPLE 52

The PVC preparation was made in the same manner as in Example 62.

The CPVC preparation was made in the same manner as in Example 46 except that the reaction temperature was 140° C.

The CPVC obtained had a chlorination degree of 72.1% by weight, a void ratio of 35.8% by volume, a specific surface area value of 2.4 m²/g, a void volume of 1.8% by volume and an ESCA value of 0.66.

The compounding and molding were carried out in the same manner as in Example 64.

COMPARATIVE EXAMPLE 53

The PVC preparation was made in the same manner as in Example 62.

The CPVC preparation was made in the same manner as in Example 44 except that the final degree of chlorination was 71.0% by weight.

The CPVC obtained had a chlorination degree of 71.0% by weight, a void ratio of 34.8% by volume, a specific surface area value of 9.1 m²/g, a void volume of 10.2% by volume and an ESCA value of 0.68.

The compounding and molding were carried out in the same manner as in Example 64.

The CPVC joints obtained in the above Examples 70 and 71 and Comparative Examples 52 and 53 were measured for Vicat softening temperature. The results are shown in Table 24.

TABLE 24

|  | Example | | Compar. Ex. | |
| --- | --- | --- | --- | --- |
|  | 70 | 71 | 52 | 53 |
| CPVC | | | | |
| Chlorine content (wt %) | 72.1 | 72.1 | 72.1 | 71.0 |
| Void ratio (vol. %) | 35.8 | 32.8 | 35.8 | 34.8 |
| Void volume (vol. %) | 10.9 | 6.8 | 1.8 | 10.2 |
| Specific surface area ($m^2/g$) | 9.5 | 6.1 | 2.4 | 9.1 |
| ESCA value | 0.66 | 0.50 | 0.66 | 0.68 |
| Joint evaluation | | | | |
| Vicat softening point (° C.) | 157 | 156 | 157 | 150 |
| Charpy (kgf · $cm/cm^2$) | 17 | 16 | 8 | 19 |

EXAMPLE 72

The PVC preparation was made in the same manner as in Example 62.

The CPVC preparation was made in the same manner as in Example 66. The CPVC obtained had a chlorination degree of 74.5% by weight, a void ratio of 36.2% by volume, a specific surface area value of 8.9 $m^2/g$, a void volume of 10.6% by volume and an ESCA value of 0.70.

The compounding and molding were carried out in the same manner as in Example 66.

EXAMPLE 73

The PVC preparation was made in the same manner as in Example 63.

The CPVC preparation was made in the same manner as in Example 66.

The CPVC obtained had a chlorination degree of 74.5% by weight, a void ratio of 32.8% by volume, a specific surface area value of 5.4 $m^2/g$, a void volume of 6.5% by volume and an ESCA value of 0.51.

The compounding and molding were carried out in the same manner as in Example 66.

COMPARATIVE EXAMPLE 54

The PVC preparation was made in the same manner as in Example 62.

The CPVC preparation was made in the same manner as in Example 62 except that the reaction temperature was 140° C.

The CPVC obtained had a chlorination degree of 74.5% by weight, a void ratio of 34.2% by volume, a specific surface area value of 3.0 $m^2/g$, a void volume of 2.5% by volume and an ESCA value of 0.67.

The compounding and molding were carried out in the same manner as in Example 66.

COMPARATIVE EXAMPLE 55

The PVC preparation was made in the same manner as in Example 62.

The CPVC preparation was made in the same manner as in Example 1 except that the final degree of chlorination was 73.0% by weight.

The CPVC obtained had a chlorination degree of 73.0% by weight, a void ratio of 35.5% by volume, a specific surface area value of 9.3 $m^2/g$, a void volume of 11.1% by volume and an ESCA value of 0.71.

The compounding and molding were carried out in the same manner as in Example 66.

The CPVC joints obtained in the above Examples 72 and 73 and Comparative Examples 54 and 55 were measured for Vicat softening temperature. The results are shown in Table 25.

TABLE 25

|  | Example | | Compar. Ex. | |
| --- | --- | --- | --- | --- |
|  | 72 | 73 | 54 | 55 |
| CPVC | | | | |
| Chlorine content (wt %) | 74.5 | 74.5 | 74.5 | 73.0 |
| Void ratio (vol. %) | 36.2 | 32.8 | 34.2 | 35.5 |
| Void volume (vol. %) | 10.6 | 6.5 | 2.5 | 11.1 |
| Specific surface area ($m^2/g$) | 8.9 | 5.4 | 3.0 | 9.3 |
| ESCA value | 0.70 | 0.51 | 0.67 | 0.71 |
| Joint evaluation | | | | |
| Vicat softening point (° C.) | 172 | 171 | 173 | 163 |
| Charpy (kgf · $cm/cm^2$) | 15 | 14 | 5 | 17 |

EXAMPLE 74

The PVC preparation was made in the same manner as in Example 62.

The CPVC preparation was made in the same manner as in Example 44 except that the final degree of chlorination was 71.5% by weight.

The CPVC obtained had a chlorination degree of 71.5% by weight, a void ratio of 36.3% by volume, a specific surface area value of 9.0 $m^2/g$, a void volume of 11.4% by volume and an ESCA value of 0.69.

Formulation for CPVC Joints

The additives specified in Table 26 were added to 100 parts by weight of the above CPVC and the whole was blended with heating in a Henschel mixer.

TABLE 26

| Ingredient | phr |
| --- | --- |
| CPVC | 100.0 |
| Organotin stabilizer | 4.0 |
| MBS | 6.0 |
| PE type lubricant | 1.0 |
| Ester type lubricant | 0.5 |
| Pigment | 1.0 |

The molding was carried out in the same manner as in Example 62.

EXAMPLE 75

The PVC preparation was made in the same manner as in Example 63.

The CPVC preparation was made in the same manner as in Example 74.

The CPVC obtained had a chlorination degree of 71.5% by weight, a void ratio of 34.0% by volume, a specific surface area value of 5.8m²/g, a void volume of 7.2% by volume and an ESCA value of 0.49.

The compounding and molding were carried out in the same manner as in Example 74.

COMPARATIVE EXAMPLE 56

The PVC preparation was made in the same manner as in Comparative Example 62.

The CPVC preparation was made in the same manner as in Example 74.

The CPVC obtained had a chlorination degree of 71.5% by weight, a void ratio of 27.4% by volume, a specific surface area value of 2.0 m²/g, a void volume of 2.1% by volume and an ESCA value of 0.21.

The compounding and molding were carried out in the same manner as in Example 74.

COMPARATIVE EXAMPLE 57

The PVC preparation was made in the same manner as in Example 62.

The CPVC preparation was made in the same manner as in Example 74 except that the reaction temperature was 140° C.

The CPVC obtained had a chlorination degree of 71.5% by weight, a void ratio of 33.7% by volume, a specific surface area value of 3.6 m²/g, a void volume of 3.4% by volume and an ESCA value of 0.63.

The compounding and molding were carried out in the same manner as in Example 74.

COMPARATIVE EXAMPLE 58

The PVC preparation was made in the same manner as in Example 63.

The CPVC preparation was made in the same manner as in Example 64.

The CPVC obtained had a chlorination degree of 69.0% by weight, a void ratio of 35.2% by volume, a specific surface area value of 9.1 m²/g, a void volume of 10.8% by volume and an ESCA value of 0.63.

The compounding and molding were carried out in the same manner as in Example 74.

The CPVC joints obtained in the above Examples 74 and 75 and Comparative Examples 56 to 58 were measured for Vicat softening temperature. The results are shown in Table 27.

TABLE 23

|  | Example | | Compar. Ex. | | |
| --- | --- | --- | --- | --- | --- |
|  | 74 | 75 | 56 | 57 | 58 |
| CPVC | | | | | |
| Chlorine content (wt %) | 71.5 | 71.5 | 71.5 | 71.5 | 69.0 |
| Void ratio (vol. %) | 36.3 | 34.0 | 27.4 | 33.7 | 35.2 |
| Void volume (vol. %) | 11.4 | 7.2 | 2.1 | 3.4 | 10.8 |
| Specific surface area (m²/g) | 9.0 | 5.8 | 2.0 | 3.6 | 9.1 |
| ESCA value | 0.69 | 0.49 | 0.21 | 0.63 | 0.63 |
| Joint evaluation | | | | | |
| Vicat softening point (° C.) | 146 | 145 | 146 | 143 | 136 |
| Charpy (kgf · cm/cm²) | 25 | 24 | 14 | 15 | 28 |

EXAMPLE 76

The PVC preparation was made in the same manner as in Example 62.

The CPVC preparation was made in the same manner as in Example 44 except that the final degree of chlorination was 73.1% by weight.

The CPVC obtained had a chlorination degree of 73.1% by weight, a void ratio of 36.1% by volume, a specific surface area value of 9.6 m²/g, a void volume of 11.2% by volume and an ESCA value of 0.66.

The compounding was carried out in the same manner as in Example 74.

The molding was carried out in the same manner as in Example 64.

EXAMPLE 77

The PVC preparation was made in the same manner as in Example 63.

The CPVC preparation was made in the same manner as in Example 76.

The CPVC obtained had a chlorination degree of 73.1% by weight, avoid ratio of 33.1% by volume, a specific surface area value of 6.6 m²/g, a void volume of 7.2% by volume and an ESCA value of 0.50.

The compounding and molding were carried out in the same manner as in Example 76.

COMPARATIVE EXAMPLE 59

The PVC preparation was made in the same manner as in Comparative Example 62.

The CPVC preparation was made in the same manner as in Example 76 except that the reaction temperature was 140° C.

The CPVC obtained had a chlorination degree of 73.1% by weight, a void ratio of 36.0% by volume, a specific surface area value of 2.9 m²/g, a void volume of 2.0% by volume and an ESCA value of 0.66.

The compounding and molding were carried out in the same manner as in Example 76.

COMPARATIVE EXAMPLE 60

The PVC preparation was made in the same manner as in Comparative Example 49.

The CPVC preparation was made in the same manner as in Example 66.

The CPVC obtained had a chlorination degree of 71.0% by weight, avoid ratio of 34.8% by volume, a specific surface area value of 9.1 m²/g, a void volume of 10.2% by volume and an ESCA value of 0.68.

The compounding and molding were carried out in the same manner as in Example 76.

The CPVC joints obtained in the above Examples 76 and 77 and Comparative Examples 59 and 60 were measured for Vicat softening temperature. The results are shown in Table 28.

TABLE 28

|  | Example | | Compar. Ex. | |
| --- | --- | --- | --- | --- |
|  | 76 | 77 | 59 | 60 |
| CPVC | | | | |
| Chlorine content (wt %) | 73.1 | 73.1 | 73.1 | 71.0 |
| Void ratio (vol. %) | 36.1 | 33.1 | 36.0 | 34.8 |
| Void volume (vol. %) | 11.2 | 7.2 | 2.0 | 10.2 |
| Specific surface area (m²/g) | 9.6 | 6.6 | 2.9 | 9.1 |
| ESCA value | 0.66 | 0.50 | 0.66 | 0.68 |
| Joint evaluation | | | | |
| Vicat softening point (° C.) | 155 | 156 | 155 | 150 |
| Charpy (kgf · cm/cm²) | 23 | 22 | 12 | 25 |

EXAMPLE 78

The PVC preparation was made in the same manner as in Example 62.

The CPVC preparation was made in the same manner as in Example 44 except that the final degree of chlorination was 7.5% by weight. The CPVC obtained had a chlorination degree of 75.5% by weight, a void ratio of 36.5% by volume, a specific surface area value of 9.0 m²/g, a void volume of 11.3% by volume and an ESCA value of 0.70.

The compounding was carried out in the same manner as in Example 74 except that the organotin stabilizer was used in an amount of 5.0 phr and MBS in an amount of 7.0 phr.

The molding was carried out in the same manner as in Example 66.

EXAMPLE 79

The PVC preparation was made in the same manner as in Example 63.

The CPVC preparation was made in the same manner as in Example 78.

The CPVC obtained had a chlorination degree of 75.5% by weight, a void ratio of 33.4% by volume, a specific surface area value of 5.7 m²/g, a void volume of 6.9% by volume and an ESCA value of 0.51.

The compounding and molding were carried out in the same manner as in Example 78.

COMPARATIVE EXAMPLE 61

The PVC preparation was made in the same manner as in Example 62.

The CPVC preparation was made in the same manner as in Example 78 except that the reaction temperature was 140° C.

The CPVC obtained had a chlorination degree of 75.5% by weight, a void ratio of 34:4% by volume, a specific surface area value of 3.1 m²/g, a void volume of 3.0% by volume and an ESCA value of 0.67.

The compounding and molding were carried out in the same manner as in Example 78.

COMPARATIVE EXAMPLE 62

The PVC preparation was made in the same manner as in Example 62.

The CPVC preparation was made in the same manner as in Comparative Example 55.

The CPVC obtained had a chlorination degree of 73.0% by weight, a void ratio of 35.5% by volume, a specific surface area value of 9.3 m²/g, a void volume of 11.1% by volume and an ESCA value of 0.71.

The compounding and molding were carried out in the same manner as in Example 78.

The CPVC joints obtained in the above Examples 78 and 79 and Comparative Examples 61 and 62 were measured for Vicat softening temperature. The results are shown in Table 29.

TABLE 29

|  | Example | | Compar. Ex. | |
| --- | --- | --- | --- | --- |
|  | 78 | 79 | 61 | 62 |
| CPVC | | | | |
| Chlorine content (wt %) | 75.5 | 75.5 | 75.5 | 73.0 |
| Void ratio (vol. %) | 36.5 | 33.4 | 34.4 | 35.5 |
| Void volume (vol. %) | 11.3 | 6.9 | 3.0 | 11.1 |
| Specific surface area (m²/g) | 9.0 | 5.7 | 3.1 | 9.3 |
| ESCA value | 0.70 | 0.51 | 0.67 | 0.71 |
| Joint evaluation | | | | |
| Vicat softening point (° C.) | 171 | 171 | 170 | 163 |
| Charpy (kgf · cm/cm²) | 21 | 20 | 9 | 23 |

EXAMPLE 80

PVC Preparation.

A polymerizer (pressure-resistant autoclave; capacity 100 liters) was charged with 50 kg of deionized water and 400 ppm (on vinyl chloride monomer basis; hereinafter same shall apply) of partially saponified polyvinyl acetate (average saponification degree 72 mole percent; polymerization degree 700), 1,600 ppm of sorbitan monolaurate (HLB 8.6), 1,500 ppm of lauric acid, 100 ppm of polyacrylamide (Brookfield viscosity of a 0.1% (by weight) aqueous solution at 20° C. and 1 atm.: 51 cps) and 500 ppm of tert-butyl peroxyneodecanoate. Then, the polymerizer was deaerated to 45 mmHg and, thereafter, 33 kg of vinyl chloride monomer was charged thereinto and stirring was started. The polymerizer was heated to 69° C. to thereby initiate the polymerization and this temperature was maintained until termination of the polymerization reaction. When the conversion by polymerization reached 90%, the reaction was discontinued, the unreacted monomer in the polymerizer was recovered, and the polymer slurry was then discharged out of the system and dehydrated and dried to give PVC.

The CPVC preparation was made in the same manner as in Example 44.

The CPVC obtained had a chlorination degree of 70.5% by weight, a void ratio of 35.8% by volume, a specific surface area value of 8.7 m²/g, a void volume of 11.0% by volume and an ESCA value of 0.70.

Formulation for CPVC Plates

The additives specified in Table 30 were added to 100 parts by weight of the above CPVC and the whole was blended with heating in a Henschel mixer.

TABLE 30

| Ingredient | phr |
|---|---|
| CPVC | 100.0 |
| Organotin stabilizer | 4.0 |
| MBS | 4.0 |
| Ester type lubricant | 2.5 |
| Acrylic processing aid | 2.0 |
| Pigment | 1.0 |

Molding of CPVC Plates

Using the above mixture, molding was carried out under the following extrusion conditions.

Extrusion molding machine (30 mm single-screw extruder):
Plastic Kogaku Kenkyuusho model GT-32A (trademark);
Screw revolution speed: 20 to 30 rpm;
Mold: T die (lip width: 33 mm; lip thickness: 5 mm);
Resin temperature: 215 to 217° C.;
Molding temperatures: Mold temperature 200 to 215° C.; barrel temperatures 185 to 210° C.;
Sizing die: Lip width 40 mm, lip thickness 8 mm;
Cooling bath: Length 1 m, bath capacity 30 liters, water temperature 19 to 21° C.;
Take-off: Take-up speed 0.6 m/min.

The CPVC plate obtained was measured for Vicat softening temperature, chlorine water resistance and alkali resistance. The results are shown in Table 31.

The chlorine water resistance was evaluated by immersing the plate in saturated chlorine water at 80° C. and measuring the weight change after 2 months, and the alkali resistance was evaluated by immersing the plate in 14% aqueous KOH at 90° C. and measuring the weight change after 2 months of immersion. In the following examples and comparative examples, the same methods were used.

EXAMPLE 81

The PVC preparation was made in the same manner as in Example 80 except that the partially saponified polyvinyl acetate was used in an amount of 650 ppm.

The CPVC preparation was made in the same manner as in Example 80. The CPVC obtained had a void ratio of 33.6% by volume, a specific surface area value of 5.6 m²/g, a void volume of 6.6% by volume and an ESCA value of 0.52.

The compounding and molding were carried out in the same manner as in Example 80.

The CPVC plate obtained was measured for Vicat softening temperature, chlorine water resistance and alkali resistance. The results are shown in Table 31.

COMPARATIVE EXAMPLE 63

PVC Preparation

A polymerizer (pressure-resistant autoclave; capacity 100 liters) was charged with 50 kg of deionized water and 1,200 ppm (on vinyl chloride monomer basis) of partially saponified polyvinyl acetate (average saponification degree 72 mole percent; polymerization degree 700) as suspending and dispersing agent, and 500 ppm (on vinyl chloride monomer basis) of tert-butyl peroxyneodecanoate was added. Then, the polymerizer was deaerated to 45 mmHg and, thereafter, 33 kg of vinyl chloride monomer was charged thereinto and stirring was started. The polymerizer was heated to 69° C. to thereby initiate the polymerization and this temperature was maintained until termination of the polymerization reaction. When the conversion by polymerization reached 90%, the reaction was discontinued, the unreacted monomer in the polymerizer was recovered, and the polymer slurry was then discharged out of the system and dehydrated and dried to give PVC.

The CPVC preparation was made in the same manner as in Example 80.

The CPVC obtained had a void ratio of 25.3% by volume, a specific surface area value of 1.7 m²/g, a void volume of 1.9% by volume and an ESCA value of 0.22.

The compounding and molding were carried out in the same manner as in Example 80.

The CPVC plate obtained was measured for Vicat softening temperature, chlorine water resistance and alkali resistance. The results are shown in Table 31.

COMPARATIVE EXAMPLE 64

The PVC preparation was made in the same manner as in Example 80.

CPVC Preparation

A glass-lined pressure-resistant reactor (capacity 300 liters) was charged with 150 kg of deionized water and 40 kg of the PVC obtained in the above manner, the PVC was dispersed in water by stirring and then the inside air was suctioned by a vacuum pump and the pressure was thereby reduced to a gauge pressure of −0.8 kgf/cm². Pressure recovery was effected with nitrogen gas and the reactor inside was again suctioned by a vacuum pump to thereby eliminate oxygen from the reactor inside. During this operation, the reactor inside was warmed by passing a heated oil through a jacket. When the reactor inside temperature reached 90° C., the feeding of chlorine gas was started and the reaction was allowed to proceed at a constant temperature of 140° C. The degree of chlorination was calculated based on the concentration of hydrogen chloride produced in the reactor and, at the time point when the degree of chlorination was confirmed to have reached 70.5% by weight, the feeding of chlorine gas was discontinued and the chlorination reaction was terminated.

Further, the unreacted chlorine was purged by blowing nitrogen gas into the reactor, and the resin obtained was washed with water, dehydrated and dried to give powdery CPVC. The CPVC obtained had a chlorination degree of 70.5% by weight, a void ratio of 33.8% by volume, a specific surface area of 3.8 m²/g, a void volume of 3.3% by volume and an ESCA value of 0.65.

The compounding and molding were carried out in the same manner as in Example 80.

The CPVC plate obtained was measured for Vicat softening temperature, chlorine water resistance and alkali resistance. The results are shown in Table 31.

COMPARATIVE EXAMPLE 65

The PVC preparation was made in the same manner as in Example 80.

The CPVC preparation was made in the same manner as in Example 37 except that the final degree of chlorination was 69.0%. The CPVC obtained had a void ratio of 34.4% by volume, a specific surface area of 8.4 m$^2$/g, a void volume of 10.2% by volume and an ESCA value of 0.61.

The compounding and molding were carried out in the same manner as in Example 80.

The CPVC plate obtained was measured for Vicat softening temperature, chlorine water resistance and alkali resistance.

The results are shown in Table 31.

TABLE 31

|  | Example | | Compar. Ex. | | |
|---|---|---|---|---|---|
|  | 80 | 81 | 63 | 64 | 65 |
| CPVC |  |  |  |  |  |
| Chlorine content (wt. %) | 70.5 | 70.5 | 70.5 | 70.5 | 69.0 |
| Void ratio (vol. %) | 35.8 | 33.6 | 25.3 | 33.8 | 34.4 |
| Void volume (vol. %) | 11.0 | 6.6 | 1.9 | 3.3 | 10.2 |
| Specific surface area (m$^2$/g) | 8.7 | 5.6 | 1.7 | 3.8 | 8.4 |
| ESCA value | 0.70 | 0.52 | 0.22 | 0.65 | 0.61 |
| Plate |  |  |  |  |  |
| Vicat softening point (° C.) | 145 | 146 | 146 | 144 | 135 |
| Chlorine water resistance (% weight change) | 0.2 | 0.4 | 4.2 | 3.8 | 0.3 |
| Alkali resistance (% weight change) | 0.6 | 0.8 | 2.6 | 2.1 | 0.6 |

EXAMPLE 82

The PVC preparation was made in the same manner as in Example 80.

The CPVC preparation was made in the same manner as in Example 80 except that the final degree of chlorination was 72.1%. The CPVC obtained had a void ratio of 36.0% by volume, a specific surface area value of 9.6 m/g, a void volume of 11.1% by volume and an ESCA value of 0.63.

The compounding and molding were carried out in the same manner as in Example 80 except that the resin temperature was 220 to 230° C.

The CPVC plate obtained was measured for Vicat softening temperature, chlorine water resistance and alkali resistance.

The results are shown in Table 32.

EXAMPLE 83

The PVC preparation was made in the same manner as in Example 81.

The CPVC preparation was made in the same manner as in Example 82. The CPVC obtained had a void ratio of 32.5% by volume, a specific surface area value of 6.0 m$^2$/g, a void volume of 6.4% by volume and an ESCA value of 0.49.

The compounding and molding were carried out in the same manner as in Example 82.

The CPVC plate obtained was measured for Vicat softening temperature, chlorine water resistance and alkali resistance. The results are shown in Table 32.

COMPARATIVE EXAMPLE 66

The PVC preparation was made in the same manner as in Example 80.

The CPVC preparation was made in the same manner as in Example 82 except that the reaction temperature was 140° C. The CPVC obtained had a void ratio of 36.0% by volume, a specific surface area value of 2.3 m$^2$/g, a void volume of 2.0% by volume and an ESCA value of 0.63.

The compounding and molding were carried out in the same manner as in Example 82.

The CPVC plate obtained was measured for Vicat softening temperature, chlorine water resistance and alkali resistance. The results are shown in Table 32.

COMPARATIVE EXAMPLE 67

The PVC preparation was made in the same manner as in Example 80.

The CPVC preparation was made in the same manner as in Example 80 except that the final degree of chlorination was 71.0%. The CPVC obtained had a void ratio of 34.5% by volume, a specific surface area value of 8.9 m$^2$/g, a void volume of 9.8% by volume and an ESCA value of 0.66.

The compounding and molding were carried out in the same manner as in Example 82.

The CPVC plate obtained was measured for Vicat softening temperature, chlorine water resistance and alkali resistance. The results are shown in Table 32.

TABLE 32

|  | Example | | Compar. Ex | |
|---|---|---|---|---|
|  | 82 | 83 | 66 | 67 |
| CPVC |  |  |  |  |
| Chlorine content (wt. %) | 72.1 | 72.1 | 72.1 | 71.0 |
| Void ratio (vol. %) | 36.0 | 32.5 | 36.0 | 34.5 |
| Void volume (vol. %) | 11.1 | 6.4 | 2.0 | 9.8 |
| Specific surface area (m$^2$/g) | 9.6 | 6.0 | 2.3 | 8.9 |
| ESCA value | 0.63 | 0.49 | 0.63 | 0.66 |
| Plate |  |  |  |  |
| Vicat softening point (° C.) | 158 | 158 | 157 | 149 |
| Chlorine water resistance (% weight change) | 0.5 | 0.5 | 5.8 | 0.6 |
| Alkali resistance (% weight change) | 0.3 | 0.4 | 2.8 | 0.4 |

EXAMPLE 84

The PVC preparation was made in the same manner as in Example 80.

The CPVC preparation was made in the same manner as in Example 80 except that the final degree of chlorination was 74.5%. The CPVC obtained had a void ratio of 35.5% by volume, a specific surface area value of 8.8 m$^2$/g, a void volume of 10.2% by volume and an ESCA value of 0.68.

The compounding and molding were carried out in the same manner as in Example 80 except that the resin temperature was 225 to 228° C.

The CPVC plate obtained was measured for Vicat softening temperature, chlorine water resistance and alkali resistance. The results are shown in Table 33.

EXAMPLE 85

The PVC preparation was made in the same manner as in Example 81.

The CPVC preparation was made in the same manner as in Example 84. The CPVC obtained had a void ratio of 33.0% by volume, a specific surface area value of 5.6 m²/g, a void volume of 6.8% by volume and an ESCA value of 0.50.

The compounding and molding were carried out in the same manner as in Example 84.

The CPVC plate obtained was measured for Vicat softening temperature, chlorine water resistance and alkali resistance. The results are shown in Table 33.

COMPARATIVE EXAMPLE 68

The PVC preparation was made in the same manner as in Example 80.

The CPVC preparation was made in the same manner as in Example 84 except that the reaction temperature was 140° C. The CPVC obtained had a void ratio of 33.8% by volume, a specific surface area value of 2.9 m²/g, a void volume of 3.0% by volume and an ESCA value of 0.57.

The compounding and molding were carried out in the same manner as in Example 84.

The CPVC plate obtained was measured for Vicat softening temperature, chlorine water resistance and alkali resistance. The results are shown in Table 33.

COMPARATIVE EXAMPLE 69

The PVC preparation was made in the same manner as in Example 80.

The CPVC preparation was made in the same manner as in Example 80 except that the final degree of chlorination was 73.0%. The CPVC obtained had a void ratio of 35.0% by volume, a specific surface area value of 9.2 m²/g, a void volume of 10.8% by volume and an ESCA value of 0.70.

The compounding and molding were carried out in the same manner as in Example 84.

The CPVC plate obtained was measured for Vicat softening temperature, chlorine water resistance and alkali resistance. The results are shown in Table 33.

TABLE 33

|  | Example | | Compar. Ex | |
|---|---|---|---|---|
|  | 84 | 85 | 68 | 69 |
| CPVC |  |  |  |  |
| Chlorine content (wt. %) | 74.5 | 74.5 | 74.5 | 73.0 |
| Void ratio (vol. %) | 35.5 | 33.0 | 33.8 | 35.0 |
| Void volume (vol. %) | 10.2 | 6.8 | 3.0 | 10.8 |
| Specific surface area (m²/g) | 8.8 | 5.6 | 2.9 | 9.2 |
| ESCA value | 0.68 | 0.50 | 0.65 | 0.70 |
| Plate |  |  |  |  |
| Vicat softening point (° C.) | 171 | 170 | 172 | 162 |
| Chlorine water resistance (% weight change) | 0.7 | 0.5 | 8.7 | 0.8 |
| Alkali resistance (% weight change) | 0.3 | 0.3 | 2.8 | 0.3 |

EXAMPLE 86

The PVC preparation and CPVC preparation were made in the same manner as in Example 80.

The CPVC obtained had a chlorination degree of 70.5%, a void ratio of 35.8% by volume, a specific surface area value of 8.7 m²/g, a void volume of 11.0% by volume and an ESCA value of 0.70.

The compounding and molding were carried out in the same manner as in Example 80.

The CPVC plate obtained was measured for Vicat softening temperature, Chrapy impact strength, chlorine water resistance and alkali resistance. The results are shown in Table 34.

The Charpy impact strength of the plate obtained was evaluated by the following method.

Evaluation Method
(1) Charpy Impact Strength

Measurements were made according to the method of JIS K 7111.

EXAMPLE 87

The PVC preparation and CPVC preparation were made in the same manner as in Example 81.

The CPVC obtained had a void ratio of 33.6% by volume, a specific surface area value of 5.6 m²/g, a void volume of 6.6% by volume and an ESCA value of 0.52.

The compounding and molding were carried out in the same manner as in Example 80.

The CPVC plate obtained was measured for Vicat softening temperature, Chrapy impact strength, chlorine water resistance and alkali resistance. The results are shown in Table 34.

COMPARATIVE EXAMPLE 70

The PVC preparation was made in the same manner as in Compartive Example 63.

The CPVC preparation was made in the same manner as in Example 80. The CPVC obtained had a void ratio of 25.3% by volume, a specific surface area value of 1.7 m²/g, a void volume of 1.9% by volume and an ESCA value of 0.22.

The compounding and molding were carried out in the same manner as in Example 80.

The CPVC plate obtained was measured for Vicat softening temperature, Chrapy impact strength, chlorine water resistance and alkali resistance. The results are shown in Table 34.

COMPARATIVE EXAMPLE 71

The PVC preparation was made in the same manner as in Example 80.

The CPVC preparation was made in the same manner as in Comparative Example 64. The CPVC obtained had a void ratio of 33.8% by volume, a specific surface area value of 3.8 m²/g, a void volume of 3.3% by volume and an ESCA value of 0.65.

The compounding and molding were carried out in the same manner as in Example 80.

The CPVC plate obtained was measured for Vicat softening temperature, Chrapy impact strength, chlorine water resistance and alkali resistance. The results are shown in Table 34.

COMPARATIVE EXAMPLE 72

The PVC preparation was made in the same manner as in Example 80.

The CPVC preparation was made in the same manner as in Comparative Example 65. The CPVC obtained had a chlorine content of 69.0%, a void ratio of 34.4% by volume, a specific surface area value of 8.4 m²/g, a void volume of 10.2% by volume and an ESCA value of 0.61.

The compounding and molding were carried out in the same manner as in Example 80.

The CPVC plate obtained was measured for Vicat softening temperature, Chrapy impact strength, chlorine water resistance and alkali resistance. The results are shown in Table 34.

TABLE 34

|  | Example | | Compar. Ex. | | |
|---|---|---|---|---|---|
|  | 86 | 87 | 70 | 71 | 72 |
| CPVC |  |  |  |  |  |
| Chlorine content (wt. %) | 70.5 | 70.5 | 70.5 | 70.5 | 69.0 |
| Void ratio (vol. %) | 35.8 | 33.6 | 25.3 | 33.8 | 34.4 |
| Void volume (vol. %) | 11.0 | 6.6 | 1.9 | 3.3 | 10.2 |
| Specific surface area (m²/g) | 8.7 | 5.6 | 1.7 | 3.8 | 8.4 |
| ESCA value | 0.70 | 0.52 | 0.22 | 0.65 | 0.61 |
| Plate |  |  |  |  |  |
| Vicat softening point (° C.) | 145 | 146 | 146 | 144 | 135 |
| Charpy (kgf.cm/cm²) | 19 | 18 | 7 | 8 | 22 |
| Chlorine water resistance (% weight change) | 0.2 | 0.4 | 4.2 | 3.8 | 0.3 |
| Alkali resistance (% weight change) | 0.6 | 0.8 | 2.6 | 2.1 | 0.6 |

EXAMPLE 88

The PVC preparation was made in the same manner as in Example 80.

The CPVC preparation was made in the same manner as in Example 82. The CPVC obtained had a void ratio of 36.0% by volume, a specific surface area value of 9.6 m²/g, a void volume of 11.1% by volume and an ESCA value of 0.63.

The compounding and molding were carried out in the same manner as in Example 82.

The CPVC plate obtained was measured for Vicat softening temperature, Chrapy impact strength, chlorine water resistance and alkali resistance. The results are shown in Table 35.

EXAMPLE 89

The PVC preparation was made in the same manner as in Example 81.

The CPVC preparation was made in the same manner as in Example 82. The CPVC obtained had a void ratio of 32.5% by volume, a specific surface area value of 6.0 m²/g, a void volume of 6.4% by volume and an ESCA value of 0.49.

The compounding and molding were carried out in the same manner as in Example 82.

The CPVC plate obtained was measured for Vicat softening temperature, Chrapy impact strength, chlorine water resistance and alkali resistance. The results are shown in Table 35.

COMPARATIVE EXAMPLE 73

The PVC preparation was made in the same manner as in Example 80.

The CPVC preparation was made in the same manner as in Comparative Example 66. The CPVC obtained had a void ratio of 36.0% by volume, a specific surface area value of 2.3 m²/g, a void volume of 2.0% by volume and an ESCA value of 0.63.

The compounding and molding were carried out in the same manner as in Example 82.

The CPVC plate obtained was measured for Vicat softening temperature, Chrapy impact strength, chlorine water resistance and alkali resistance. The results are shown in Table 35.

COMPARATIVE EXAMPLE 74

The PVC preparation was made in the same manner as in Example 80.

The CPVC preparation was made in the same manner as in Comparative Example 67. The CPVC obtained had a void ratio of 34.5% by volume, a specific surface area value of 8.9 m²/g, a void volume of 9.8% by volume and an ESCA value of 0.66.

The compounding and molding were carried out in the same manner as in Example 82.

The CPVC plate obtained was measured for Vicat softening temperature, Chrapy impact strength, chlorine water resistance and alkali resistance. The results are shown in Table 35.

TABLE 35

|  | Example | | Compar. Ex. | |
|---|---|---|---|---|
|  | 88 | 89 | 73 | 74 |
| CPVC |  |  |  |  |
| Chlorine content (wt. %) | 72.1 | 72.1 | 72.1 | 71.0 |
| Void ratio (vol. %) | 36.0 | 32.5 | 36.0 | 34.5 |
| Void volume (vol. %) | 11.1 | 6.4 | 2.0 | 9.8 |
| Specific surface area (m²/g) | 9.6 | 6.0 | 2.3 | 8.9 |
| ESCA value | 0.63 | 0.49 | 0.63 | 0.66 |
| Plate |  |  |  |  |
| Vicat softening point (° C.) | 158 | 158 | 157 | 149 |
| Charpy (kgf.cm/cm²) | 16 | 16 | 5 | 18 |
| Chlorine water resistance (% weight change) | 0.5 | 0.5 | 5.8 | 0.6 |
| Alkali resistance (% weight change) | 0.3 | 0.4 | 0.4 | 0.4 |

EXAMPLE 90

The PVC preparation was made in the same manner as in Example 80.

The CPVC preparation was made in the same manner as in Example 84. The CPVC obtained had a void ratio of 35.5% by volume, a specific surface area value of 8.8 m²/g, a void volume of 10.2% by volume and an ESCA value of 0.68.

The compounding and molding were carried out in the same manner as in Example 84.

The CPVC plate obtained was measured for Vicat softening temperature, Chrapy impact strength, chlorine water resistance and alkali resistance. The results are shown in Table 36.

EXAMPLE 91

The PVC preparation was made in the same manner as in Example 81.

The CPVC preparation was made in the same manner as in Example 84. The CPVC obtained had a void ratio of 33.0% by volume, a specific surface area value of 5.6 $m^2/g$, a void volume of 6.8% by volume and an ESCA value of 0.50.

The compounding and molding were carried out in the same manner as in Example 84.

The CPVC plate obtained was measured for Vicat softening temperature, Chrapy impact strength, chlorine water resistance and alkali resistance. The results are shown in Table 36.

COMPARATIVE EXAMPLE 75

The PVC preparation was made in the same manner as in Example 80.

The CPVC preparation was made in the same manner as in Comparative Example 68. The CPVC obtained had a void ratio of 33.8% by volume, a specific surface area value of 2.9 $m^2/g$, a void volume of 3.0% by volume and an ESCA value of 0.66.

The compounding and molding were carried out in the same manner as in Example,84.

The CPVC plate obtained was measured for Vicat softening temperature, Chrapy impact strength, chlorine water resistance and alkali resistance. The results are shown in Table 36.

COMPARATIVE EXAMPLE 76

The PVC preparation was made in the same manner as in Example 80.

The CPVC preparation was made in the same manner as in Comparative Example 69. The CPVC obtained had a void ratio of 35.0% by volume, a specific surface area value of 9.2 $m^2/g$, a void volume of 10.8% by volume and an ESCA value of 0.70.

The compounding and molding were carried out in the same manner as in Example 84.

The CPVC plate obtained was measured for Vicat softening temperature, Chrapy impact strength, chlorine water resistance and alkali resistance. The results are shown in Table 36.

TABLE 36

|  | Example | | Compar. Ex. | |
| --- | --- | --- | --- | --- |
|  | 90 | 91 | 75 | 76 |
| CPVC |  |  |  |  |
| Chlorine content (wt. %) | 74.5 | 74.5 | 74.5 | 73.0 |
| Void ratio (vol. %) | 35.5 | 33.0 | 33.8 | 35.0 |
| Void volume (vol. %) | 10.2 | 6.8 | 3.0 | 10.8 |
| Specific surface area ($m^2/g$) | 8.8 | 5.6 | 2.9 | 9.2 |
| ESCA value | 0.68 | 0.50 | 0.65 | 0.70 |
| Plate |  |  |  |  |
| Vicat softening point (° C.) | 171 | 170 | 172 | 162 |
| Charpy (kgf.cm/$cm^2$) | 15 | 15 | 4 | 17 |
| Chlorine water resistance (% weight change) | 0.7 | 0.5 | 8.7 | 0.8 |
| Alkali resistance (% weight change) | 0.3 | 0.3 | 2.8 | 0.3 |

EXAMPLE 92

PVC Preparation

A polymerizer (pressure-resistant autoclave; capacity 100 liters) was charged with 50 kg of deionized water and 450 ppm (on vinyl chloride monomer basis; hereinafter same shall apply) of partially saponified polyvinyl acetate (average saponification degree 72 mole percent; polymerization degree 700), 1,800 ppm of sorbitan monolaurate, 1,200 ppm of lauric acid, 200 ppm of polyacrylamide (Brookfield viscosity of a 0.1% by weight) aqueous solution at 20° C. and 1 atm.: 51 cps) and 550 ppm of tert-butyl peroxyneodecanoate. Then, the polymerizer was deaerated to 45 mmHg and, thereafter, 33 kg of vinyl chloride monomer was charged thereinto and stirring was started. The polymerizer was heated to 57° C. to thereby initiate the polymerization and this temperature was maintained until termination of the polymerization reaction.

When the conversion by polymerization reached 90%, the reaction was discontinued, the unreacted monomer in the polymerizer was recovered, and the polymer slurry was then discharged out of the system and dehydrated on a dewatering centrifuge and dried on a drier.

The PVC obtained has a BET specific surface area of 4.1 $m^2/g$. The ESCA value indicative of the skin layer occurrence extent was 0.85.

CPVC Preparation

A glass-lined pressure-resistant reactor (capacity 300 liters) was charged with 160 kg of deionized water and 40 kg of the PVC obtained in the above manner, the PVC was dispersed in water by stirring and then the reactor inside was heated and maintained at 110° C. Nitrogen gas was then blown into the reactor to thereby purge the reactor inside with nitrogen gas and, thereafter, chlorine gas was blown into the reactor and the chlorination of PVC was effected. The chlorination reaction was continued while monitoring the progress of the chlorination reaction by calculating the degree of chlorination based on the concentration of hydrogen chloride in the reactor and, at the time point when the degree of chlorination reached 68.5% by weight, the feeding of chlorine gas was discontinued and the chlorination reaction was terminated.

Further, the unreacted chlorine was purged by blowing nitrogen gas into the reactor, and the resin obtained was neutralized with sodium hydroxide, washed with water, dehydrated and dried to give powdery CPVC. The CPVC obtained had a chlorine content of 68.5% by weight.

Compounding

The additives specified below were added to 100 parts by weight of the above CPVC and the whole was blended in a Henschel mixer while raising the temperature from room temperature up to 100° C., and then cooled.

Two (2) weight parts of an organotin stabilizer (product of Sankyo Yuki Gosei), 4 weight parts of chlorinated polyethylene (product of Showa Denko), 5 weight parts of an acrylic processing aid (product of KANEKA CORPORATION), 0.8 weight part of an acrylic processing aid (product of Mitsubishi Rayon), 0.9 weight part of a lubricant (product of Kao), 0.7 weight part of a lubricant (product of Mitsui Chemical), 0.2 weight part of oxidized polyethylene (product of Allied Signal) and 0. 3 weight part of a pigment (red, product of ResinoColor)

Molding

Using the above powder compound, molding was carried out under the following extrusion conditions.

Extruder: Nagata Seisakusho model SLM 50 (twin-screw two-directional conical extruder);

Mold: Mold for pipe manufacture, outlet port outer radius 11.66 mm, outlet port inside radius 9.4 mm, L/D=60/2.3 (mm), resin-contacting surface chromium-plated, Rmax=5 μm, Ra=0.10 μm (mean of 4 circumferential sites of the outlet port), three bridges;

Extruder output: 25 kg/hr;

Resin temperature: 205° C. (measured at mold entrance)

Number of revolutions: 20 to 25 rpm;

Barrel temperatures: B1 175° C., B2 180° C., B3 185° C., H1 190° C.;

Mold temperatures: D1 190° C., D2 205° C., D3 215° C. (tip parallel portion);

Screw temperature control: 130° C.

EXAMPLE 93

PVC Preparation

The preparation was made in the same manner as in Example 92.

CPVC Preparation

The preparation was made in the same manner as in Example 92 except that the chlorine content of the product CPVC was made 69.0% by weight.

Compounding

The compounding was carried out in the same manner as in Example 92.

Molding

Using the same extruder and mold as used in Example 92, the molding was carried out under the following extrusion conditions.

Extruder output: 25 kg/hr;

Resin temperature: 210° C. (measured at mold entrance);

Number of revolutions: 20 to 25 rpm;

Barrel temperatures: B1 175° C., B2 180° C., B3 190° C., H1 195° C.;

Mold temperatures: D1 195° C., D2 210° C., D3 220° C. (tip parallel portion);

Screw temperature control: 140° C.

COMPARATIVE EXAMPLE 77

PVC Preparation

A polymerizer (pressure-resistant autoclave; capacity 100 liters) was charged with 50 kg of deionized water and 1,200 ppm (on vinyl chloride monomer basis) of partially saponified polyvinyl acetate (average saponification degree 88 mole percent; polymerization degree 1,000) as suspending and dispersing agent, and 550 ppm (on vinyl chloride monomer basis) of tert-butyl peroxyneodecanoate was added. Then, the polymerizer was deaerated to 45 mmHg and, thereafter, 33 kg of vinyl chloride monomer was charged thereinto and stirring was started. The polymerizer was heated to 57° C. to thereby initiate the polymerization and this temperature was maintained until termination of the polymerization reaction.

When the conversion by polymerization reached 50%, the reaction was discontinued, the unreacted monomer in the polymerizer was recovered, and the polymer slurry was then discharged out of the system and dehydrated and dried to give PVC.

The PVC obtained had a BET specific surface area of 0.50 $m^2/g$. The ESCA value indicative of the skin layer occurrence extent was 0.11.

CPVC Preparation

The preparation was made in the same manner as in Example 92.

Compounding

The compounding was made in the same manner as in Example 92.

Molding

The molding was carried out under the same extrusion conditions using the same extruder and mold as employed in Example 92.

COMPARATIVE EXAMPLE 78

PVC Preparation

PVC was obtained in the same manner as in Comparative Example 77.

CPVC Preparation

The preparation was made in the same manner as in Example 93.

Compounding

The compounding was made in the same manner as in Example 92.

Molding

The molding was carried out under the same extrusion conditions as in Example 93 using the same extruder and mold as used in Example 92.

COMPARATIVE EXAMPLE 79

The PVC preparation, CPVC preparation and compounding were made in the same manner as in Comparative Example 78.

Molding

Using the same extruder and mold as used in Example 92, the molding was carried out under the following extrusion conditions.

Extruder output: 25 kg/hr;

Resin temperature: 220° C. (measured at mold entrance)

Number of revolutions: 20 to 25 rpm;

Barrel temperatures: B1 175° C., B2 180° C., B3 200° C., H1 200° C.;

Mold temperatures: D1 195° C., D2 210° C., D3 220° C. (tip parallel portion);

Screw temperature control: 150° C.

Evaluation Methods

The methods of BET specific surface area measurement and ESCA for the PVCs used in the above Examples 92 and 93 and Comparative Examples 77 to 79 and the method of chlorine content measurement for the CPVCs were as mentioned above.

Performance Evaluation

The moldings obtained in the above Examples 92 and 93 and Comparative Examples 77 to 79 were subjected to the following performance evaluation. The results are shown in Table 37.

Evaluation Methods (1) Heat Resistance Temperature Measurement

Test specimens were prepared by cutting the molding to a size of 10 mm×10 mm and the Vicat softening temperature of the inside surface was determined according to JIS K 7206 (weight 1.0 kgf, rate of temperature rise 50° C./hr)

(2) Surface Roughness Measurement

The surface roughness measurement was made at 8 circumferential sites (at 45° intervals) at various positions on the inside surface of the molding and the mean Rmax value calculated by the method mentioned below.

Measurement apparatus: Toyo Seimitsu SURFCOM 1.63;

Measurement conditions:

Measurement item: surface roughness measurement;

Measurement speed: 0.3 mm/s;

Length evaluated: 0.25 mm;

Cut-off value: 0.08 mm;

Correction for inclination: R surface;

Filter type: Gaussian;

λs filter: not used;

Preliminary drive length: cut-off ratio/3;

Calculation standard: JIS-94.

The 8-site measurement is repeated 8 times in the axial direction (without returning) and the mean of 6 sites exclusive of the maximum and minimum value sites is regarded as the surface roughness Rmax at the relevant position.

The mean of Rmax values for the 8 positions is reported as the Rmax of the specimen.

(3) Residual Heat Stability (Decomposition Time) Evaluation

Ten (10) test specimens, 10 cm×10 cm in size, cut out from each molding are placed in an oven in an atmosphere maintained at 200° C. The specimens are taken out one by one at 5-minute intervals. Each specimen taken out is observed by the eye and the time required for the sample taken out to manifest foaming, discoloration or darkening is reported as the decomposition time.

(4) Heavy Metal Elution Test

The pipe to be tested is washed with deionized water by filling this therein. Then, a 5% (by weight) aqueous solution of a detergent (Scat 20X-N; product of Daiichi Kogyo Seiyaku) is sealed therein and, after 30 minutes of standing, the pipe is washed with 5 portions of deionized water. Deionized water is then passed through the pipe for 15 minutes, and the pipe inside surface is further washed, in a clean room, with 5 portions of MilliQ water (water purified in Millipore's purification apparatus MilliQ SP). The thus-treated pipe is used as a test specimen.

One end of the test specimen is closed with a fluororesin (Teflon) stopper washed in advance, MilliQ water is then filled therein and the other end is sealed with a fluororesin (Teflon) stopper. The whole is heated at 90 Polycue in a constant-temperature vessel for 3.5 hours (inclusive of 0.5 hour for temperature raising) and then cooled, and the eluate is taken out and used as a sample for analysis.

The eluate sample for analysis is concentrated in a quartz dish and then analyzed for quantitation of metal elements (sodium, tin, calcium) using an ICP-MS apparatus for ultra-microanalysis (Yokogawa model PMS-2000). The quantitation results are shown in terms of amounts (ng) of metals eluted per gram of eluate. Table 37

TABLE 37

| | Example | | Compar. Ex. | | |
|---|---|---|---|---|---|
| | 92 | 93 | 77 | 78 | 79 |
| PVC | | | | | |
| BET specific surface area (m²/g) | 4.1 | 4.1 | 0.50 | 0.50 | 0.50 |
| ESCA value | 0.85 | 0.85 | 0.11 | 0.11 | 0.11 |
| Chlorine content of CPVC (wt %) | 68.5 | 69.0 | 68.5 | 69.0 | 69.0 |
| Resin temperature in the step of molding (° C.) | 205 | 210 | 205 | 210 | 220 |
| Molding | | | | | |
| Vicat softening temperature (° C.) | 131 | 136 | 131 | 135 | 135 |
| Surface roughness Rmax (μm) | 0.40 | 0.36 | 0.98 | 1.06 | 0.45 |
| Decomposition time (min.) | 45 | 50 | 40 | 45 | 10 |
| Metal elution (ng/g) | | | | | |
| Sodium | 0.2 | 0.2 | 0.3 | 0.3 | 0.3 |
| Tin | 1.6 | 1.4 | 1.1 | 1.4 | 1.1 |
| Calcium | 0.2 | 0.2 | 0.5 | 0.4 | 0.5 |
| For use as heat-resistant smooth pipe | ○ | ○ | x | x | x |
| For use in pure water distribution | ○ | ○ | ○ | ○ | ○ |

In Table 37, the suitability as a heat-resistant smooth pipe as judged based on the values obtained in evaluating the Vicat softening temperature, surface roughness Rmax and decomposition time according to the criteria given below is indicated by ○, and the unsuitability by x. The criteria for suitability are: Vicat softening temperature not lower than 125° C., surface roughness Rmax not more than 0.5 μm and decomposition time not shorter than 30 minutes.

Further, the suitability for use in pure water distribution systems as judged based on the metal elution values obtained in the heavy metal elution test according to the criteria given below is indicated by, and the unsuitability by x. The criteria for suitability are: sodium—not more than 50 ng/g, tin—not more than 5 ng/g and calcium—not more than 100 ng/g.

EXAMPLE 94

PVC Preparation

A polymerizer (pressure-resistant autoclave; capacity 100 liters) was charged with 50 kg of deionized water and 1,200 ppm (on vinyl chloride monomer basis) of partially saponified polyvinyl acetate (average saponification degree 88 mole percent; polymerization degree 1,000) as suspending and dispersing agent, and 550 ppm (on vinyl chloride monomer basis) of tert-butyl peroxyneodecanoate was added. Then, the polymerizer was deaerated to 45 mmHg and, thereafter, 33 kg of vinyl chloride monomer was charged thereinto and stirring was started. The polymerizer was heated to 57° C. to thereby initiate the polymerization and this temperature was maintained until termination of the polymerization reaction.

When the conversion by polymerization reached 50%, the reaction was discontinued, the unreacted monomer in the polymerizer was recovered, and the polymer slurry was then discharged out of the system, dehydrated on a dehydrating centrifuge and dried on a drier. The PVC obtained had a viscosity average degree of polymerization of 1,000 (as determined by the method according to JIS K 6721; hereinafter the same shall apply).

CPVC Preparation

A glass-lined pressure-resistant reactor (capacity 300 liters) was charged with 160 kg of deionized water and 40 kg of the PVC obtained in the above manner, the PVC was dispersed in water by stirring. Thereafter the reactor inside was heated and maintained at 110° C. Then, nitrogen gas was blown into the reactor to thereby purge the reactor inside with nitrogen gas and then chlorine gas was blown into the reactor and the chlorination reaction was carried out. The chlorination reaction was allowed to proceed while monitoring the progress of the chlorination reaction by determining the concentration of hydrochloric acid in the reactor and, at the time point when the chlorine content of the product CPVC reached 66. 5% by weight, the feeding of chlorine gas was discontinued and the chlorination reaction was terminated.

Further, the unreacted chlorine was purged by blowing nitrogen gas into the reactor, and the resin obtained was neutralized with sodium hydroxide, washed with water, dehydrated and dried to give powdery CPVC. The CPVC obtained had a chlorine content of 66.5% by weight.

Compounding

The same additives in the same amounts as used in Example 92 were added to 100 parts by weight of the above CPVC and the whole was blended in a Henschel mixer while raising the temperature from room temperature up to 100 cc, and then cooled.

Molding

Using the above powder compound, molding was carried out under the following extrusion conditions.

Extruder: Nagata Seisakusho model SLM 50 (twin-screw two-directional conical extruder);
Mold: Mold for pipe manufacture, outlet port outer radius 11.66 mm, outlet port inside radius 9.4 mm, L/D=60/2.3 (mm), resin-contacting surface chromium-plated, Rmax=5 $\mu$m, Ra=0.10 $\mu$m (mean of 4 circumferential sites of the outlet port), three bridges;
Extruder output: 25 kg/hr;
Resin temperature: 200° C. (measured at mold entrance)
Number of revolutions: 20 to 25 rpm;
Barrel temperatures: B1 175° C., B2 180° C., B3 185° C., H1 190° C.;
Mold temperatures: D1 190° C., D2 205° C., D3 210° C. (tip parallel portion);
Screw temperature control: 130° C.

EXAMPLE 95

PVC Preparation

The preparation was made in the same manner as in Example 94 except that the polymerization temperature was 60° C. The PVC obtained had a viscosity average degree of polymerization of 92.

CPVC Preparation

The preparation was made in the same manner as in Example 94.

Compounding

The compounding was carried out in the same manner as in Example 94.

Molding

The molding was carried out under the same extrusion conditions using the same extruder and mold as used in Example 94.

EXAMPLE 96

PVC Preparation

The preparation was made in the same manner as in Example 94 except that the polymerization temperature was 55° C. The PVC obtained had a viscosity average degree of polymerization of 1,090.

CPVC Preparation

The preparation was made in the same manner as in Example 94.

Compounding

The compounding was carried out in the same manner as in Example 94.

Molding

The molding was carried out under the same extrusion conditions using the same extruder and mold as used in Example 94.

EXAMPLE 97

PVC Preparation

The preparation was made in the same manner as in Example 94.

CPVC Preparation

The preparation was made in the same manner as in Example 94 except that the feeding of chlorine gas was discontinued and the reaction terminated when the chlorine content of the product CPVC reached 66.2% by weight.

Compounding

The compounding was carried out in the same manner as in Example 94.

Molding

Using the same extruder and mold as used in Example 94, the molding was carried out under the following extrusion conditions.

Extruder output: 25 kg/hr;

Resin temperature: 195° C. (measured at mold entrance);

Number of revolutions: 20 to 25 rpm;

Barrel temperatures: B1 175° C., B2 180° C., B3 190° C., H1 195° C.; Mold temperatures: D1 195° C., D2 210° C., D3 210° C. (tip parallel portion);

Screw temperature control: 120° C.

EXAMPLE 98

PVC Preparation

The preparation was made in the same manner as in Example 94.

CPVC Preparation

The preparation was made in the same manner as in Example 94 except that the feeding of chlorine gas was discontinued and the reaction terminated when the chlorine content of the product CPVC reached 67.2% by weight.

Compounding

Carried out in the same manner as in Example 94.

Molding

Using the same extruder and mold as used in Example 94, the molding was carried out under the following extrusion conditions.

Extruder output: 25 kg/hr;

Resin temperature: 205° C. (measured at mold entrance)

Number of revolutions: 20 to 25 rpm;

Barrel temperatures: B1 175° C., B2 180° C., B3 190° C., H1 195° C.;

Mold temperatures: D1 195° C., D2 210° C., D3 220° C. (tip parallel portion);

Screw temperature control: 140° C.

COMPARATIVE EXAMPLE 80

PVC Preparation

The preparation was made in the same manner as in Example 94 except that the polymerization temperature was 62° C. The PVC obtained had a viscosity average degree of polymerization of 860.

CPVC Preparation

The preparation was made in the same manner as in Example 94.

Compounding

The compounding was carried out in the same manner as in Example 94.

Molding

The molding was carried out under the same extrusion conditions using the same extruder and mold as used in Example 94.

COMPARATIVE EXAMPLE 81

PVC Preparation

The preparation was made in the same manner as in Example 94 except that the polymerization temperature was 54° C. The PVC obtained had a viscosity average degree of polymerization of 1,160.

CPVC Preparation

The preparation was made in the same manner as in Example 94.

Compounding

The compounding was carried out in the same manner as in Example 94.

Molding

The molding was carried out under the same extrusion conditions using the same extruder and mold as used in Example 94.

COMPARATIVE EXAMPLE 82

PVC preparation

The preparation was made in the same manner as in Example 94.

CPVC Preparation

The preparation was made in the same manner as in Example 94 except that the feeding of chlorine gas was discontinued and the chlorination reaction terminated when the chlorine content of the product CPVC reached 65.5% by weight.

Compounding

The compounding was carried out in the same manner as in Example 94.

Molding

Using the same extruder and mold as used in Example 94, the molding was carried out under the following extrusion conditions.

Extruder output: 25 kg/hr;

Resin temperature: 192° C. (measured at mold entrance),

Number of revolutions: 20 to 25 rpm;

Barrel temperatures: B1 175° C., B2 180° C., B3 190° C., H1 195° C.;

Mold temperatures: D1 195° C., D2 210° C., D3 210° C. (tip parallel portion);

Screw temperature control: 110° C.

COMPARATIVE EXAMPLE 83

PVC Preparation

The preparation was made in the same manner as in Example 94.

CPVC Preparation

The preparation was made in the same manner as in Example 94 except that the feeding of chlorine gas was discontinued and the chlorination reaction terminated when the chlorine content of the product CPVC reached,67.9% by weight.

Compounding

The compounding was carried out in the same manner as in Example 94.

Molding

Using the same extruder and mold as used in Example 94, the molding was carried out under the following extrusion conditions.

Extruder output: 25 kg/hr;
Resin temperature: 210° C. (measured at mold entrance);
Number of revolutions: 20 to 25 rpm;
Barrel temperatures: B1 175° C., B2 180° C., B3 190° C., H1 195° C.;
Mold temperatures: D1 195° C., D2 210° C., D3 220° C. (tip parallel portion);
Screw temperature control: 150° C.

Performance Evaluation

The moldings obtained in the above Examples 94 to 98 and Comparative Examples 80 to 83 were subjected to the following performance evaluation. The results are shown in Table 38.

Evaluation Methods
(1) Heat Resistance Temperature Measurement

The measurement was made in the same manner as the heat resistance temperature measurement for the molding obtained in Example 92.

Filter type: Gaussian;
λs filter: not used;
Preliminary drive length: cut-off ratio/3;
Calculation standard: JIS-'94.

The mean of Wct values for the 10 positions is reported as the Wct of the specimen.

(4) SC Resistance Measurement

Five (5) moldings are cut to a length of 5 cm and suspended in the middle of a cylindrical container with a capacity of 7 liters (diameter 150 mm) A cup containing 5 g of an adhesive (adhesive for polyvinyl chloride #100, product of Sekisui Chemical) is placed on the bottom of the container, the container is tightly closed and the whole is allowed to stand in an atmosphere maintained at −5° C. for 17 hours. The test specimens taken out are conditioned in an atmosphere maintained at 23° C. for at least 24 hours and then compressed by a distance of half the pipe radius using parallel flat plates at a rate of 10 mm/min in an atmosphere at 23° C., and the percent flattening at the time of crack appearance on the inside surface is recorded. The percent flattening is calculated as follows: Flattening (%)=[(pipe diameter)−(distance between parallel flat plates at the time of crack appearance)]÷(pipe diameter)×100

The maximum flattening (%) calculated by the above formula is 50%.

TABLE 38

| | Example | | | | | Compar. Ex. | | | |
|---|---|---|---|---|---|---|---|---|---|
| | 94 | 95 | 96 | 97 | 98 | 80 | 81 | 82 | 83 |
| Viscosity average degree of polmerization of PVC | 1000 | 920 | 1090 | 1000 | 1000 | 860 | 1160 | 1000 | 1000 |
| Chlorine content of CPVC (wt %) | 66.5 | 66.5 | 66.5 | 66.2 | 67.2 | 66.5 | 66.5 | 65.5 | 67.9 |
| Molding | | | | | | | | | |
| Vicat softening point (° C.) | 115 | 115 | 115 | 110 | 119 | 115 | 115 | 106 | 123 |
| Surface roughness Rmax ($\mu$m) | 0.31 | 0.13 | 0.48 | 0.25 | 0.77 | 0.11 | 0.64 | 0.23 | 1.43 |
| Inside surface unevenness Wct ($\mu$m) | 21 | 15 | 29 | 18 | 36 | 12 | 55 | 13 | 135 |
| Flattening (%) | 50 | 42 | 50 | 50 | 45 | 18 | 50 | 50 | 38 |

(2) Surface Roughness Measurement

The measurement was made in the same manner as the surface roughness measurement for the molding obtained in Example 92.

(3) Inside Surface Unevenness Measurement

The inside surface unevnness measurement was made at 10 circumferential sites (at 36° intervals) by the method mentioned below and the mean value thereof was calculated to give Wct.

Measurement apparatus: Toyo Seimitsu SURFCOM 1.63;
Measurement conditions:
Measurement item: filtered wave central swell;
Measurement speed: 3 mm/sec;
Length evaluated: 100 mm;
Cut-off value: 2.5 to 25.0 mm;
Correction for inclination: R surface;

INDUSTRIAL APPLICABILITY

Since the present invention is constituted in the above manner, the chlorinated vinyl chloride resin of the invention is excellent in gelling properties and heat resistance. The vinyl chloride resin and chlorinated vinyl chloride resin of the invention allow high level filling and dispersion of various compounding additives and are excellent in shock resistance. The chlorinated vinyl chloride resin of the invention is excellent in heat resistance and gelling property manifestation, and the method of producing a chlorinated vinyl chloride resin according to the invention can produce chlorinated vinyl chloride resins excellent in heat resistance and gelation properties or gelling property manifestation.

The highly heat-resistant chlorinated vinyl chloride resin pipes and joints of the invention are constituted as mentioned above and, therefore, are excellent in heat resistance and shock resistance and can be used in cases where a gas or liquid at 100° C. or above is passed, hence as piping materials for return steam and as joints for return steam piping systems.

The highly heat-resistant vinyl chloride resin plates of the invention, which are constituted as mentioned above, are excellent in heat resistance, shock resistance and chemical resistance and can be used as plates for constructing tanks for storing chemicals at 100° C. and above.

The highly heat-resistant vinyl chloride resin moldings of the invention are constituted as mentioned above and, therefore, are highly reliable as to heat resistance and so on, and are excellent in smoothness and have a good appearance.

The heat-resistant vinyl chloride resin pipes, which are constituted as mentioned above, have high heat resistance and are so excellent in smoothness that the propagation of bacteria and the like in the pipes can be inhibited. Thus, they can be used as heat-resistant vinyl chloride resin pipes capable of being used in pure water distribution systems or as piping materials excellent in smoothness and having both heat resistance and SC resistance and suited for use in ultrahigh pure water distribution systems for use in plants.

What is claimed is:

1. A chlorinated vinyl chloride resin obtained by chlorination of a vinyl chloride resin, said vinyl chloride resin having a BET specific surface area of 1.3 to 8 m²/g and a carbon element-chlorine element 1S bond energy (eV) peak ratio (chlorine element peak×2/carbon element peak) of higher than 0.6 as determined by particle surface analysis by ESCA (electron spectroscopy for chemical analysis).

2. The chlorinated vinyl chloride resin according to claim 1 which satisfies the following relations (1) and (2):

$$-3.9X+300 \geq Y \geq -3.9X+290 \quad (1)$$

$$-3.2X+280 \geq Z \geq -3.2X+270 \quad (2)$$

wherein X is the chlorine content (% by weight) of the chlorinated vinyl chloride resin and, Y is the amount (g) of methyl alcohol required for initiating precipitation of the chlorinated vinyl chloride resin when 3.0 g of the resin is completely dissolved in 60 g of tetrahydrofuran at 20° C. and then methyl alcohol is gradually added to the solution to thereby cause precipitation of the resin, and Z is the amount (g) of methyl alcohol required to cause 80% by weight of the resin to precipitate.

3. A chlorinated vinyl chloride resin obtained by chlorination of a vinyl chloride resin, said vinyl chloride resin having a BET specific surface area of 1.3 to 8 m²/g and a carbon element-chlorine element 1S bond energy (eV) peak ratio (chlorine element peak×2/carbon element peak) of higher than 0.6 as determined by particle surface analysis by electron spectroscopy for chemical analysis, agglomerate being obtained by agglomeration of primary particles of the vinyl chloride resin, the average particle diameter of an agglomerate being 1 to 7 μm.

4. The chlorinated vinyl chloride resin according to claim 3, wherein the chlorination is carried out using a heat energy source.

5. A vinyl chloride resin having a BET specific surface area of 1.3 to 8 m²/g, a carbon element-chlorine element 1S bond energy (eV) peak ratio [(chlorine element peak)×2/carbon element peak] of higher than 0.6 as determined by particle surface analysis by electron spectroscopy for chemical analysis, a void ratio of 27 to 40% by volume as determined by mercury porosimetry at a pressure of 2,000 kg/cm² and an average pore size of 0.1 to 0.5 μm.

6. The vinyl chloride resin according to claim 5 wherein, in the pore volume distribution thereof as determined by mercury porosimetry in the pressure range of 0 to 2,000 kg/cm², the percentage by volume (A1) of the volume of voids 0.001 to 0.1 μm in size to the total volume of voids is 2 to 10% by volume.

7. A chlorinated vinyl chloride resin obtained by chlorination of the vinyl chloride resin according to claim 5 or 6.

8. A chlorinated vinyl chloride resin obtained by chlorination of a vinyl chloride resin, wherein said vinyl chloride resin has a BET specific surface area of 1.3 to 8 m2/g, a carbon element-chlorine element 1S bond energy (eV) peak ratio [(chlorine element peak)×2/carbon element peak] of higher than 0.6 as determined by particle surface analysis by electron spectroscopy for chemical analysis and a void ratio of 27 to 40% by volume as determined by mercury porosimetry at a pressure of 2,000 kg/cm², and, in the pore volume distribution thereof as determined by mercury porosimetry in the pressure range of 0 to 2,000 kg/cm, the percentage by volume (A2) of the volume of voids 0.001 to 0.1 μm in size to the total volume of voids is 2 to 30% by volume.

9. The chlorinated vinyl chloride resin according to claim 8 wherein, in the pore volume distribution of the vinyl chloride resin as determined by mercury porosimetry in the pressure range of 0 to 2,000 kg/cm², the percentage by volume (A1) of the volume of voids 0.001 to 0.1 μm in size to the total volume of voids is 2 to 10% by volume, and the percentage by volume (A2) of the volume of voids 0.001 to 0.1 μm in size for said chlorinated vinyl chloride resin and the percentage by volume (A1) of voids 0.001 to 0.1 μm in size for said vinyl chloride resin satisfy the following relation (1):

$$(A1) \times 2 \leq (A2) \quad (1).$$

10. The chlorinated vinyl chloride resin according to claim 8 or 9, wherein the percentage by volume (A2) of voids 0.001 to 0.1 μm in size to the total volume of voids for the chlorinated vinyl chloride resin is 3 to 15% by volume.

11. A chlorinated vinyl chloride resin obtained by chlorination of a vinyl chloride resin and having a chlorine content of 60 to 72% by weight and a void ratio of 30 to 40% by volume as determined by mercury porosimetry at a pressure of 2,000 kg/cm², wherein, in the pore volume distribution thereof as determined by mercury porosimetry in the pressure range of 0 to 2,000 kg/cm², the voids 0.001 to 0.1 μm in size account for 2 to 15% relative to the total volume of voids.

12. A chlorinated vinyl chloride resin obtained by chlorination of a vinyl chloride resin and having a chlorine content of 60 to 72% by weight, a void ratio of 30 to 40% by volume as determined by mercury porosimetry at a pressure of 2,000 kg/cm² and a BET specific surface area of 2 to 12 m²/g.

13. A chlorinated vinyl chloride resin obtained by chlorination of a vinyl chloride resin and having a chlorine content of 60 to 72% by weight and a void ratio of 30 to 40% by volume as determined by mercury porosimetry at a pressure of 2,000 kg/cm², wherein, in the pore volume distribution thereof as determined by mercury porosimetry in the pressure range of 0 to 2,000 kg/cm², the voids 0.001 to 0.1 μm in size account for 2 to 15% relative to the total volume of voids and the absorbance (cell length 1 cm, measuring temperature 23° C.) of a 1 g/kg tetrahydrofuran solution thereof is not more than 0.8 at the wavelength 235 nm.

14. A chlorinated vinyl chloride resin obtained by chlorination of a vinyl chloride resin and having a chlorine content of 60 to 72% by weight, a void ratio of 30 to 40% by volume as determined by mercury porosimetry at a pressure of 2,000 kg/cm² and a BET specific surface area of 2 to 12 m²/g, wherein the absorbance (cell length 1 cm, measuring temperature 23° C.) of a 1 g/kg tetrahydrofuran solution thereof is not more than 0.8 at the wavelength 235 nm.

15. A chlorinated vinyl chloride resin obtained by chlorination of a vinyl chloride resin and having a chlorine content of 60 to 72% by weight and a void ratio of 30 to 40% by volume as determined by mercury porosimetry at a pressure of 2,000 kg/cm², wherein, in the pore volume distribution thereof as determined by mercury porosimetry in the pressure range of 0 to 2,000 kg/cm², the voids 0.001 to 0.1 μm in size account for 2 to 15% relative to the total volume of voids and the absorbance (cell length 1 cm, measuring temperature 23° C.) of a 1 g/kg tetrahydrofuran solution thereof is not more than 0.2 at the wavelength 235 nm.

16. A chlorinated vinyl chloride resin obtained by chlorination of a vinyl chloride resin and having a chlorine content of 60 to 72% by weight, a void ratio of 30 to 40% by surface area of 2 to 12 m²/g, wherein the absorbance (cell length 1 cm, measuring temperature 23° C.) of a 1 g/kg tetrahydrofuran solution thereof is not more than 0.2 at the wavelength 235 nm.

17. A chlorinated vinyl chloride resin obtained by chlorination of a vinyl chloride resin and having a chlorine content of 60 to 72% by weight and a void ratio of 30 to 40% by volume as determined by mercury porosimetry at a pressure of 2,000 kg/cm², wherein, in the pore volume distribution thereof as determined by mercury porosimetry in the pressure range of 0 to 2,000 kg/cm², the voids 0.001 to 0.1 μm in size account for 2 to 15% relative to the total volume of voids and the following relations (1) and (2) are satisfied:

$$-3.9X+305 \geq Y \geq -3.9X+300 \quad (1)$$

$$-3.2X+270 \geq Z \geq -3.2X+265 \quad (2)$$

where X is the chlorine content (% by weight) of the chlorinated vinyl chloride resin and Y is the amount (g) of methyl alcohol required for initiating precipitation of the chlorinated vinyl chloride resin when 3.0 g of the resin is completely dissolved in 60 g of tetrahydrofuran and then methyl alcohol is gradually added to the solution to thereby cause precipitation of the resin, and Z is the amount (g) of methyl alcohol required to cause 80% by weight of the resin to precipitate.

18. A chlorinated vinyl chloride resin obtained by chlorination of a vinyl chloride resin and having a chlorine content of 60 to 72% by weight, a void ratio of 30 to 40% by volume as determined by mercury porosimetry at a pressure of 2,000 kg/cm² and a BET specific surface area of 2 to 12 m²/g, wherein the following relations (1) and (2) are satisfied:

$$-3.9X+305 \geq Y \geq -3.9X+300 \quad (1)$$

$$-3.2X+270 \geq Z \geq -3.2X+265 \quad (2)$$

where X is the chlorine content (% by weight) of the chlorinated vinyl chloride resin and Y is the amount (g) of methyl alcohol required for initiating precipitation of the chlorinated vinyl chloride resin when 3.0 g of the resin is completely dissolved in 60 g of tetrahydrofuran and then methyl alcohol is gradually added to the solution to thereby cause precipitation of the resin, and Z is the amount (g) of methyl alcohol required to cause 80% by weight of the resin to precipitate.

19. A method of producing a chlorinated vinyl chloride resin by chlorination of a vinyl chloride resin wherein said vinyl chloride resin has a BET specific surface area of 1.3 to 8 m²/g and a carbon element-chlorine element 1S bond energy (eV) peak ratio (chlorine element peak×2/carbon element peak) of higher than 0.6 as determined by particle surface analysis by ESCA (electron spectroscopy for chemical analysis)

and said chlorination is carried out by introducing liquid chlorine or gaseous chlorine into a reaction vessel containing the vinyl chloride resin in a state suspended in an aqueous medium at a reaction temperature within the range of 70 to 135° C.

20. The method of producing a chlorinated vinyl chloride resin according to claim 19, wherein the vinyl chloride resin has a BET specific surface area of 1.5 to 5 m²/g.

21. The method of producing a chlorinated vinyl chloride resin according to claim 19 or 20, wherein the peak ratio of the vinyl chloride resin as determined by particle surface analysis by ESCA is above 0.7.

22. A chlorinated vinyl chloride resin obtainable by chlorination of a vinyl chloride resin and having a chlorine content of 72 to 76% by weight and a void ratio of 30 to 40% by volume as determined by mercury porosimetry at a pressure of 2,000 kg/cm², wherein, in the pore volume distribution thereof as determined by mercury porosimetry in the pressure range of 0 to 2,000 kg/cm², the voids 0.001 to 0.1 μm in size account for 2 to 15% relative to the total volume of voids.

23. A chlorinated vinyl chloride resin obtainable by chlorination of a vinyl chloride resin and having a chlorine content of 72 to 76% by weight, a void ratio of 30 to 40% by volume as determined by mercury porosimetry at a pressure of 2,000 kg/cm² and a BET specific surface area of 2 to 12 m²/g.

24. The chlorinated vinyl chloride resin according to claim 22 or 23
having a carbon element-chlorine element 1S bond energy (eV) peak ratio (chlorine element peak/carbon element peak) of higher than 0.6 as determined by particle surface analysis by ESCA (electron spectroscopy for chemical analysis).

25. A method of producing a chlorinated vinyl chloride resin by chlorination of a vinyl chloride resin
wherein the vinyl chloride resin has a BET specific surface area of 1.3 to 8 m²/g and a carbon element-chlorine element 1S bond energy (eV) peak ratio (chlorine element peak×2/carbon element peak) of higher than 0.6 as determined by particle surface analysis by ESCA (electron spectroscopy for chemical analysis)
and said chlorination is carried out until attainment of a chlorine content of 72 to 76% by weight by introducing liquid chlorine or gaseous chlorine into a reaction vessel containing the vinyl chloride resin in a state suspended in an aqueous medium at a reaction temperature within the range of 70 to 135° C.

26. A chlorinated vinyl chloride resin obtained by chlorination of a vinyl chloride resin,
said vinyl chloride resin having a carbon element-chlorine element is bond energy (eV) peak ratio (chlorine element peak×2/carbon element peak) of higher than 0.6 as determined by particle surface analysis by ESCA (electron spectroscopy for chemical analysis),
said chlorinated vinyl chloride resin having a chlorine content of 60 to 72% by weight and a void ratio of 30 to 40% by volume as determined by mercury porosimetry at a pressure of 2,000 kg/cm², wherein, in the pore volume distribution thereof as determined by mercury porosimetry in the pressure range of to 2,000 kg/cm², the voids 0.001 to 0.1 µm in size account for 2 to 15% relative to the total volume of voids.

27. A chlorinated vinyl chloride resin obtained by chlorination of a vinyl chloride resin,
said vinyl chloride resin having a carbon element-chlorine element bond energy (eV) peak ratio (chlorine element peak×2/carbon element peak) of higher than 0.6 as determined by particle surface analysis by ESCA (electron spectroscopy for chemical analysis),
said chlorinated vinyl chloride resin having a chlorine content of 60 to 72% by weight, a void ratio of 30 to 40% by volume as determined by mercury porosimetry at a pressure of 2,000 kg/cm², and a BET specific surface area of 2 to 12 m²/g.

28. A chlorinated vinyl chloride resin obtained by chlorination of a vinyl chloride resin,
said vinyl chloride resin having a carbon element-chlorine element bond energy (eV) peak ratio (chlorine element peak×2/carbon element peak) of higher than 0.6 as determined by particle surface analysis by ESCA (electron spectroscopy for chemical analysis),
said chlorinated vinyl chloride resin having a chlorine content of 60 to 72% by weight and a void ratio of 30 to 40% by volume as determined by mercury porosimetry at a pressure of 2,000 kg/cm², wherein in the pore volume distribution thereof as determined by mercury porosimetry in the pressure range of 0 to 2,000 kg/cm², the voids 0.001 to 0.1 µm in size account for 2 to 15% relative to the total volume of voids,
and the absorbance (cell length 1 cm, measuring temperature 23° C.) of a 1 g/kg tetrahydrofuran solution being) not more than 0.8 at the wavelength 235 nm.

29. A chlorinated vinyl chloride resin obtained by chlorination of a vinyl chloride resin,
said vinyl chloride resin having a carbon element-chlorine element 1S bond energy (eV) peak ratio (chlorine element peak×2/carbon element peak) of higher than 0.6 as determined by particle surface analysis by ESCA (electron spectroscopy for chemical analysis),
said chlorinated vinyl chloride resin having a chlorine content of 60 to 72% by weight, a void ratio of 30 to 40% by volume as determined by mercury porosimetry at a pressure of 2,000 kg/cm² and a BET specific surface area of 2 to 12 m²/g,
and the absorbance (cell length 1 cm, measuring temperature 23° C.) of a 1 g/kg tetrahydrofuran solution being not more than 0.8 at the wavelength 235 nm.

30. A chlorinated vinyl chloride resin obtained by chlorination of a vinyl chloride resin,
said vinyl chloride resin having a carbon element-chlorine element 1S bond energy (eV) peak ratio (chlorine element peak×2/carbon element peak) of higher than 0.6 as determined by particle surface analysis by ESCA (electron spectroscopy for chemical analysis),
said chlorinated vinyl chloride resin having a chlorine content of 60 to 72% by weight and a void ratio of 30 to 40% by volume as determined by mercury porosimetry at a pressure of 2,000 kg/cm², wherein in the pore volume distribution thereof as determined by mercury porosimetry in the pressure range of 0 to 2,000 kg/cm², the voids 0.001 to 0.1 µ.m in size accounting for 2 to 15% relative to the total volume of voids,
and the absorbance (cell length 1 cm, measuring temperature 23° C.) of a 1 g/kg tetrahydrofuran solution being not more than 0.2 at the wavelength 235 nm.

31. A chlorinated vinyl chloride resin obtained by chlorination of a vinyl chloride resin,
said vinyl chloride resin having a carbon element-5 chlorine element 1S bond energy (eV) peak ratio (chlorine element peak×2/carbon element peak) of higher than 0.6 as determined by particle surface analysis by ESCA (electron spectroscopy for chemical analysis),
said chlorinated vinyl chloride resin having a chlorine 10 content of 60 to 72% by weight, a void ratio of 30 to 40% by volume as determined by mercury porosimetry at a pressure of 2,000 kg/cm² and a BET specific surface area of 2 to 12 m²/g,
and the absorbance (cell length 1 cm, measuring temperature 23° C.) of a 1 g/kg tetrahydrofuran solution being not more than 0.2 at the wavelength 235 nm.

32. A chlorinated vinyl chloride resin obtained by chlorination of a vinyl chloride resin,
said vinyl chloride resin having a carbon element-chlorine element 15 bond energy (eV) peak ratio (chlorine element peak×2/carbon element peak) of higher than 0.6 as determined by particle surface analysis by ESCA (electron spectroscopy for chemical analysis),
said chlorinated vinyl chloride resin having a chlorine content of 60 to 72% by weight and a void ratio of 30 to 40% by volume as determined by mercury porosimetry at a pressure of 2,000 kg/cm², wherein in the pore volume distribution thereof as determined by mercury porosimetry in the pressure range of 0 to 2,000 kg/cm², the voids 0.001 to 0.1 μm in size account for 2 to 15% relative to the total volume of voids, and satisfying the following relations (1) and (2):

$$-3.9X+300 \geq Y \geq -3.9X+290 \quad (1)$$

$$-3.2X+280 \geq Z \geq -3.2X+270 \quad (2)$$

wherein X is the chlorine content (% by weight) of the chlorinated vinyl chloride resin and, Y is the amount (g) of methyl alcohol required for initiating precipitation of the chlorinated vinyl chloride resin when 3.0 g of the resin is completely dissolved in 60 g of tetrahydrofuran at 20° C. and then methyl alcohol is gradually added to the solution to thereby cause precipitation of the resin, and Z is the amount (g) of methyl alcohol required to cause 80% by weight of the resin to precipitate.

33. A chlorinated vinyl chloride resin obtained by chlorination of a vinyl chloride resin, said vinyl chloride resin having a carbon element-chlorine element 15 bond energy (eV) peak ratio (chlorine element peak×2/carbon element peak) of higher than 0.6 as determined by particle surface analysis by ESCA (electron spectroscopy for chemical analysis)

said chlorinated vinyl chloride resin having a chlorine content of 60 to 72% by weight, a void ratio of 30 to 40% by volume as determined by mercury porosimetry at a pressure or 2,000 kg/cm², and a BET specific surface area of 2 to 12 m²/g, and satisfying the following relations (1) and (2):

$$-3.9X+300 \geq Y \geq -3.9X+290 \quad (1)$$

$$-3.2X+280 \geq Z \geq -3.2X+270 \quad (2)$$

wherein X is the chlorine content (% by weight) of the chlorinated vinyl chloride resin and, Y is the amount (g) of methyl alcohol required for initiating precipitation of the chlorinated vinyl chloride resin when 3.0 g of the resin is completely dissolved in 60 g of tetrahydrofuran at 20° C. and then methyl alcohol is gradually added to the solution to thereby case precipitation of the resin, and Z is the amount (g) of methyl alcohol required to cause 80% by weight of the resin to precipitate.

34. A chlorinated vinyl chloride resin obtained by chlorination of a vinyl chloride resin, said vinyl chloride resin having a carbon element-chlorine element is bond energy (eV) peak ratio (chlorine element peak×2/carbon element peak) of higher than 0.6 as determined by particle surface analysis by ESCA (electron spectroscopy for chemical analysis), said chlorinated vinyl chloride resin having a chlorine content of 60 to 72% by weight and a void ratio of 30 to 40% by volume as determined by mercury porosimetry at a pressure of 2,000 kg/cm², wherein in the pore volume distribution thereof as determined by mercury porosimetry in the pressure range of 0 to 2,000 kg/cm², the voids 0.001 to 0.1 μm in size account for 2 to 15% relative to the total volume of voids, and said chlorination being carried out by introducing liquid chlorine or gaseous chlorine into a reaction vessel containing the vinyl chloride resin in a state suspended in an aqueous medium at a temperature within the range of 70 to 135° C.

35. A method of producing a chlorinated vinyl chloride resin comprising chlorination of a vinyl chloride resin, said vinyl chloride resin having a carbon element-25 chlorine element 1S bond energy (eV) peak ratio (chlorine element peak×2/carbon element peak) of higher than 0.6 as determined by particle surface analysis by ESCA (electron spectroscopy for chemical analysis)

said chlorinated vinyl chloride resin having a chlorine 30 content of 60 to 72% by weight, a void ratio of 30 to 40% by volume as determined by mercury porosimetry at a pressure of 2,000 kg/cm², and a BET specific surface area of 2 to 12 m²/g, and said chlorination being carried out by introducing liquid chlorine or gaseous chlorine into a reaction vessel containing the vinyl chloride resin in a state suspended in an aqueous medium at a temperature within the range of 70 to 135° C.

36. A chlorinated vinyl chloride resin obtained by chlorination of a vinyl chloride resin, having a chlorine content of 72 to 76% by weight and a void ratio of 30 to 40% by volume as determined by mercury porosimetry at a pressure of 2,000 kg/cm², wherein, in the pore volume distribution thereof as determined by mercury porosimetry in the pressure range of 0 to 2,000 kg/cm², the voids 0.001 to 0.1 μm in size account for 2 to 15% relative to the total volume of voids.

37. A chlorinated vinyl chloride resin obtained by chlorination of a vinyl chloride resin, having a chlorine content of 72 to 76% by weight, a void ratio of 30 to 40% by volume as determined by mercury porosimetry at a pressure of 2,000 kg/cm², and a BET specific surface area of 2 to 12 m²/g.

38. The chlorinated vinyl chloride resin according to claim 36, said vinyl chloride resin having a carbon element-chlorine element 15 bond energy (eV) peak ratio (chlorine element peak×2/carbon element peak) of higher than 0.6 as determined by particle surface analysis by ESCA (electron spectroscopy for chemical analysis).

39. A method of producing a chlorinated vinyl chloride resin which comprises chlorination of a vinyl chloride resin, said vinyl chloride resin having a BET specific surface area of 1.3 to 8 m²/g and a carbon element-chlorine element 1S bond energy (eV) peak ratio (chlorine element peak x particle surface analysis by electron spectroscopy for chemical analysis, and said chlorination being carried out until attainment of a chlorine content of 72 to 76% by weight by introducing liquid chlorine or gaseous chlorine into a reaction vessel containing the vinyl chloride resin in a state suspended in an aqueous medium at a temperature within the range of 70 to 135° C.

40. A chlorinated vinyl chloride resin pipe obtained by molding a chlorinated vinyl chloride resin obtained by chlorination of a vinyl chloride resin, said chlorinated vinyl chloride resin having a void ratio of 30 to 40% by volume as determined by mercury porosimetry at a pressure of 2,000 kg/cm², wherein in the pore volume distribution thereof as determined by mercury porosimetry in the pressure range of 0 to 2,000 kg/cm², the voids 0.001 to 0.1 μm in size account for 2 to 15% relative to the total volume of voids, and said chlorinated vinyl chloride resin pipe having a Vicat softening temperature of not lower than 145° C.

as determined under a load of 1 kgf by the method according to JIS K 7206.

41. A chlorinated vinyl chloride resin pipe obtained by molding a chlorinated vinyl chloride resin obtained by chlorination of a vinyl or chloride resin, said chlorinated vinyl chloride resin having a void ratio of 30 to 40% by volume as determined by mercury porosimetry at a pressure of 2,000 kg/cm$^2$, wherein in the pore volume distribution thereof as determined by mercury porosimetry in the pressure range of 0 to 2,000 kg/cm$^2$, the voids 0.001 to 0.1 μm in size of 2 to 15% relative to the total volume of voids, said chlorinated vinyl chloride resin having a chlorine content of 70 to 76% by weight and a carbon element-chlorine element 1S bond energy (eV) peak ratio (chlorine element peak×2/carbon element peak) of higher than 0.6 as determined by particle surface analysis by electron spectroscopy for chemical analysis, and said chlorinated vinyl chloride resin pipe having a Vicat softening temperature of not lower than 145° C. as determined under a load of 1 kgf by the method according to JIS K 7206 and a Charpy impact strength of not less than 10 kgf·cm$^2$ as determined by the method according to JIS K7111.

42. A chlorinated vinyl chloride resin pipe obtained by molding a chlorinated vinyl chloride resin obtained by chlorination of a vinyl chloride resin, said chlorinated vinyl chloride resin having a void ratio of 30 to 40% by volume as determined by mercury porosimetry at a pressure of 2,000 kg/cm$^2$, wherein in the pore volume distribution thereof as determined by mercury porosimetry in the pressure range of 0 to 2,000 kg/cm$^2$, the voids 0.001 to 0.1 μm in size account for 2 to 15% relative to the total volume of voids, and said chlorinated vinyl (chloride resin having a chlorine content of 70 to 76% by weight, a carbon element-chlorine element 1S bond energy (eV) peak ratio (chlorine element peak×2/carbon element peak) of higher than 0.6 as determined by particle surface analysis by electron spectroscopy for chemical analysis, and said chlorinated vinyl chloride resin pipe having a Vicat softening temperature of not lower than 145° C. as to determined under a load of 1 kgf by the method according to JIS K 7206 and a Charpy impact strength of not less than 20 kgfcm/cm$^2$ as determined by the method according to JIS K7111.

43. A chlorinated vinyl chloride resin joint obtained by molding a chlorinated vinyl chloride resin obtained by chlorination of a vinyl chloride resin, said chlorinated vinyl chloride resin having a void ratio of 30 to 40% by volume as determined by mercury porosimetry at a pressure of 2,000 kg/cm$^2$, wherein in the pore volume distribution thereof as determined by mercury porosimetry in the pressure range of 0 to 2,000 kg/cm$^2$, the voids 0.001 to 0.1 μm in size account for 2 to 15% relative to the total volume of voids, said chlorinated vinyl chloride resin having a chlorine content of 70 to 76% by weight and a carbon element-chlorine element 1S bond energy (eV) peak rat so (chlorine element peak×2/carbon element peak) of higher than 0.6 as determined by particle surface analysis by electron spectroscopy for chemical analysis, and said chlorinated vinyl chloride resin joint having a Vicat softening temperature or nor lower than 145° C. as to determined under a load of 1 kgf by the method according to JIS K 7206 and a Charpy impact strength of not less than 10 kgh cm/cm$^2$ as determined by the method according to JIS K 7111.

44. A chlorinated vinyl chloride resin joint obtained by molding a chlorinated vinyl chloride resin obtained by chlorination of a vinyl chloride resin, said chlorinated vinyl chloride resin having a void ratio of 30 to 40% by volume as determined by mercury porosimetry at a pressure of 2,000 kg/cm$^2$, wherein in the pore volume distribution thereof as determined by mercury porosimetry in the pressure range of 0 to 2,000 kg/cm$^2$, the voids 0.001 to 00.1 μm in size account for 2 to 15% relative to the total volume of voids, said chlorinated vinyl chloride resin having a chlorine content of 70 to 76% by weight and a carbon element-chlorine element 1S bond energy (eV) peak ratio (chlorine element peak×2/carbon element peak) of higher than 0.6 as determined by particle surface analysis by electron spectroscopy for chemical and said chlorinated vinyl chloride resin joint having a Vicat softening temperature of not lower than 145° C. as determined under a load of 1 kgf by the method according to JIS K 7206 and a Charpy impact strength of not less than 20 kgfcm/cm$^2$ as determined by the method according to JIS K 7111.

45. A chlorinated vinyl chloride resin plate obtained by molding a chlorinated vinyl chloride resin obtained by chlorination of vinyl chloride resin, said chlorinated vinyl chloride resin having a void ratio of 30 to 40% by volume as determined by mercury porosimetry at a pressure of 2,000 kg/cm$^2$, wherein in the pore volume distribution thereof as determined by mercury porosimetry in the pressure range of 0 to 2,000 kg/cm$^2$, the voids 0.001 to 0.1 μm in size account for 2 to 15% relative to the total volume of voids, said chlorinated vinyl chloride resin having a chlorine content of 70 to 76% by weight and a carbon element-chlorine element 1S bond energy (eV) peak ratio (chlorine element peak×2/carbon element peak) of higher than 0.6 as determined by particle surface analysis by electron spectroscopy for chemical analysis, and said chlorinated vinyl chloride resin plate having a Vicat softening temperature of nor lower than 145° C. as determined under a load of 1 kgf by the method according to JIS K 7206 and a Charpy impact strength of not less than 10 kgfcm/cm$^2$ as determined by the method according to JIS K7111.

46. A heat-resistant vinyl chloride resin pipe obtained by molding a heat-resistant vinyl chloride resin obtained by chlorination of a vinyl chloride resin, said vinyl chloride resin having a BET specific surface area of 1.3 to 8 m$^2$/g and a carbon element-chlorine element 1S bond energy (eV) peak ratio (chlorine element peak×2/carbon element peak) of higher than 0.6 as determined by particle surface analysis by electron spectroscopy for chemical analysis, said heat-resistant vinyl chloride resin pipe having a heat resistance temperature of not lower than 125° C. and a surface roughness Rmax of not more than 0.5 μm and a decomposition time of not shorter than 30 minutes as determined in an oven at 200° C.

47. The heat-resistant vinyl chloride resin pipe according to claim 46, which is to serve as a piping material for pure water distribution.

* * * * *

UNITED STATES PATENT AND TRADEMARK OFFICE
CERTIFICATE OF CORRECTION

PATENT NO. : 6,590,041 B1
DATED : July 8, 2003
INVENTOR(S) : Yoshihiko Eguchi et al.

It is certified that error appears in the above-identified patent and that said Letters Patent is hereby corrected as shown below:

Column 36,
Line 36, after "curable clear coating and said amino" and insert -- resin --

Column 130,
Line 23, delete "m2/g" and insert -- $m^2/g$ --
Line 32, delete "kg/cm" and insert -- $kg/cm^2$ --

Column 131,
Line 45, after "void ratio of 30 to 40% by" insert -- volume as determined by mercury porosimetry at a pressue of 2,000 $kg/cm^2$ and a BET specific --

Column 132,
Lines 56 and 66, delete "obtainable" and insert -- obtained --

Column 133,
Line 34, delete "chlorine" and insert -- chloride --
Line 40, after "porosimetry in the pressure range of" insert -- 0 --
Lines 46 and 58, after "element" insert -- 1S --

Column 134,
Line 4, after "tetrahydrofuran solution being" delete ")"
Line 36, after "the voids 0.001 to 0.1" delete "$\mu$.m" and insert -- $\mu m$ --
Line 43, delete "5"
Line 48, delete "10"
Line 59, delete "15" and insert -- 1S --

Column 135,
Line 23, delete "15" and insert -- 1S --
Line 30, delete "or" and insert -- of --
Line 44, delete "case" and insert -- cause --
Line 51, delete "is" and insert -- 1S --

Column 136,
Line 37, after "claim 36" insert -- or 37 --
Line 39, delete "15" and insert -- 1S --
Line 48, after "element peak x" insert -- 2/carbon element peak) of higher than 0.6 as determined by --

UNITED STATES PATENT AND TRADEMARK OFFICE
CERTIFICATE OF CORRECTION

PATENT NO. : 6,590,041 B1
DATED : July 8, 2003
INVENTOR(S) : Yoshihiko Eguchi et al.

It is certified that error appears in the above-identified patent and that said Letters Patent is hereby corrected as shown below:

Column 137,
Line 5, delete "or"
Line 8, after "wherein" insert -- 0.001 to 0.1 $\mu$m is size account for 2 to 15% relative to the total volume of voids --
Line 11, after "kg/cm$^2$" delete "the voids 0.001 to 0.1$\mu$m in size of 2 to 15% relative to the total volume of voids, said chlorinated vinyl chloride resin having a chlorine content of 70 ot 76% by weight and carbon element-chlorine element 1S bond energy (eV) peak ratio (chlorine element peak x 2/carbon element peak) of higher than 0.6 as determined by particle surface analysis by electron spectroscopy for chemical analysis."
Line 23, delete "kgf•cm$^2$" and insert -- kgf•cm/cm$^2$ --
Line 35, delete "and said chlorinated vinyl (chloride resin having a chlorine content of 70 to 76% by weight, a carbon element chlorine element 1S bond energy (eV) peak ratio (chlorine element peak x2/carbon element peak) of higher than 0.6 as determined by particle surface analysis by electron spectroscopy for chemical analysis."
Lines 43 and 65, delete "to"
Line 60, delete "rat" and insert -- ratio --
Line 64, delete "or" and insert -- of --

Column 138,
Line 1, delete "kgh cm/cm$^2$" and insert -- kgf•cm/cm$^2$ --
Line 12, after 'to" delete "00.1" and insert -- 0.1 --
Line 19, after "by electron spectroscopy for chemical" insert -- analysis --
Line 28, after "chlorination of" and insert -- a --
Line 44, delete "nor" and insert -- not --

Signed and Sealed this

Seventeenth Day of August, 2004

JON W. DUDAS
*Acting Director of the United States Patent and Trademark Office*

UNITED STATES PATENT AND TRADEMARK OFFICE
CERTIFICATE OF CORRECTION

PATENT NO.    : 6,590,041 B1
DATED         : July 8, 2003
INVENTOR(S)   : Yoshihiko Eguchi et al.

It is certified that error appears in the above-identified patent and that said Letters Patent is hereby corrected as shown below:

<u>Column 136,</u>
Line 3, delete "25"
Line 9, delete "30"

Signed and Sealed this

Fourteenth Day of December, 2004

JON W. DUDAS
*Director of the United States Patent and Trademark Office*